(12) United States Patent
Sunada

(10) Patent No.: US 11,991,324 B2
(45) Date of Patent: May 21, 2024

(54) DOCUMENT READING APPARATUS AND IMAGE FORMING APPARATUS FOR EXECUTING IN USING MODES OF MULTIPLE DOCUMENTS HAVING DIFFERENT SIZES

(71) Applicant: CANON KABUSHIKI KAISHA, Tokyo (JP)

(72) Inventor: Hidenori Sunada, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/310,625

(22) Filed: May 2, 2023

(65) Prior Publication Data

US 2023/0379416 A1    Nov. 23, 2023

(30) Foreign Application Priority Data

May 17, 2022  (JP) ................................. 2022-081097

(51) Int. Cl.
*H04N 1/00*    (2006.01)

(52) U.S. Cl.
CPC ..... *H04N 1/00633* (2013.01); *H04N 1/00615* (2013.01); *H04N 1/0071* (2013.01)

(58) Field of Classification Search
CPC .......... H04N 1/00633; H04N 1/00615; H04N 1/0071
USPC ....................................................... 358/498
See application file for complete search history.

(56) References Cited

U.S. PATENT DOCUMENTS

| 8,786,917 | B2* | 7/2014 | Ishizuka | H04N 1/00588 358/496 |
| 10,597,244 | B2 | 3/2020 | Niwata et al. | |
| 2011/0211237 | A1* | 9/2011 | Osakabe | H04N 1/00681 358/498 |
| 2016/0176667 | A1* | 6/2016 | Mori | B65H 9/004 271/227 |
| 2018/0220022 | A1* | 8/2018 | Yoshikaie | H04N 1/00755 |

FOREIGN PATENT DOCUMENTS

JP           2019108221 A    7/2019

* cited by examiner

*Primary Examiner* — Allen H Nguyen
(74) *Attorney, Agent, or Firm* — ROSSI, KIMMS & McDOWELL LLP

(57) ABSTRACT

A document reading apparatus includes a stacking portion on which a plurality of documents are stacked, a feeding unit configured to feed the plurality of documents in a feeding direction, a reading unit configured to read the documents, a drive source configured to drive the feeding unit, and a control unit configured to execute a mode in which the plurality of documents having different sizes are fed by the feeding unit and read by the reading unit. The control unit is configured to control the drive source in the mode such that the feeding unit feeds a first document at a first feeding speed, and the feeding unit feeds a second document following the first document at a second feeding speed higher than the first feeding speed in a case where the width of the first document is larger than a predetermined width.

20 Claims, 45 Drawing Sheets

DOCUMENT

DOCUMENT   BACKGROUND

FIG.15A

```
SIZE OF DOCUMENT TO BE READ

SELECT SIZE OF DOCUMENT TO BE READ

[A4 PORTRAIT SIZE]   [B4]              [AUTOMATIC (UNIFORM)]
[A3]                 [B5 PORTRAIT SIZE] [MIXED]
[A4 LANDSCAPE SIZE]  [B5 LANDSCAPE SIZE] [FREE]
[A5 PORTRAIT SIZE]   [B6 PORTRAIT SIZE]
[A5 LANDSCAPE SIZE]

[OK]  [BACK]
```

FIG.15B

```
SIZE OF DOCUMENT TO BE READ

SELECT METHOD OF DETECTING
SIZE OF FREE-SIZE DOCUMENT

[FREE]       [1][2][3]        [MIXED]
             [4][5][6]        [USE OF ATTACHMENT]
             [7][8][9]
             [0][CLEAR]

PORTRAIT SIZE:  [   ] mm
LANDSCAPE SIZE: [   ] mm

[OK]  [BACK]
```

FIG.16

|  | MAIN SCANNING (UNIT: dpi) | SUB SCANNING (UNIT: dpi) | READING SPEED (UNIT: mm/sec) |
|---|---|---|---|
| COLOR | 300 | 300 | 590 |
|  | 300 | 600 | 340 |
|  | 600 | 600 | 210 |
| BLACK AND WHITE | 600 | 600 | 590 |

FIG.17

| DOCUMENT WIDTH W (UNIT: mm) | TARGET TRAY | FEEDING SPEED (UNIT: mm/sec) |
|---|---|---|
| 48 ≤ W ≤ 58 | FIRST AUXILIARY TRAY | 210 |
| 58 < W ≤ 91 | SECOND AUXILIARY TRAY | 300 |
| 91 < W | DOCUMENT TRAY | 590 |

FIG.28

| COLOR/BLACK AND WHITE |
| --- |
| READ SIZE DETERMINATION METHOD |
| READ SIZE |
| PLATEN/ONE SIDE/BOTH SIDES |
| RESOLUTION |
| READ STATE |
| READING SPEED |
| SHEET FEEDING SPEED |

FIG.29

| PAGE NUMBER |
| --- |
| COLOR/BLACK AND WHITE |
| READ SIZE DETERMINATION METHOD |
| READ SIZE |
| DETECTED DOCUMENT SIZE |
| PLATEN/FRONT/BACK |
| RESOLUTION |
| READ STATE |
| READING SPEED |
| SHEET FEEDING SPEED |

FIG.32A

SIZE OF DOCUMENT TO BE READ

SELECT SIZE OF DOCUMENT TO BE READ

- A4 PORTRAIT SIZE
- B4
- A3
- B5 PORTRAIT SIZE
- A4 LANDSCAPE SIZE
- B5 LANDSCAPE SIZE
- A5 PORTRAIT SIZE
- B6 PORTRAIT SIZE
- A5 LANDSCAPE SIZE

- AUTOMATIC (UNIFORM)
- MIXED
- FREE

OK | BACK

FIG.32B

SIZE OF DOCUMENT TO BE READ

SELECT METHOD OF DETECTING SIZE OF FREE-SIZE DOCUMENT

FREE 1 2 3
4 5 6
7 8 9
0 CLEAR

MIXED
MIXED (ADVANCED)

PORTRAIT SIZE: ___ mm
LANDSCAPE SIZE: ___ mm

OK | BACK

FIG.32C

SIZE OF DOCUMENT TO BE READ

DOCUMENTS WHEN MIXED (ADVANCED) IS SET ARE PLACED IN DIFFERENT WAY FROM THOSE AS USUAL

1. MAXIMUM NUMBER OF SHEETS OF DOCUMENTS IS 10
2. DOCUMENT HAVING LARGE WIDTH IS PLACED BELOW (DOCUMENT HAVING SMALLER WIDTH IS PLACED HIGHER)
3. DOCUMENTS ARE PLACED AT CENTER OF TRAY
4. DOCUMENTS ARE PLACED IN PARALLEL WITH GUIDES

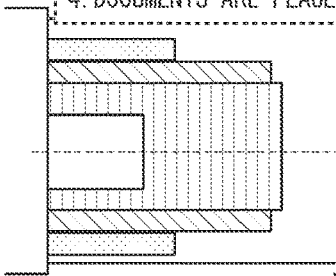

OK | BACK

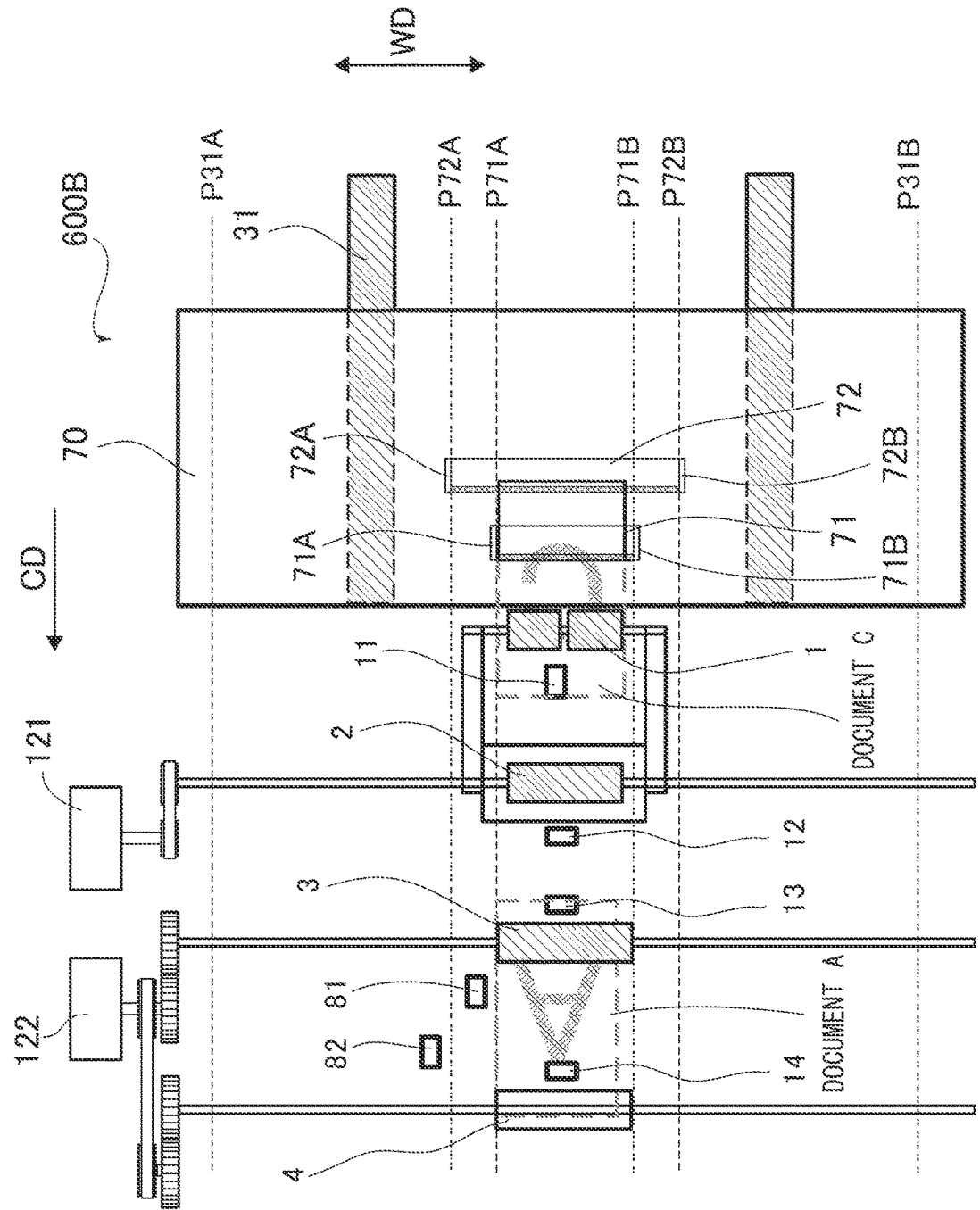

DOCUMENT READING APPARATUS AND IMAGE FORMING APPARATUS FOR EXECUTING IN USING MODES OF MULTIPLE DOCUMENTS HAVING DIFFERENT SIZES

BACKGROUND OF THE INVENTION

Field of the Invention

The present invention relates to a document reading apparatus that reads a document and an image forming apparatus including the same.

Description of the Related Art

In recent years, in an image reading apparatus that reads an image while conveying a document, it is required that documents of various sizes can be fed in a mixed state. Reading can be efficiently performed, for example, by collectively setting and feeding small-size documents such as receipts and A4-size documents on a document tray.

Japanese Patent Laid-Open No. 2019-108221 proposes a document conveying apparatus including a first document tray and a second document tray detachably provided on the first document tray. The second document tray includes a second document stacking face having a size allowing, for example, business cards to be stacked thereon and a third document stacking face having a size allowing, for example, receipts to be stacked thereon. In this document conveying apparatus, even though the documents are placed on any of the first document tray, the second document stacking face of the second document tray, and the third document stacking face of the second document tray, the documents are fed by the same paper feeding roller and the same retard roller.

Generally, a small-size document is more likely to be skew-fed than a large-size document, and as a countermeasure, it is known to reduce a document feeding speed. Therefore, in a case where documents of various sizes can be placed together in a mixed manner as in the document conveying apparatus described in Japanese Patent Laid-Open No. 2019-108221, it is considered to feed large-size documents at a speed matching a speed at which small-size documents are fed. However, in this case, productivity decreases.

SUMMARY OF THE INVENTION

According to a first aspect of the present invention, a document reading apparatus includes a stacking portion on which a plurality of documents are stacked, a feeding unit configured to feed the plurality of documents in a feeding direction one by one from an uppermost one of the plurality of documents stacked on the stacking portion, a reading unit configured to read the documents fed by the feeding unit, a drive source configured to drive the feeding unit, and a control unit configured to execute a mode in which the plurality of documents having different sizes are fed by the feeding unit and read by the reading unit, the plurality of documents being stacked on the stacking portion such that a document having a smaller width in a width direction orthogonal to the feeding direction is disposed higher. The control unit is configured to control the drive source in the mode such that the feeding unit feeds a first document at a first feeding speed, and the feeding unit feeds a second document following the first document at a second feeding speed higher than the first feeding speed in a case where a width of the first document is larger than a predetermined width.

According to a second aspect of the present invention, a document reading apparatus includes a stacking portion on which a plurality of documents are stacked, a feeding unit configured to feed the plurality of documents in a feeding direction one by one from an uppermost one of the plurality of documents stacked on the stacking portion, a reading unit configured to read the documents fed by the feeding unit, a detection unit disposed upstream of the feeding unit in the feeding direction, and configured to detect a width of each of the documents fed by the feeding unit in a width direction orthogonal to the feeding direction, a drive source configured to drive the feeding unit, and a control unit configured to execute a mode in which the plurality of documents having different sizes are fed by the feeding unit and read by the reading unit, the plurality of documents being stacked on the stacking portion such that a document having a smaller width is disposed higher. The control unit is configured to execute, in the mode, a first feeding processing in which the feeding unit feeds a document at a first feeding speed, a detection processing in which the width of the document is detected by the detection unit, and a second feeding processing in which the feeding unit feeds the document detected by the detection processing at a second feeding speed higher than the first feeding speed in a case where the width of the document detected by the detection processing is larger than a predetermined width.

According to a third aspect of the present invention, an image forming apparatus includes an image forming unit configured to form an image on a recording medium, a stacking portion on which a plurality of documents are stacked, a feeding unit configured to feed the plurality of documents in a feeding direction one by one from an uppermost one of the plurality of documents stacked on the stacking portion, a reading unit configured to read the documents fed by the feeding unit, a drive source configured to drive the feeding unit, and a control unit configured to execute a mode in which the plurality of documents having different sizes are fed by the feeding unit and read by the reading unit, the plurality of documents being stacked on the stacking portion such that a document having a smaller width in a width direction orthogonal to the feeding direction is disposed higher. The control unit is configured to control the drive source in the mode such that the feeding unit feeds a first document at a first feeding speed, and the feeding unit feeds a second document following the first document at a second feeding speed higher than the first feeding speed in a case where a width of the first document is larger than a predetermined width.

Further features of the present invention will become apparent from the following description of exemplary embodiments with reference to the attached drawings.

BRIEF DESCRIPTION OF THE DRAWINGS

FIG. 15A is a screen view for selecting a size of a document to be read, and FIG. 15B is a screen view for selecting a method of detecting a size of a free-size document.

FIG. 16 is a table illustrating reading speeds.

FIG. 17 is a table illustrating feeding speeds.

FIG. 28 is a table illustrating management information of the document reading apparatus.

FIG. 29 is a table illustrating page management information.

FIG. 32A is a screen view for selecting a size of a document to be read according to a second embodiment, FIG. 32B is a screen view for selecting a method of detecting a size of a free-size document, and FIG. 32C is a screen view illustrating messages displayed on an operation unit.

FIG. 33 is a plan view illustrating a conveying path from a document tray to a conveyance roller pair according to a third embodiment.

DESCRIPTION OF THE EMBODIMENTS

First Embodiment

Hereinafter, a document reading apparatus and an image forming apparatus according to the present disclosure will be described with reference to the drawings. The dimensions, materials, shapes, relative arrangements, and the like of the components described in the following embodiments are not intended to limit the scope within which the present technology is applied thereto unless otherwise specified.

Schematic Configuration of Image Forming Apparatus

Figure 1:
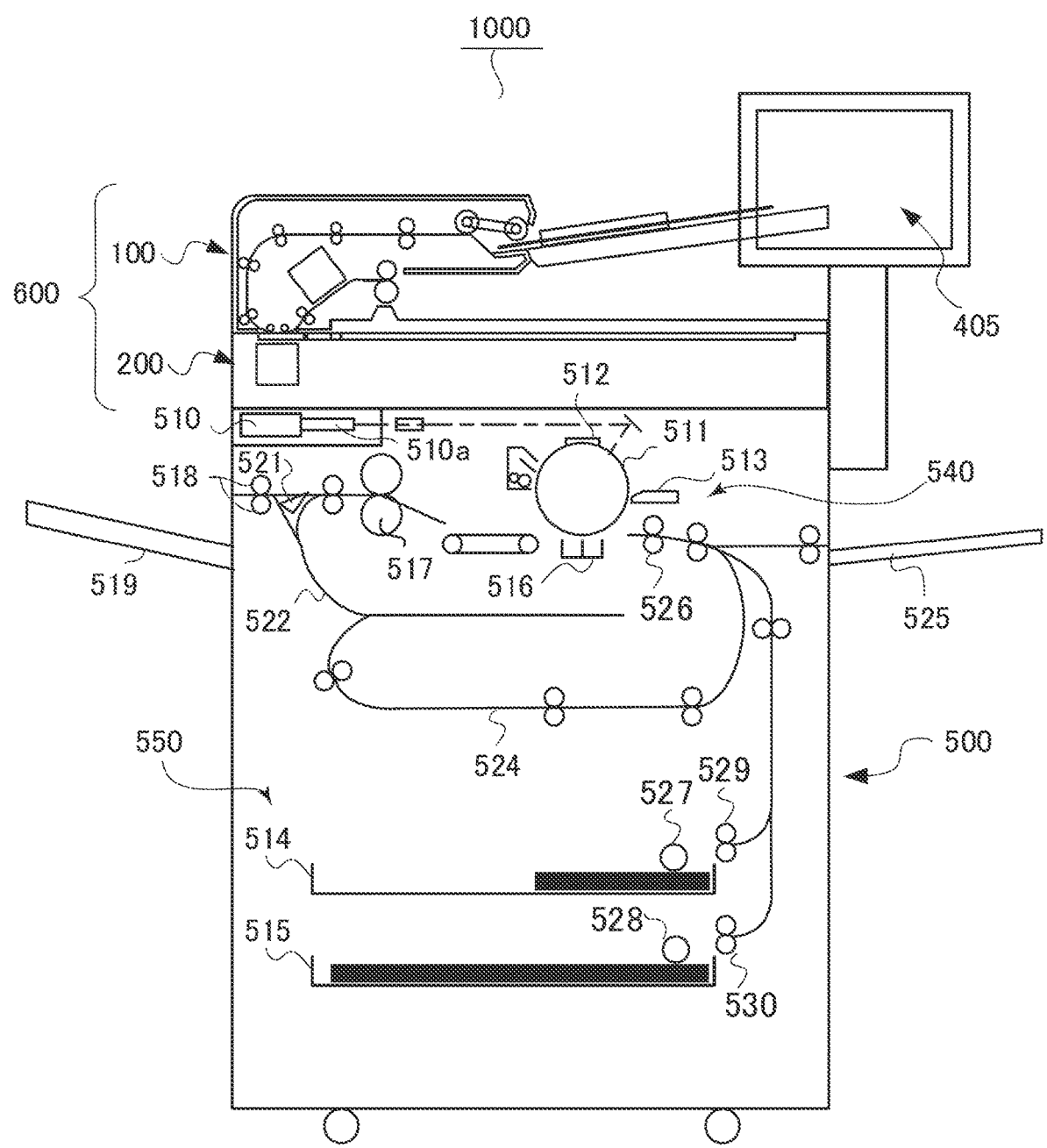
FIG. 1 is an overall schematic diagram illustrating an image forming apparatus according to a first embodiment.

First, a schematic configuration of an image forming apparatus 1000 according to the present embodiment will be described with reference to FIG. 1. As illustrated in FIG. 1, the image forming apparatus 1000 includes a printer body 500, a document reading apparatus 600, and a controller unit 400 (see FIG. 3). As will be described in detail below, the document reading apparatus 600 disposed upward of the printer body 500 includes a reader 200 and an auto document feeder (ADF) 100, and optically scans a document to read image information. The document is paper such as a paper sheet or an envelope, a plastic film such as a sheet for an overhead projector (OHP), or a sheet such as cloth. The image information converted into an electric signal by the document reading apparatus 600 is transferred to the controller unit 400 (see FIG. 3).

The printer body 500 includes an image forming unit 540 that forms an image on a sheet that is a recording medium, and a sheet feeding unit 550 that feeds the sheet to the image forming unit 540. The sheet feeding unit 550 includes cassettes 514 and 515 capable of storing sheets of different sizes. The sheets stored in the cassettes 514 and 515 are fed out by respective pickup rollers 527 and 528, and separated and conveyed one by one by a separation roller pair 529 and 530. Then, the sheets are sequentially delivered to a plurality of conveyance roller pairs arranged along a sheet conveyance path, and conveyed to a registration roller pair 526.

The registration roller pair 526 stops a leading edge of a sheet to correct skew feeding, and resumes the conveyance of the sheet in accordance with the progress of the image forming operation, which is a toner image forming process performed by the image forming unit 540.

The image forming unit 540 that forms an image on a sheet is an electrophotographic image forming unit including a photosensitive drum 511 that is a photosensitive member. The photosensitive drum 511 is rotatable along a sheet conveyance direction, and a charger 512, an exposing unit 510, a developing unit 513, a transfer charger 516, etc. are disposed around the photosensitive drum 511. The charger 512 uniformly charges the surface of the photosensitive drum 511, and the exposing unit 510 exposes the photosensitive drum 511 via a polygon mirror 510a based on image information input from the document reading apparatus 600 or the like to form an electrostatic latent image on the drum.

The developing unit 513 stores a two-component developer containing a toner and a carrier, and develops an electrostatic latent image onto a toner image by supplying the charged toner to the photosensitive drum 511. The toner image carried on the photosensitive drum 511 is transferred to the sheet conveyed from the registration roller pair 526 to the sheet conveyed by a bias electric field formed by the transfer charger 516. The sheet onto which the toner image has been transferred is conveyed toward a fixing unit 517 by a conveying unit before being fixed.

The sheet conveyed to the fixing unit 517 is nipped by a roller pair and heated while being pressurized, such that the image is fixed by melting and fixing the toner. When the image output is completed, the sheet on which the fixed image is obtained is discharged to a sheet discharge tray 519 protruding outward of the printer body 500 via a sheet discharge roller pair 518. In a case where an image is formed on a back side of the sheet for double-sided printing, the front side and the back side of the sheet having passed through the fixing unit 517 are exchanged by a reversing unit 139, and the sheet is conveyed to the registration roller pair 526 by a double-side conveying unit 140. Then, the sheet on which a further image has been formed by the image forming unit 540 is discharged to the sheet discharge tray 519.

Here, when the sheet is discharged in a state where its image formed surface faces downward (face down), the sheet having passed through the fixing unit 517 is once guided into a reversing path 522 by a switching operation of a guide member 521. Then, after a trailing edge of the sheet passes through the guide member 521, the sheet is switched back and discharged to the sheet discharge tray 519 by the sheet discharge roller pair 518. This discharge mode is referred to as reverse discharge. This reverse discharge is performed when images are formed in order from the first page, such as when document images read by the ADF 100 are formed on sheets or when images output from a computer are formed, and the sheets after discharged are placed in a correct page order.

Further, a sheet having high stiffness such as a thick sheet fed from a manual feed tray 525, which cannot be conveyed to the reversing path 522, is guided to the sheet discharge roller pair 518 by the guide member 521 in a state where its image formed surface faces upward (face up), rather than being guided to the reversing path 522.

Further, in a case where images are formed on both sides of the sheet, the guide member 521 guides the sheet to a double-side conveying path 524 via the reversing path 522. Then, an image is also formed on a back side (second side) of the sheet conveyed from the double-side conveying path 524 to the registration roller pair 526, and the sheet is discharged to the sheet discharge tray 519 by the sheet discharge roller pair 518.

Document Reading Apparatus

Figure 2:
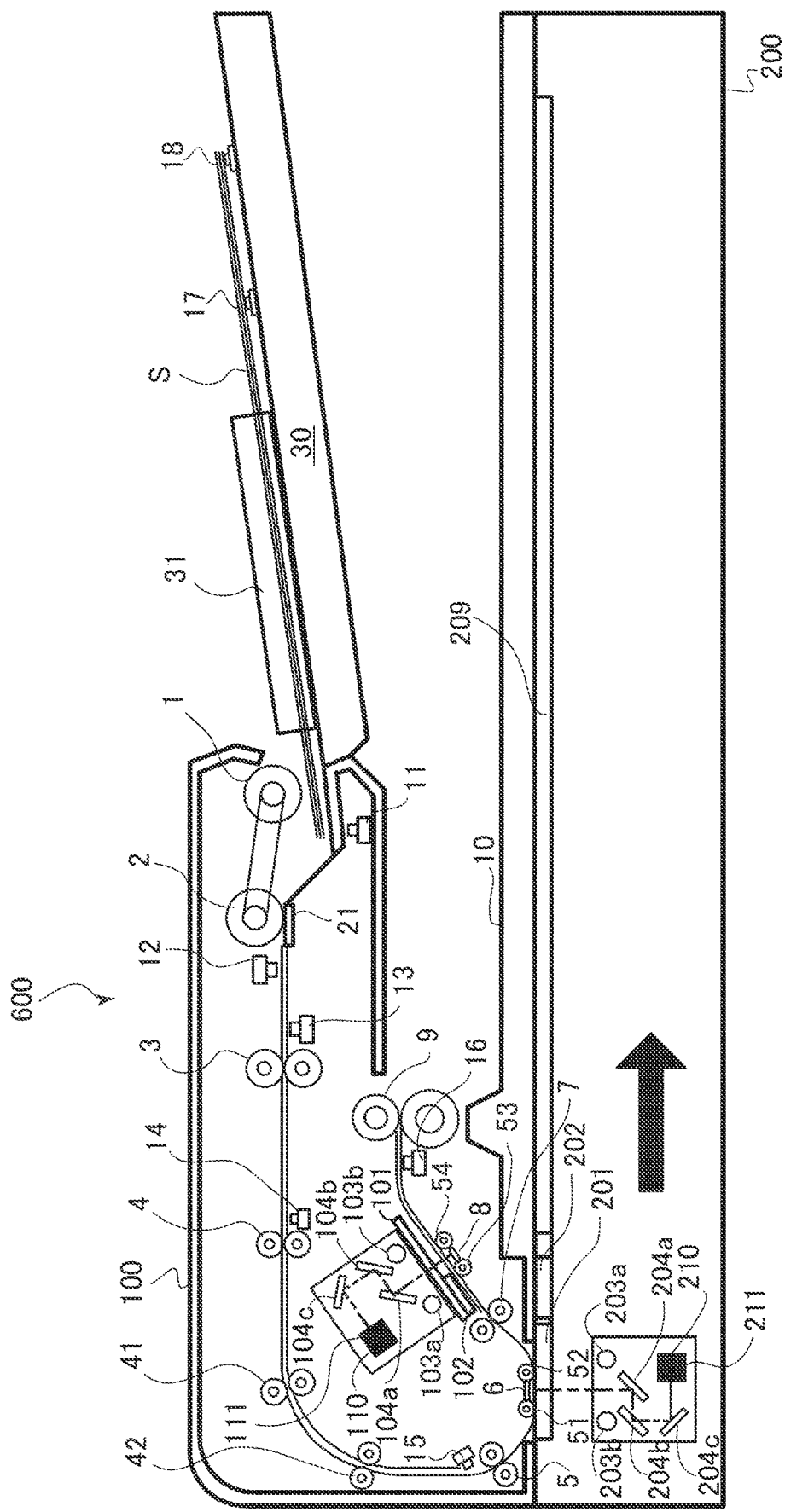
FIG. 2 is a schematic diagram illustrating a document reading apparatus.

Next, the document reading apparatus 600 will be described in detail. As illustrated in FIG. 2, the document reading apparatus 600 includes an ADF 100 that feeds a document S (including a document bundle) stacked on a document tray 30 and discharges the document S to a sheet discharge tray 10, and a reader 200. The document reading apparatus 600 further includes a front side reading unit 210 that reads a front side of the document conveyed by the ADF 100 and a back side reading unit 110 that reads a back side of the document conveyed by the ADF 100. That is, the ADF 100 constitutes a document conveying device that conveys a document to the front side reading unit 210 and the back side reading unit 110. The document tray 30 serving as a stacking portion is provided with a pair of side regulating plates 31 that is movable in a width direction on a document stacked surface and abuts on the ends in the width direction of the document to regulate a position in the width direction of the document. The ADF 100 is rotatably supported by a hinge (not illustrated) with respect to the reader 200 so that a platen glass 209 can be opened.

Figure 3:
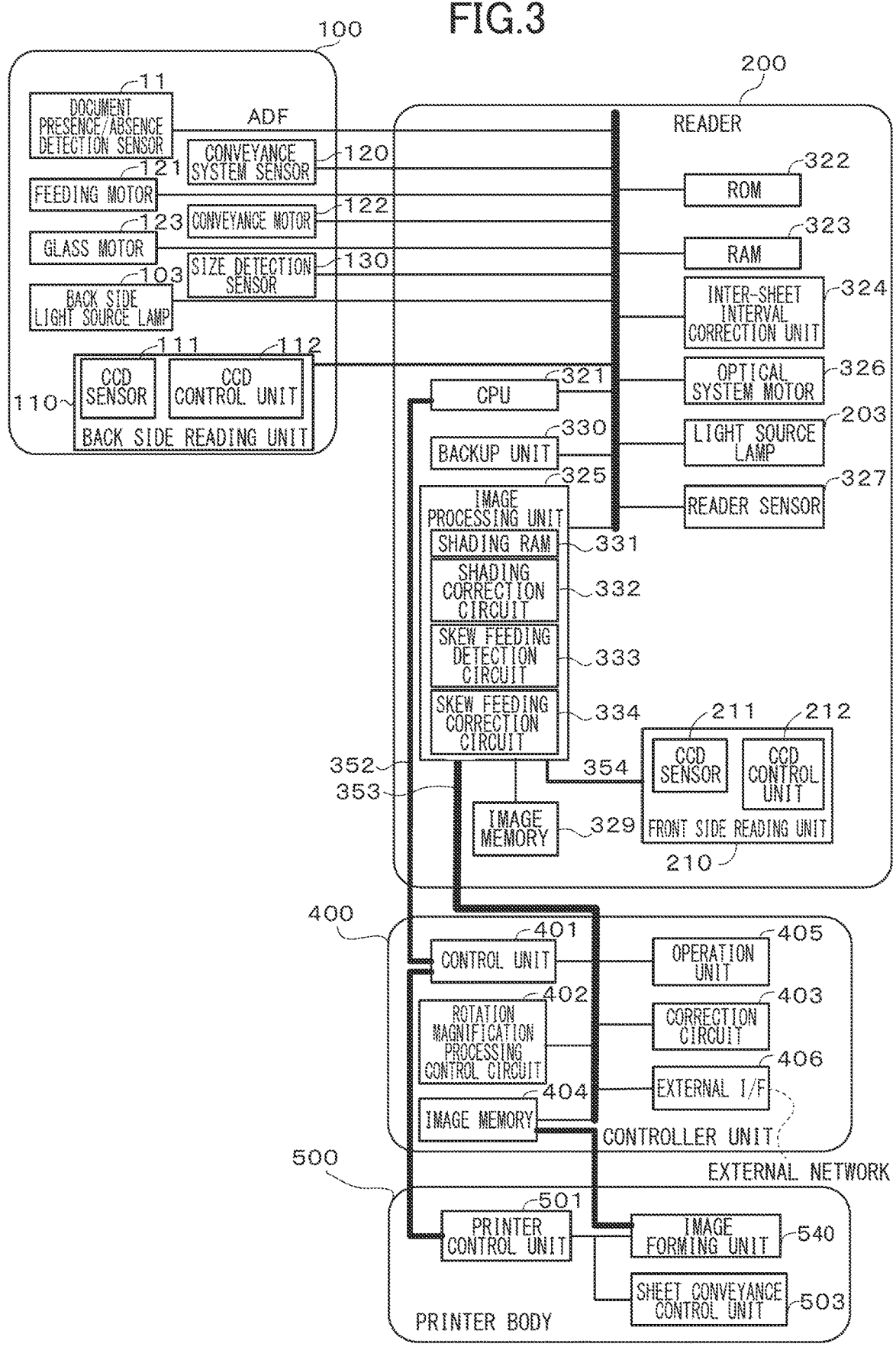
FIG. 3 is a block diagram of the image forming apparatus.

The ADF 100 includes a pickup roller 1 as a feeding unit and a separation roller 2 abutting on a separation pad 21 in order from upstream to downstream in the conveyance direction. Further, the ADF 100 includes a pull-out roller pair 3, conveyance roller pairs 4, 41, and 42, a lead roller pair 5, a conveyance roller pair 7, and a sheet discharge roller pair 9. In addition, the ADF 100 includes a document presence/absence detection sensor 11, a post-separation sensor 12, a pull-out sensor 13, a registration sensor 14, a lead sensor 15, a sheet discharge sensor 16, and the like, which will be described in detail below. Further, as illustrated in FIG. 3, the ADF 100 includes a feeding motor 121, a conveyance motor 122, a glass motor 123, a back side light source lamp 103, a conveyance system sensor 120, a size detection sensor 130, and a back side reading unit 110. The back side reading unit 110 includes a CCD sensor 111 and a CCD control unit 112.

As illustrated in FIG. 2, the ADF 100 includes a front side glass facing member 6 at a position facing the front side reading unit 210, and a front side reading upstream roller 51 and a front side reading downstream roller 52 are disposed upstream and downstream, respectively, of the front side glass facing member 6 in the conveyance direction. Also, the ADF 100 includes a back side glass facing member 8 at a position facing the back side reading unit 110, and a back side reading upstream roller 53 and a back side reading downstream roller 54 are disposed upstream and downstream, respectively, of the back side glass facing member 8 in the conveyance direction.

Meanwhile, the reader 200 includes a platen glass 209, a front side reading glass 201, the above-described front side reading unit 210, etc. As illustrated in FIG. 3, the reader 200 also includes a ROM 322, a RAM 323, an inter-sheet interval correction unit 324, an optical system motor 326, a light source lamp 203, and a reader sensor 327. The reader 200 further includes a CPU 321, a backup unit 330, an image processing unit 325, and an image memory 329. The image processing unit 325 includes a shading RAM 331, a shading correction circuit 332, a skew feeding detection circuit 333 as an inclination detection unit, and a skew feeding correction circuit 334. The front side reading unit 210 as a reading unit includes a CCD sensor 211 and a CCD control unit 212.

Next, a document reading operation will be described. The document reading apparatus 600 reads image information from a document in a feeding-reading mode in which a document image is scanned while the document stacked on the document tray 30 is conveyed by the ADF 100 or in a fixed-reading mode in which a document placed on the platen glass 209 is scanned. The feeding-reading mode is selected in a case where the document presence/absence detection sensor 11 detects a document stacked on the document tray 30 or in a case where the user explicitly instructs the feeding-reading mode using an operation unit (not illustrated) or the like.

When the feeding-reading mode is executed, the pickup roller 1 descends and abuts on the uppermost document on the document tray 30. Then, the document is conveyed by the pickup roller 1, and a resistance is applied to the second document and subsequent documents in a separation unit formed by the separation roller 2 and the separation pad 21, and the documents are separated one by one. Meanwhile, at the same time as the pickup roller 1 descends, the front side reading unit 210 is moved below the front side reading glass to read the conveyed document. Note that, in a case where a document bundle is stacked on the document tray 30, the pickup roller 1 feeds a plurality of documents constituting the document bundle one by one from the uppermost document.

Here, a document feeding speed is limited not only by the material and size of the roller but also by the type and size of the document. This is because, if a thick document such as a business card or a card is fed at the same speed as a normal document, a leading edge portion of the document strongly abuts against the separation unit (separation nip) formed by the separation roller 2 and the separation pad 21 although its width is narrow. In this case, when leading edge portions of the plurality of documents simultaneously abut against the separation unit, the separation effect of the separation pad 21 on the second document and subsequent documents is insufficient, resulting in double feeding.

On the other hand, if a thin document such as a receipt is fed at the same feeding speed as a normal document, the uppermost document in the document bundle is likely to skew due to a balance between a force of the pickup roller 1 in the conveyance direction and a frictional force of the pickup roller 1 with the document placed immediately below the pickup roller 1 because the stiffness of the document itself is weak. In addition, if the leading edge portion of the document hits the separation unit, the leading edge portion is more likely to buckle. Therefore, it is necessary to reduce the feeding speed for a document having a narrow width.

Figure 5:
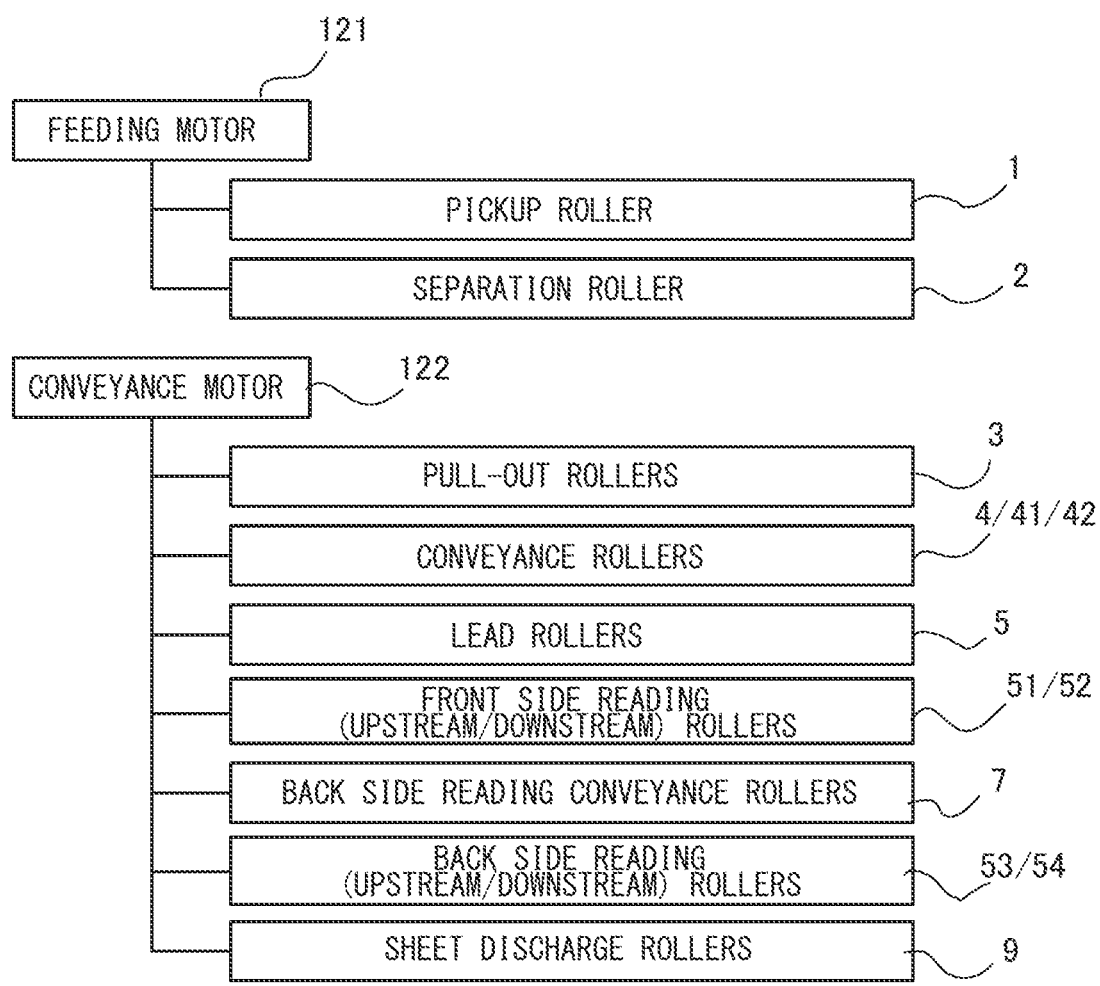
FIG. 5 is a block diagram illustrating rollers driven by each motor.

The leading edge and the trailing edge of the document having passed through the separation unit are detected by the post-separation sensor 12 or the pull-out sensor 13, and serve as references for timings at which the pickup roller 1 is lifted or the driving of the pickup roller 1 is started, and the driving of the pickup roller 1 is stopped. In the present embodiment, as illustrated in FIG. 5, the feeding motor 121 as a drive source drives the pickup roller 1 and the separation roller 2. The conveyance motor 122 drives the pull-out roller pair 3, the conveyance roller pairs 4, 41, 42, and 7, the lead roller pair 5, the front side reading upstream roller 51, the front side reading downstream roller 52, the back side reading upstream roller 53, the back side reading downstream roller 54, and the sheet discharge roller pair 9.

Then, as illustrated in FIG. 2, the feeding motor 121 is stopped and the rotation of the pickup roller 1 is stopped at a time point when a predetermined time elapses after the leading edge of the document is detected by the pull-out sensor 13. As a result, feeding of the next document is suppressed. Since the separation roller 2 is also stopped by stopping the feeding motor 121, the document is conveyed only by the pull-out roller pair 3 as a conveying unit for a while. The document conveying speed of the pull-out roller pair 3 driven by the conveyance motor 122 is set to be higher than the document conveying speed of the pickup roller 1 and the separation roller 2 driven by the feeding motor 121. As a result, the document conveying speed is switched to the conveying speed of the pull-out roller pair 3 when the leading edge of the document reaches the pull-out roller pair 3.

The conveyed document is conveyed toward the front side reading glass 201 through the pull-out roller pair 3, the conveyance roller pairs 4, 41, and 42, and the lead roller pair 5. The front side reading upstream roller 51 and the front side reading downstream roller 52 are disposed to face the front side reading glass 201, and guide the document passing through the front side reading glass 201 not to float from the front side reading glass 201 between the front side reading glass 201 and the front side glass facing member 6. Further, the conveyed document is conveyed toward the back side reading glass 101 through the front side reading upstream roller 51 and the front side reading downstream roller 52. The back side reading upstream roller 53 and the back side reading downstream roller 54 are disposed to face the back side reading glass 101, and guide the document passing through the back side reading glass 101 not to float from the back side reading glass 101 between the back side reading glass 101 and the back side glass facing member 8. Then, the document having passed between the back side reading glass 101 and the back side glass facing member 8 is discharged to the sheet discharge tray 10 by the sheet discharge roller pair 9.

Here, when the front side is read, an image on the front side of the document is read by the front side reading unit 210 via the front side reading glass 201. The front side of the document passing between the front side reading glass 201 and the front side glass facing member 6 is irradiated with light source lamps 203*a* and 203*b*. While the reflected light is folded back by a plurality of folding mirrors 204*a*, 204*b*, and 204*c*, the image on the front side of the document is read line by line by the CCD sensor 211. The read image information is transferred to the image memory 329 (see FIG. 3).

When both sides are read, the image on the front side of the document is read by the front side reading unit 210 as described above, and an image on the back side of the document is read by the back side reading unit 110. The back side of the document passing between the back side reading glass 101 and the back side glass facing member 8 is irradiated with light source lamps 103*a* and 103*b*. While the reflected light is folded back by a plurality of folding mirrors 104*a*, 104*b*, and 104*c*, the image on the back side of the document is read line by line by the CCD sensor 111. The read image information is transferred to the image memory 329 (see FIG. 3). In a case where there is a plurality of documents on the document tray 30, the reading of the front side or the reading of the both sides is repeated until reading of the final document is completed.

On the other hand, the fixed-reading mode is selected in a case where the apparatus detects a document placed on the platen glass 209 or in a case where the user explicitly instructs the fixed-reading mode using an operation unit (not illustrated). In this case, the document on the platen glass 209 does not move, and the front side reading unit 210 is moved along the platen glass 209 by driving the optical system motor 326 to scan the document. Image information read by the CCD sensor 211 of the front side reading unit 210 is transferred to the image memory 329 (see FIG. 3).

Figure 4:
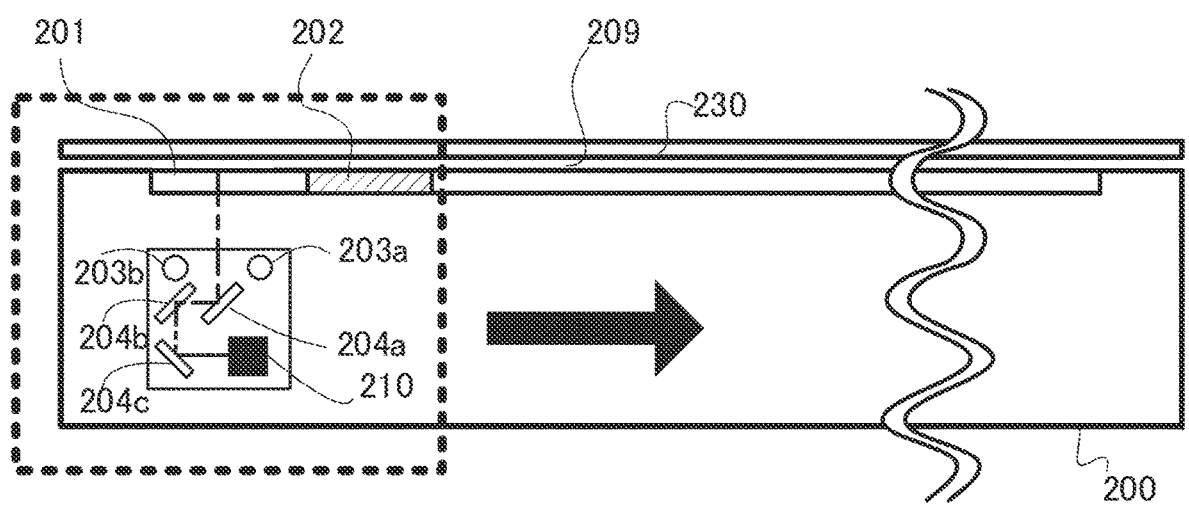
FIG. 4 is a schematic diagram illustrating a modification of the document reading apparatus including a pressure plate.

As illustrated in FIG. 4, a pressure plate 230 may be applied to the document reading apparatus instead of the ADF 100 illustrated in FIG. 2. Such a document reading apparatus is not capable of executing the feeding-reading mode, but is capable of executing the fixed-reading mode. That is, the pressure plate 230 nips a document together with the platen glass 209 so that the document on the platen glass 209 does not move. The document on the platen glass 209 is read by the front side reading unit 210 similarly to the operation in the fixed-reading mode described above.

Control of Conveyance

In the processing of feeding, separating, conveying, reading, and discharging a document, whether there is a document and a position of the document on the conveying path are detected by the sensors 12, 13, 14, 15, and 16 provided at various places on the conveying path, and the processing is performed according to a detection result. In particular, a leading edge of the conveyed document is detected using the lead sensor 15, and the start of reading is controlled at a front side flow reading position based on a timing at which the leading edge of the document is detected by the lead sensor 15 and a distance from the lead sensor 15 to the front side flow reading position. Similarly, the start of reading is controlled at a back side flow reading position based on a timing at which the leading edge of the document is detected by the lead sensor 15 and a distance from the lead sensor 15 to the back side flow reading position.

In the operations of feeding and conveying the document from the ADF 100, the CPU 321 periodically monitors signals detected by the post-separation sensor 12, the pull-out sensor 13, the registration sensor 14, the lead sensor 15, and the sheet discharge sensor 16. During the operations of feeding and conveying the document, if the signal detected by each of the sensors continuously indicates there is a document or there is no document for a predetermined time or more, the CPU 321 determines that a jam has occurred as an abnormality in document conveyance. In the following description, the wording "there is a document" refers to a state in which the sensor detects the document at the detection position, and the wording "there is no document" refers to a state in which the sensor detects no document at the detection position.

Details of Control System

Next, the configuration and operation of the control system in the ADF 100 will be described in detail with reference to the block diagram of the image forming apparatus 1000 illustrated in FIG. 3. Since the ADF 100 does not include a CPU, the CPU 321 of the reader 200 actually integrally controls the ADF 100.

The CPU 321 of the reader 200 is connected to the ROM 322 storing a program and a RAM 323 serving as a work area via a bus line. The CPU 321 controls conveyance of a document in the ADF 100 via an output port and an input port connected to the ADF 100 according to a control program stored in the ROM 322. The feeding motor 121, the conveyance motor 122, and the glass motor 123 that moves the back side reading glass 101 are connected to the output port. In addition, the document presence/absence detection sensor 11 and the conveyance system sensor 120 used to control a timing for conveying the document are connected to the input port. Specifically, the conveyance system sensor 120 refers to the post-separation sensor 12, the pull-out sensor 13, the registration sensor 14, the lead sensor 15, and the sheet discharge sensor 16.

Furthermore, the size detection sensor 130 for acquiring a size of a document on the document tray 30 is connected to the input port. The size detection sensor 130 includes document length detection sensors 17 and 18 that detect different positions in the document conveyance direction on the document tray 30, and a tray width detection sensor (not illustrated) that detects positions of the side regulating plates 31 (see FIG. 2) in the width direction orthogonal to the conveyance direction. Further, the back side light source lamp 103 (including 103a and 103b) for irradiating a back side of a document and the back side reading unit 110 are also connected to the CPU 321, and specifically, connected to the CCD sensor 111 and the CCD control unit 112 that controls the CCD sensor 111.

The CPU 321 of the reader 200 performs not only the control of the ADF 100 but also the control of the document reading apparatus 600. The backup unit 330 can back up some of work data used for the control, a set value in a case where a setting is provided for each machine body, and the like. The optical system motor 326 includes a driver circuit for driving an optical system driving motor.

Further, the light source lamp 203, the front side reading unit 210 (including the CCD sensor 211 and the CCD control unit 212), and the various reader sensors 327 are connected to the CPU 321. The CPU 321 performs image reading processing by controlling the front side reading unit 210 via the image processing unit 325 including the shading RAM 331, the shading correction circuit 332, the skew feeding detection circuit 333, the skew feeding correction circuit 334, and the like. The front side reading unit 210 is used not only to read an image on a front side of a document placed on the ADF 100 but also to read an image of a document placed on the platen glass 209. The various reader sensors 327 include sensors such as a pressure plate opening/closing detection sensor that detects whether the ADF 100 is opened or closed with respect to the reader 200, and a size detection sensor that detects a length of a document placed on the platen glass 209. In addition, the inter-sheet interval correction unit 324 corrects an inter-sheet interval which is an interval between a plurality of documents in the conveyance direction.

The CPU 321 as a control unit synchronizes the document conveyance control in the ADF 100 and the image reading processing in the front side reading unit 210 and the back side reading unit 110 to read desired images of the document.

An image signal formed by the CCD sensor 211 of the front side reading unit 210 is converted into digital image data. The converted image data is transferred to the image processing unit 325 via an image data communication line 354, and various types of image processing such as shading processing and detection and correction of a dirt image, e.g., a streak image, on the image data are performed, and the image memory 329 is used as a work area therefor. The image data processed by the image processing unit 325 is sequentially transmitted to the controller unit 400 via the image communication line 353 including an image transfer clock signal line. Further, an image leading signal serving as a reference for a leading edge of the document image data is notified to the controller unit 400 via a control communication line 352 after a timing therefor is adjusted by the CPU 321.

The controller unit 400 controls the entire document reading apparatus 600 including the reader 200 and the ADF 100, and also controls the entire image forming apparatus 1000. The controller unit 400 includes a control unit 401, a rotation magnification processing control circuit 402, a correction circuit 403, an image memory 404, an operation unit 405, and an external I/F 406.

The digital image data sent to the controller unit 400 via the image processing unit 325 is subjected to image control by the rotation magnification processing control circuit 402 and then sent to the correction circuit 403. Then, the correction circuit 403 performs correction processing such as color tone correction on the image signal, and writes the corrected image signal in the image memory 404. Such processing is performed on the image data in the document image region to generate a read image of the document. The operation unit 405 includes a display unit such as a liquid crystal panel, a physical key, and the like. The operation unit 405 is configured to enable the user to instruct the entire system to perform an image reading operation and to display a read image, that is, to perform desired display or input by communicating with the control unit 401. Example of the instruction of the image reading operation includes designating one side or both sides as a document read side, designating a color image or a black-and-white image, designating a read size, designating an image quality, and the like.

The external I/F 406 is an interface connected to an external network for a function of not only transmitting a read document image in response to a document reading request received from a computer of a network destination, but also transmitting an obtained document image to a computer of a network destination In addition, since not only a wired LAN but also a wireless communication unit for communication with a mobile terminal such as a smartphone is provided as a connection destination, information can be mediated between the mobile terminal and the computer of the network destination.

The printer control unit 501 controls the entire printer body 500. Using a result of communication with the control unit 401, the printer control unit 501 receives an image output from the image memory 404, controls the image forming unit 540, and instructs a sheet conveyance control unit 503 that controls sheet conveyance.

Shading Control

As illustrated in FIGS. 2 and 4, a front surface shading white board 202 is disposed to face the front side reading unit 210 between the front side reading glass 201 and the platen glass 209. As illustrated in FIG. 2, a back side shading white board 102 is disposed on the back side reading glass 101. The front surface shading white board 202 and the back side shading white board 102 are white boards for creating reference data for a white level by shading.

That is, the CPU 321 causes the front side reading unit 210 to read the white board 202 and causes the back side reading unit 110 to read the white board 102 before reading the document, and performs image processing to create front and back reference data. At this time, a read luminance in a pitch black state in which the light source lamps 203*a* and 203*b* (or 103*a* and 103*b*) are turned off is black level reference data. In addition, a read luminance in a pure white state in which the light source lamps 203*a* and 203*b* (or 103*a* and 103*b*) are turned on is white level reference data.

The reference data is acquired from all pixels read in the main scanning direction. The black level reference data acquisition processing is called black shading, and the white level reference data acquisition processing is called white shading. By normalizing a luminance level obtained at the time of reading a document based on the black level reference data obtained by black shading and the white level reference data obtained by white shading, appropriate data can be output as a luminance at the time of reading a document image. This processing is performed on both the front and back sides of the document.

The CPU 321 creates front side reference data by moving the front side reading unit 210 to a position facing the white board 202, and reading the white board 202. In addition, the back side shading white board 102 is attached to the back side reading glass 101 that is movable by the glass motor 123 (see FIG. 3). The CPU 321 creates back side reference data by moving the back side reading glass 101 so that the white board 102 faces the back side reading unit 110, and reading the white board 102. After reading the back side shading white board 102, the back side reading glass 101 is moved to retract the white board 102 from the position facing the back side reading unit 110, thereby enabling document reading.

Figure 6:
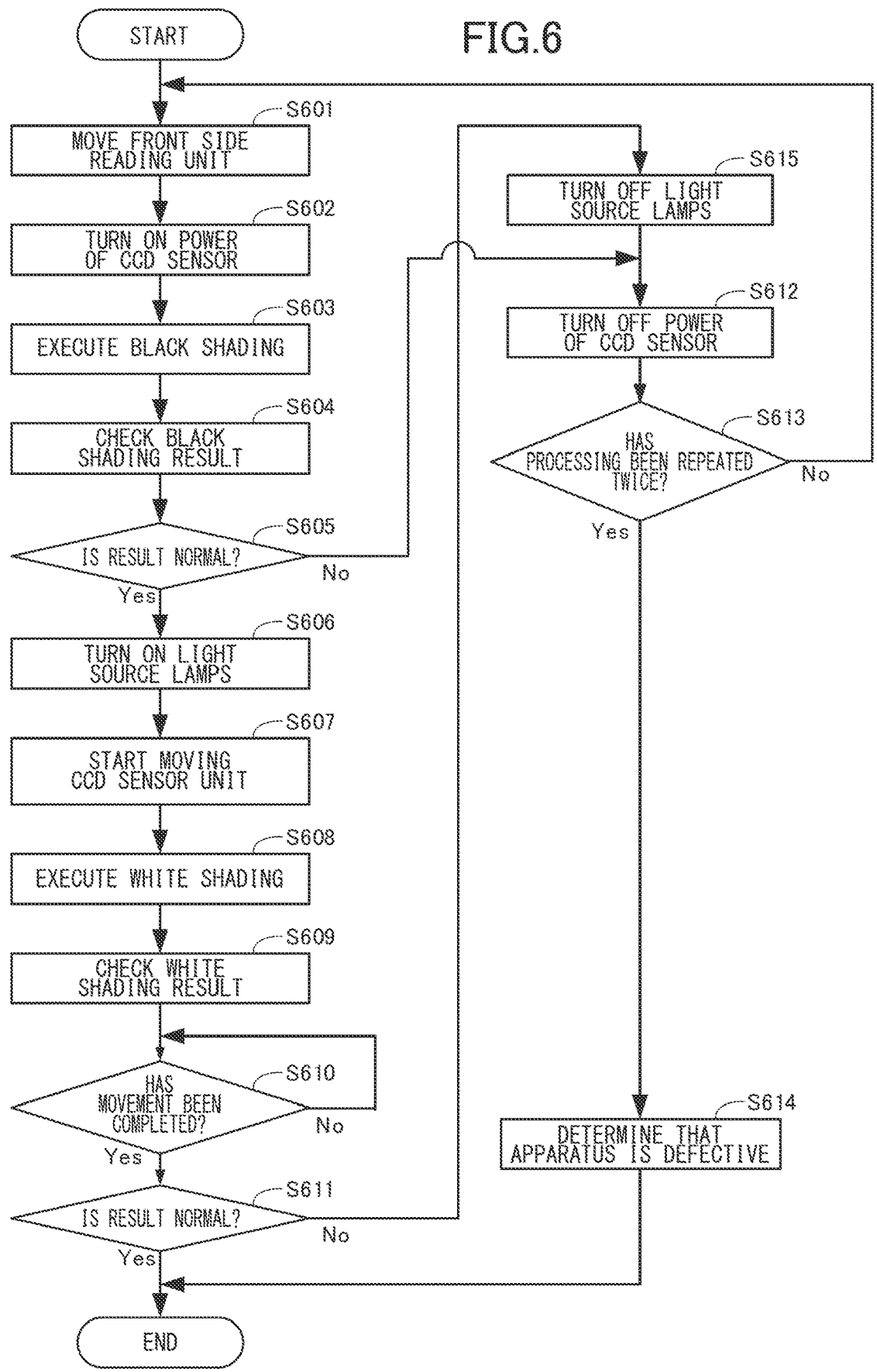
FIG. 6 is a flowchart illustrating shading control.

Next, the shading control of the front side reading unit 210 will be described with reference to a flowchart of FIG. 6. Note that the shading control of the back side reading unit 110 is performed substantially similarly to the shading control of the front side reading unit 210. First, the CPU 321 moves the front side reading unit 210 immediately below the white board 202, and turns on the power of the CCD sensor 211 (S601 and S602). Subsequently, as black shading, the CPU 321 acquires a black level by reading the white board 202 in a state where the light source lamps 203*a* and 203*b* are turned off (S603).

Next, the CPU 321 checks whether the acquired black level is within a desired range (S604). That is, when the black level (luminance) exceeds the predetermined range (S605: No), the CPU 321 determines that the CCD sensor 211 is defective or the position of the front side reading unit 210 is inappropriate, and turns off the power of the front side reading unit 210 (S612). Then, the CPU 321 returns to the processing of step S601 and performs the above-described processing (S601 to S605 and S612) again (S613: No).

This is because, even when the front side reading unit 210 cannot read the white board 202 immediately below the white board 202 due to an unexpected trouble such as electric noise or a catch when the front side reading unit 210 moves, it is desired to avoid that the front side reading unit 210 cannot be used because of the defect of the apparatus immediately. When it is determined that the processing of steps S601 to S605 and S612 has been repeated twice (S613: Yes), the CPU 321 determines that the apparatus is defective (S614), and ends the processing.

When it is determined in step S605 that the black level (luminance) is within the predetermined range (S605: Yes), the CPU 321 turns on the light source lamps 203*a* and 203*b* (S606). Further, the CPU 321 starts moving the front side reading unit 210 from immediately below the white board 202 to the front side flow reading position illustrated in FIG. 2 (S607). While the front side reading unit 210 is moved, the CPU 321 acquires a white level by reading the white board 202 in a state where the light source lamps 203*a* and 203*b* are turned on as white shading (S608).

Next, similarly to the black shading, the CPU 321 checks the acquired white level (S609), and determines whether the movement to the front side flow reading position has been completed (S610). When the movement to the front side flow reading position has been completed (S610: Yes), the CPU 321 determines whether the checked white level is normal (S611). When it is determined that the white level is normal (S611: Yes), the CPU 321 ends the series of steps for shading processing in a state where the light source lamps 203*a* and 203*b* are turned on.

On the other hand, when it is determined that the white level is not normal (S611: No), the CPU 321 turns off the light source lamps 203*a* and 203*b* (S615), and turns off the power of the front side reading unit 210 (S612). Then, the CPU 321 returns to the processing of step S601 and performs the above-described processing (S601 to S611, S615, and S612) again (S613: No). When it is determined that the processing of steps S601 to S611, S615, and S612 has been repeated twice (S613: Yes), the CPU 321 determines that the apparatus is defective (S614), and ends the processing.

Feeding Attachment

Figure 7:
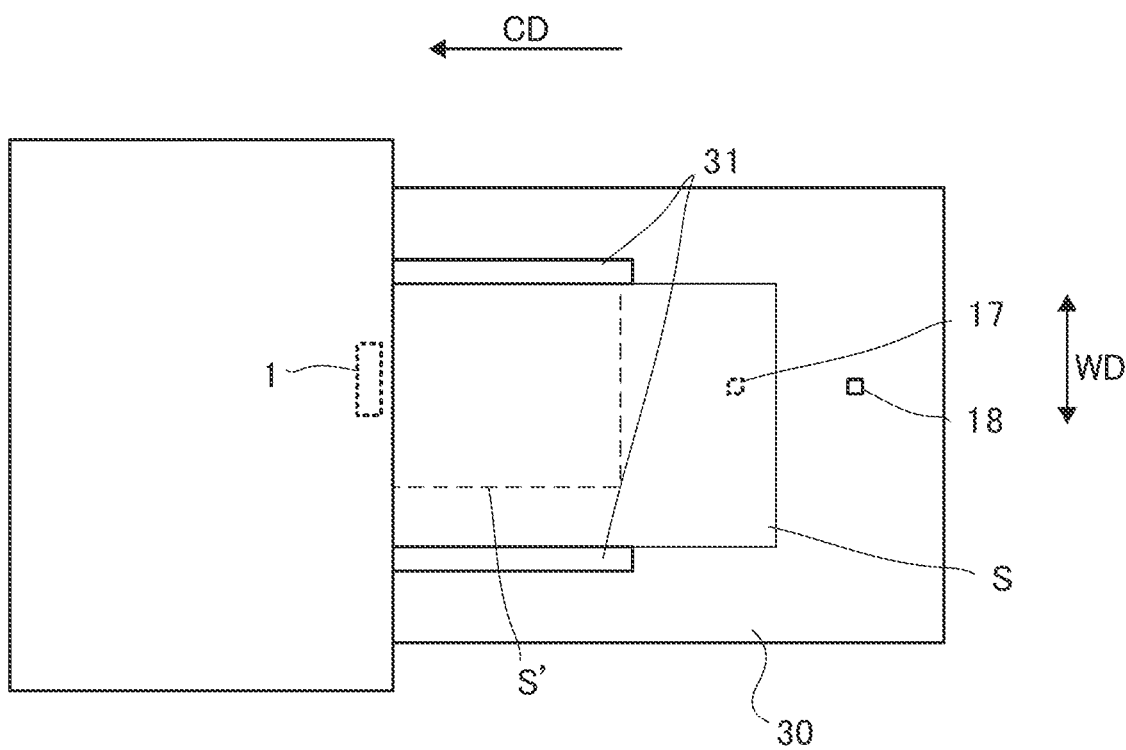
FIG. 7 is a plan view illustrating a feeding attachment.

As illustrated in FIG. 7, a position of a document bundle placed on the document tray 30 is regulated by being sandwiched from between the side regulating plates 31 on both sides. The side regulating plates 31 on the farther side and the closer side move in the width direction WD orthogonal (with tolerance) to the feeding direction CD by and in conjunction with a mechanism (not illustrated) provided in the document tray 30. That is, when the side regulating plate 31 on the closer side moves toward one side in the width direction WD, the side regulating plate 31 on the farther side moves toward the opposite side in the width direction WD.

In order to sandwich the document bundle between the side regulating plates 31 on both sides, the document bundle needs to have a uniform size, but in an actual usage condition, it is required to cope with mix-reading to read the document bundle including documents in a plurality of sizes. Therefore, the side regulating plates 31 are set in accordance with a size of a document having the largest width, and a document S' having a smaller width than the document having the largest width is stacked so that a farther side of the document is aligned with the side regulating plate 31 on the farther side. As a result, skew feeding of the documents can be suppressed at the time of stacking the documents on the document tray 30. Therefore, by disposing the pickup roller 1 on a side (the upper side in FIG. 7) slightly farther than the center position of the document tray 30 in the width direction WD instead of the center position of the document tray 30 in the width direction WD, it is possible to appropriately feed a document having a narrow width when reading a bundle of documents having different sizes. However, any combination of document size is not allowed for mix-reading. That is, a document having a smallest size among the mixed documents needs to be appropriately fed by the pickup roller 1 in a state where the document having the smallest size abuts on the side regulating plate 31 on the farther side.

In addition, since the size of the mechanism that moves the side regulating plates 31 on the farther side and the closer side is restricted and the pickup roller 1 is disposed on a slightly farther side in order to cope with the mix-stacking, a movable range of the side regulating plates 31 is restricted. In the present embodiment, the minimum width of the bundle of documents that can be sandwiched between the side regulating plates 31 is not more than the longitudinal feed size of A6 according to the JIS standard (width: 105.0 mm).

Figure 8A:
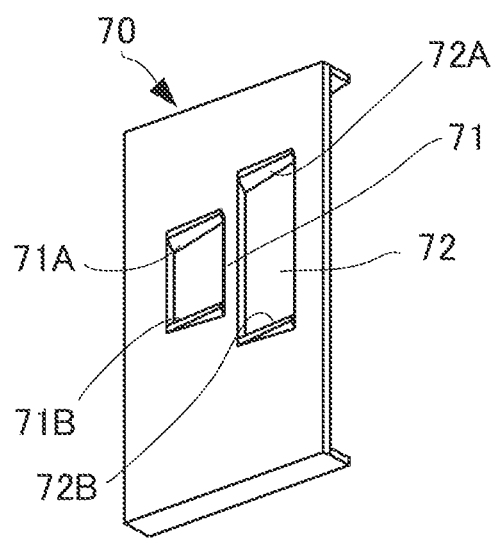
FIG. 8A is a perspective view illustrating the feeding attachment.
Figure 8B:
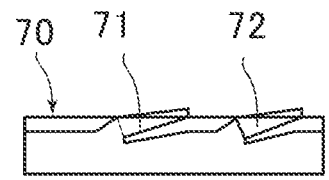
FIG. 8B is a cross-sectional view illustrating the feeding attachment.

Therefore, in order to enable reading of a document having a narrow width such as a receipt or a business card, in the present embodiment, a feeding attachment 70 illustrated in FIGS. 8A and 8B is prepared in such a manner as to be detachable from the document tray 30. The feeding attachment 70 includes a first auxiliary tray 71 on which a document having a smaller size than a document having a minimum size allowed to be placed on the document tray 30 can be placed, and a second auxiliary tray 72 on which a document having a larger size than the document on the first auxiliary tray 71 can be placed. The position of the document placed on the first auxiliary tray 71 in the width direction WD is regulated by guides 71A and 71B. The position of the document placed on the second auxiliary tray 72 in the width direction WD is regulated by guides 72A and 72B.

Figure 9:
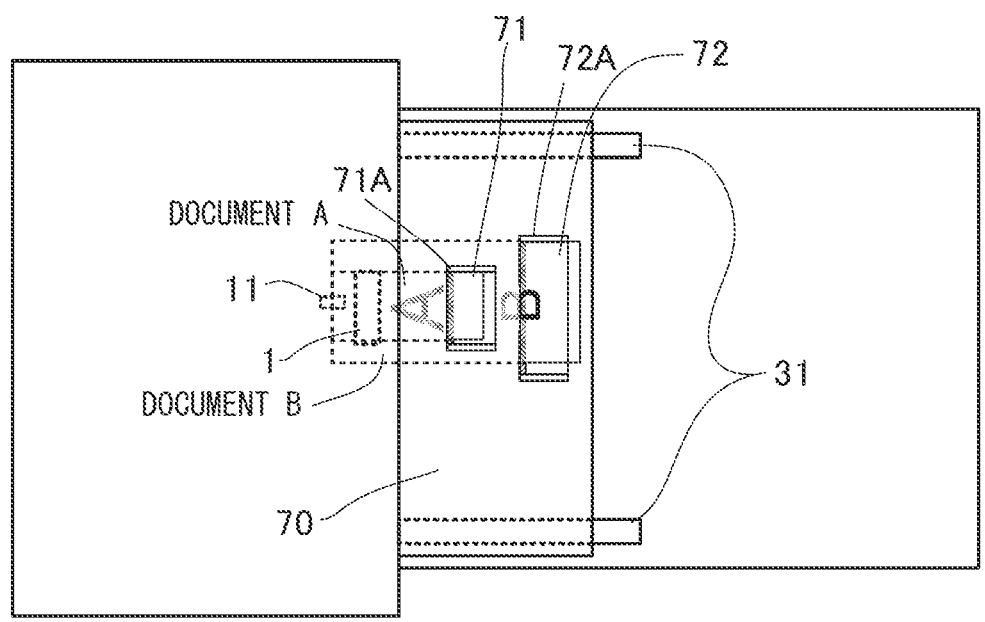
FIG. 9 is a plan view illustrating the feeding attachment attached to a document tray.

The first auxiliary tray 71 on which document A is set in FIG. 9 corresponds to a document having a width of 48 mm to 58 mm, and is intended for a business card or a receipt having a small width. The second auxiliary tray 72 on which document B is set in FIG. 9 corresponds to a document having a width of 58 to 91 mm, and is intended for a receipt having a large width or a check. In other words, the first auxiliary tray 71 is a first stacking portion capable of stacking a document having a first width, and the second auxiliary tray 72 is a second stacking portion capable of stacking a document having a second width larger than the first width.

In addition, the feeding attachment 70 as a stacking unit is formed to have a substantially U-shaped cross section, and is attached to the document tray 30 in such a manner as to cover the document tray 30 from above the side regulating plates 31 such that documents can also be placed in a space inside the feeding attachment 70. In this manner, by attaching the feeding attachment 70 to the document tray 30, a width of a document that can be fed by the document reading apparatus 600 can be reduced to 48 mm. Note that, although the feeding attachment 70 is detachable from the document tray 30 in the present embodiment, the configuration of the feeding attachment 70 is not limited thereto. For example, the feeding attachment 70 may be attached to the document tray 30 so as to be retractable from a position at which the feeding attachment 70 is used when not in use.

Figure 10:
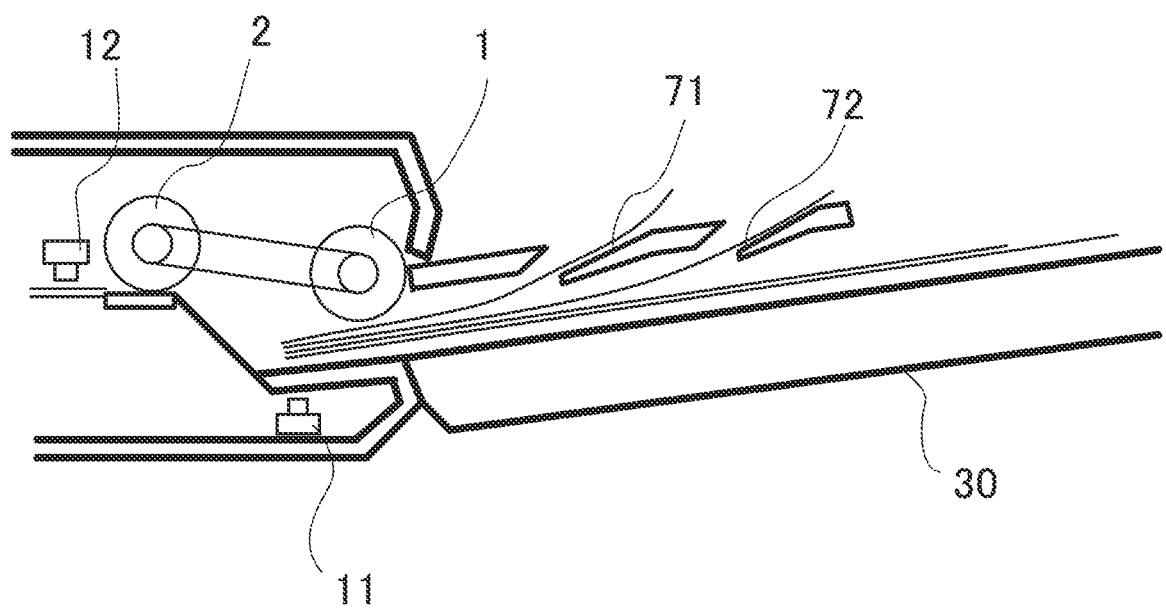
FIG. 10 is a cross-sectional view illustrating an order in which documents are stacked.

When a plurality of documents are placed on the first auxiliary tray 71, the second auxiliary tray 72, and the document tray 30, the form is as illustrated in FIG. 10. According to this configuration, the documents stacked on the first auxiliary tray 71, the second auxiliary tray 72, and the document tray 30 can be sequentially fed to the pickup roller 1. When a job for reading the documents placed on the ADF 100 is executed, the documents stacked on the first auxiliary tray 71 are fed first. When there is no document stacked on the first auxiliary tray 71, feeding of the documents stacked on the second auxiliary tray 72 is started next. When the feeding of all the documents stacked on the second auxiliary tray 72 is completed, feeding of the documents stacked on the document tray 30 is started last. At a time point when the feeding of the documents stacked on the document tray 30 is terminated, the document presence/absence detection sensor 11 detects a document absence state, and a series of reading jobs end.

Detection of Skew Feeding Using Read Image

Figure 11A:
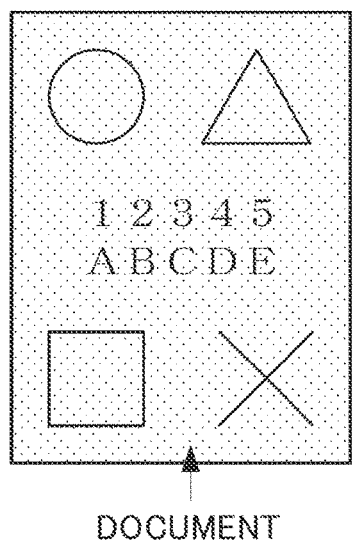
FIG. 11A is a diagram illustrating an image of a document.
Figure 11B:
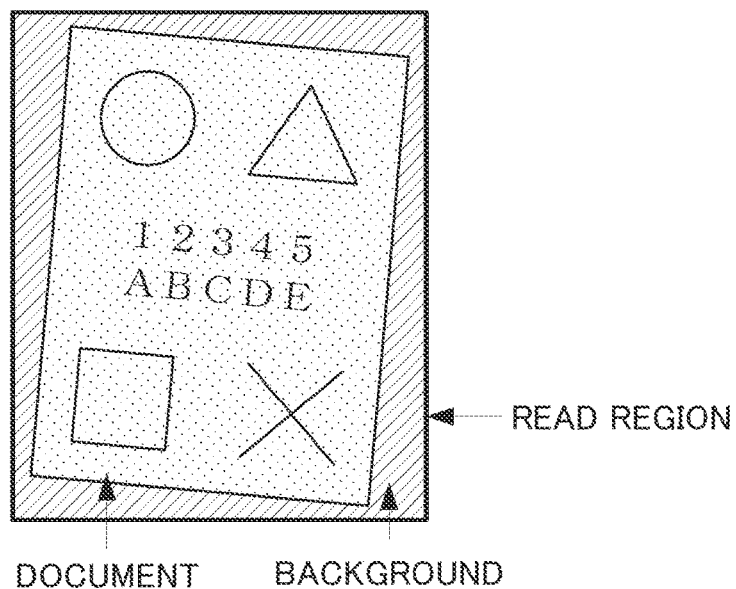
FIG. 11B is a diagram illustrating a read region.

Next, detection of skew feeding (inclination) using a read image and control for correction of the skew feeding will be described. Specifically, as will be described below, when the lead sensor 15 detects a leading edge of a document, the front side reading unit 210 starts reading an image of the document from a timing before the leading edge of the document reaches a reading position on the front side reading glass 201 by a predetermined distance. That is, in order to prevent image chipping resulting from the skew feeding (inclination) of the document, the reading of the image is started before the leading edge of the document detected by the lead sensor 15 reaches the reading position, so that the image is not chipped even at an upper limit of a skew feeding allowable range of the ADF 100. For example, in a case where the image of the document is an image illustrated in FIG. 11A, a read image including not only the document but also the front side glass facing member 6 as a background thereof is obtained as illustrated in FIG. 11B.

Figure 12:
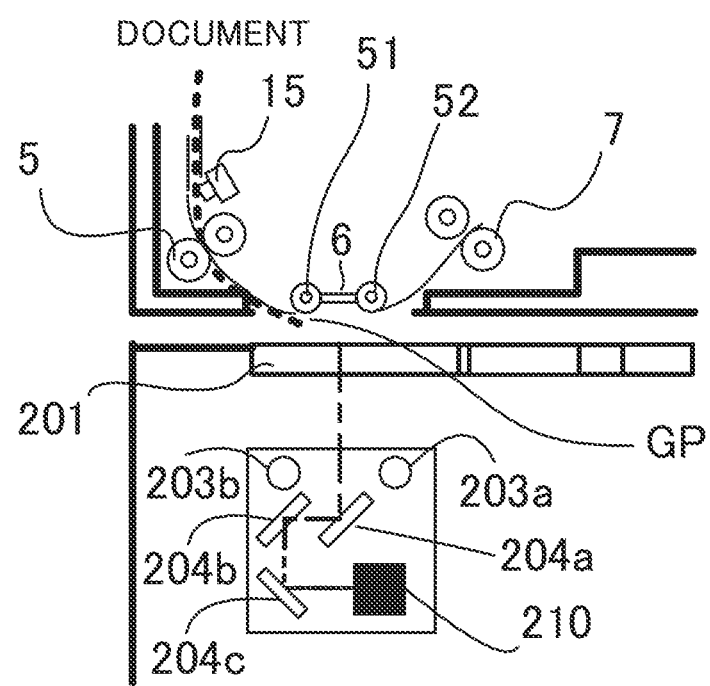
FIG. 12 is a schematic view illustrating a gap between a front side glass facing member and a document.

Thereafter, the skew feeding detection circuit 333 of the image processing unit 325 first extracts a boundary between the document and the front side glass facing member 6 in the read image through image processing. Specifically, since the leading edge of the document is not nipped when the leading edge of the document reaches the front side glass facing member 6, a shadow is generated due to a gap GP between the front side glass facing member 6 and the document as illustrated in FIG. 12. By performing edge extraction processing on the shadow, it is possible to calculate an intersection point between the leading edge portion of the document and the side edge portion of the document and to detect a position, a width, and a skew angle of the document in the read image.

Control of Correction Using Read Image

The image read by the front side reading unit 210 is stored in the image memory 329 as an image in a state where the document is skew-fed. At the time of transmission to the controller unit 400, only the document portion is extracted by the skew feeding correction circuit 334 according to the result of detecting the position, the width, and the skew angle of the document by the skew feeding detection circuit 333. As a result, image data of the document is generated in a skew feeding corrected form.

Figures 13A, 13B:
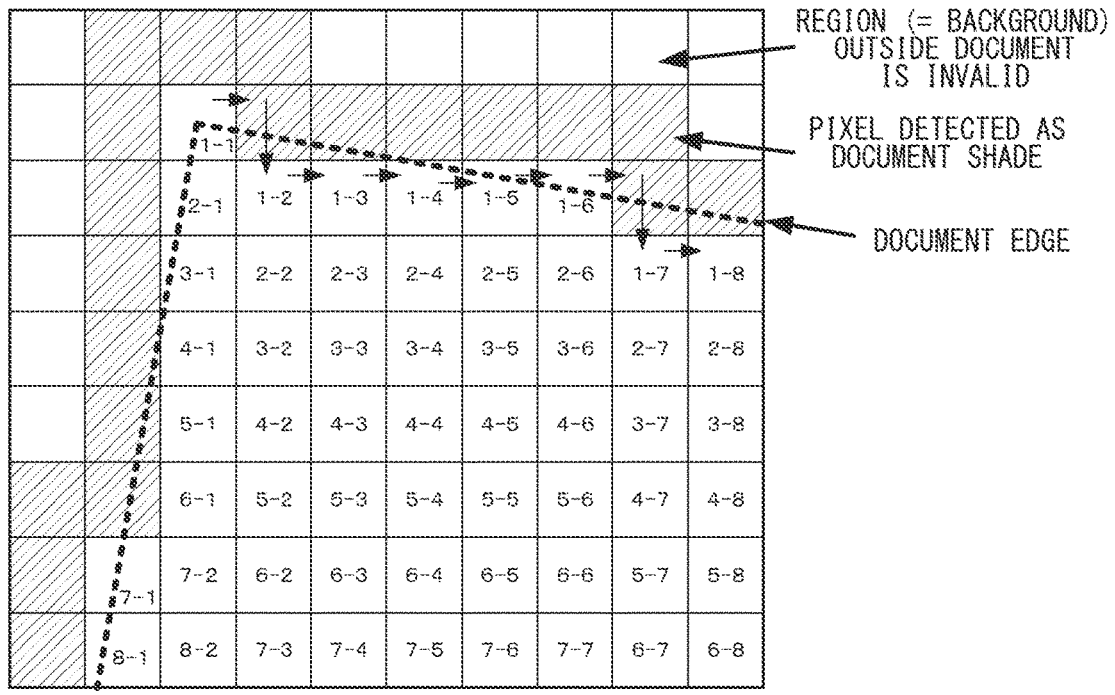
FIG. 13A is a diagram illustrating an order in which pieces of pixel data are transmitted.
FIG. 13B is a diagram illustrating an order in which the received pieces of pixel data are arranged.

This correction method will be described with reference to FIGS. 13A and 13B. Since the width and the skew angle of the document can be detected as described above, the transmission order of pixel data may be controlled as illustrated in FIG. 13A when the image data of the document is transmitted to the controller unit 400. FIG. 13A illustrates the read image as it is, and one square region corresponds to one pixel. As a result of detecting a shadow of an edge portion (dotted line portion) of the document in this image, the edge portion of the document in units of pixels is inside the shaded region. A rectangular region surrounded by four corners of the document (an intersection point between the leading edge of the document and the left edge of the document, an intersection point between the leading edge of the document and the right edge of the document, an intersection point between the trailing edge of the document and the left edge of the document, and an intersection point between the trailing edge of the document and the right edge of the document) is treated as an image in an effective region of the document.

Since a line from the intersection point between the leading edge of the document and the left edge of the document to the intersection point between the leading edge of the document and the right edge of the document corresponds to the leading edge of the document, when image data is sent to the controller unit 400, a Vsync signal, which is a sub-scanning reference signal indicating the head of one page, is transmitted first. Further, after an Hsync signal, which is a signal indicating the head in the main scanning direction, is transmitted, pixel data for one line is sequentially transmitted pixel by pixel from the left edge side of the document as image data. When the transfer of the images for the first one line is completed, the Hsync signal is transmitted again, and then images for the next one line are transferred. Each the areas 1-1, 1-2, 1-3, . . . in FIG. 13A corresponds to one pixel to be transferred to the controller unit 400, and an area m-n (m and n are integers) indicates an n-th pixel from the left edge on an m-th line from the head. Note that, in this example, after a pixel 1-1 is sent, a pixel immediately below a pixel on the right side of the pixel 1-1 is transferred to the controller unit 400 as a pixel 1-2 because the pixel on the right side of the pixel 1-1 is shaded or has already been transferred. A pixel next to the pixel 1-2 is directly sent as a pixel 1-3 because it is not shaded and has not already been transferred.

The controller unit 400 arranges the sent pixels in order line by line as they are, thereby reproducing an image originally present on the document as illustrated in FIG. 13B. In this manner, by controlling the order in which the image data stored in the image memory 329 is transmitted to the controller unit 400, skew feeding can be corrected.

Figure 14:
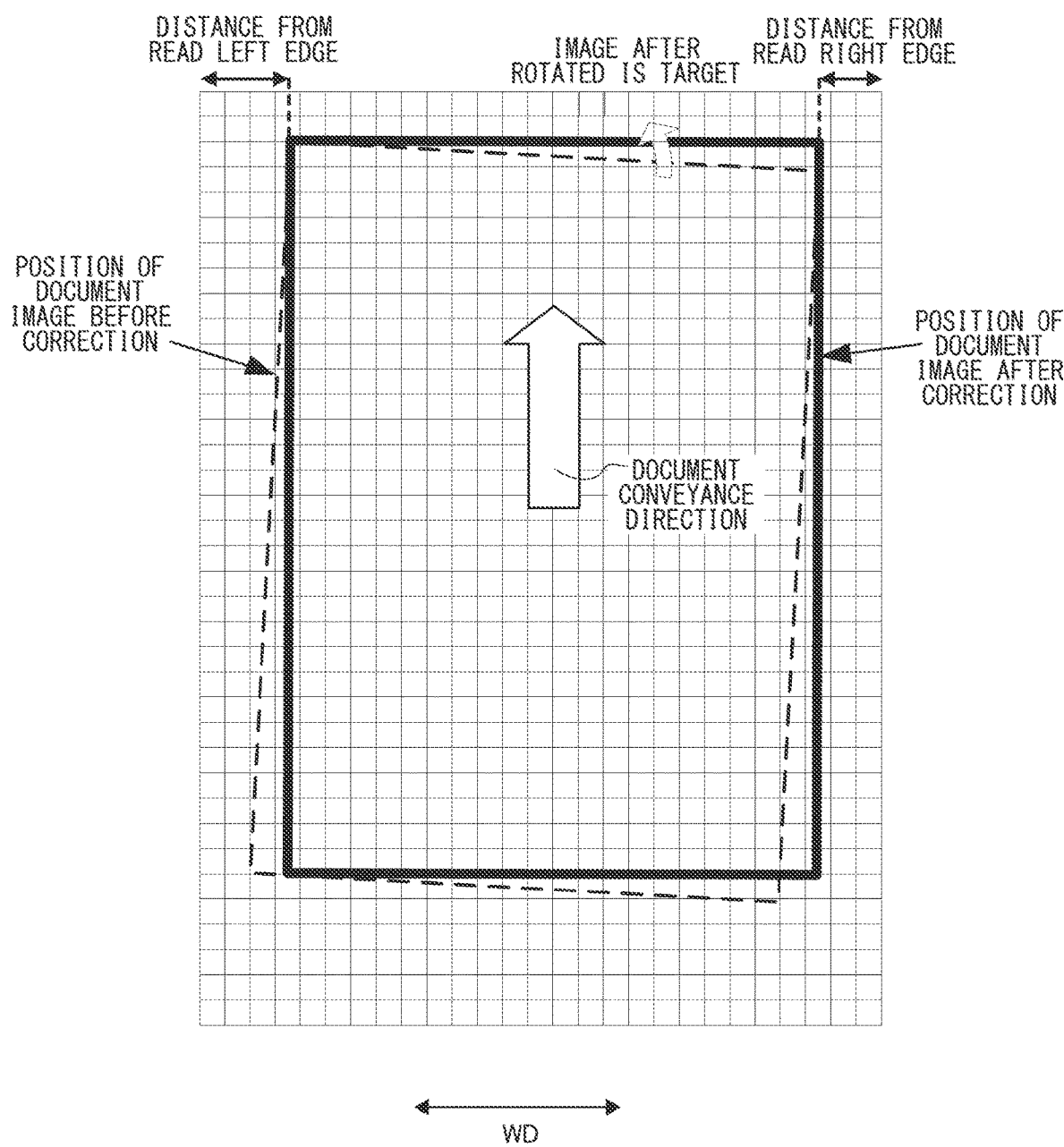
FIG. 14 is a diagram illustrating a document image after rotation correction.

Here, after the correction of the rotation of the document image with respect to the image data, a position of the document at the time of reading the document can be obtained from an intersection between the leading edge and the left edge of the document and an intersection between the leading edge and the right edge of the document in the main scanning direction with respect to the position of the leading edge of the document. As illustrated in FIG. 14, when the document feeding direction CD is a vertical direction in the drawing, the main scanning direction (the width direction WD) is a horizontal direction in the drawing. In FIG. 14, a region surrounded by a solid line is a document image after the correction of rotation. In addition, the upper side of this drawing is a leading edge side of the document in the feeding direction CD, and a distance from the edge portion of the region where reading is actually performed is obtained. The front side reading unit 210 performs reading throughout the entire width in the main scanning direction. As a result, even if the document is skew-fed, reading is performed widely so that a document image does not chip in the main scanning direction.

Switching of Feeding Speed in Bundle of Documents with Mixed Sizes

As described above, when a document having a narrow width is fed, it is necessary to reduce a feeding speed. Therefore, when the document having a narrow width is read with the feeding attachment 70 being attached, a speed at which a sheet is fed by the feeding motor 121 needs to be reduced.

When a job of reading documents placed on the ADF 100 is executed by the operation unit 405, there are various settings regarding designating a document size. For example, as a method of designating a size of a document, the size of the document to be read may be simply designated to a specific size (e.g., A4) as on a screen illustrated in FIG. 15A, or the apparatus may determine a size of an entire bundle of documents to be read based on a size of a first document among the bundle of documents. As another method of designating a size of a document, assuming that a document bundle includes documents in various standard sizes, it may be determined what standard size each sheet has while the documents are being conveyed.

Furthermore, there is a free size mode in which a width and a length of each document sheet are designated or measured for a document bundle that is known as having a non-standard size, and the screen is switched to a screen illustrated in FIG. 15B by selecting the icon "free" in FIG. 15A. As a result, it is possible to select one from among a plurality of modes provided for free size reading. In the present embodiment, a mode for using the feeding attachment 70 is also prepared on the screen illustrated in FIG. 15B, and the mode for using the feeding attachment 70 is set by selecting the icon "use of attachment" in FIG. 15B.

The free size modes illustrated in FIG. 15B include a fixed free size mode in which a size is designated in units of mm in a fixed manner for all the documents to be read during the reading job, and a mixed free size mode. In the mixed free size mode, a width and a length of a document is measured for each sheet based on the skew feeding detection function described above in Section "Detection of Skew Feeding Using Read Image" and the document length detection function with which a length of a document is calculated by measuring a time from the turn-on to the turn-off of the sensor in the conveying path. The mixed free size mode includes two modes: a normal "mixed free size mode" in which the feeding attachment 70 is not used; and a "feeding attachment use mode" in which the feeding attachment 70 is used such that a document having a narrow width is included as a target.

It will be described, with specific numbers, how the "mixed free size mode" and the "feeding attachment use mode" are distinguishably used. In a case where the document bundle only includes documents each having a width of more than 91 mm, it is not necessary to use the feeding attachment 70. Therefore, the documents are stacked on the document tray 30 so that the farther sides of the documents abut on the side regulating plate 31 on the farther side, and the "mixed free size mode" is set. The "mixed free size mode" and the "feeding attachment use mode" are modes in which a plurality of documents having different sizes are fed and read, with the plurality of documents being stacked so that a document having a smaller width in the width direction WD is disposed on a further upward side.

In a case where the document bundle includes documents each having a width of 91 mm or less, the feeding attachment 70 is used. Among them, documents each having a width of 58 mm or less is stacked on the first auxiliary tray 71 to abut on the farther-side guide 71A, and documents each having a width of more than 58 mm and 91 mm or less are stacked on the second auxiliary tray 72 to abut on the farther-side guide 72A. In a case where the document bundle includes a document having a width of more than 91 mm, the document bundle does not fit in the second auxiliary tray 72, and thus, is stacked on the document tray 30. Then, the positions of the side regulating plates 31 are aligned with the document having the largest width in the document bundle, and the documents having the other widths are stacked to abut on the side regulating plate 31 on the farther side. When such document stacking is performed, the "feeding attachment use mode" is set.

When a size other than the "feeding attachment use mode" is selected as a size of a document to be read, the document to be fed from the document tray 30 has a size that does not fit in the second auxiliary tray 72 of the feeding attachment 70 (a document having a width of more than 91 mm). Therefore, according to the table of correspondence between document width and feeding speed illustrated in FIG. 17, the fastest feeding speed can be 590 mm/sec. Meanwhile, a reading speed of the front side reading unit 210 is determined based on a resolution designated at the time of reading, and the feeding speed is determined within a range not exceeding the reading speed. Specifically, according to the table illustrated in FIG. 16, the reading speed of the front side reading unit 210 is determined to correspond to all the designated reading resolutions. For example, when color reading is performed with 300 dpi for main scanning×300 dpi for sub scanning and when black-and-white reading is performed with 600 dpi for main scanning×600 dpi for sub scanning, the fastest reading can be performed at 590 mm/sec. If the other reading resolutions are designated, reading cannot be performed at 590 mm/sec, and accordingly, the feeding speed is reduced to correspond to the reading speed.

When the "feeding attachment use mode" is selected as a size of a document to be read, it is considered that documents are placed not only on the document tray 30 but also on one or both of the first auxiliary tray 71 and the second auxiliary tray 72 as a document stacking position. Therefore, as illustrated in the table of FIG. 17, it is necessary that the feeding speed corresponds to the document width. Here, the feeding speed varies depending on the document width, with the feeding speed being assigned according to the width of each of a plurality of trays prepared in the device. Note that the feeding attachment 70 is not provided with a document presence/absence detection sensor that detects whether there is a document in the first auxiliary tray 71 and the second auxiliary tray 72 in order to be easily detachable from the document tray 30.

Therefore, as described above in Section "Detection of Skew Feeding Using Read Image", a document width is determined by reading the image of the document, and the feeding speed is switched according to a result of determining the document width. While documents are fed from the first auxiliary tray 71, the second auxiliary tray 72, and the document tray 30 in this order as illustrated in FIG. 10, the feeding speed is faster as the document width W is larger as illustrated in FIG. 17. Therefore, it can be determined from the read image of the document that the feeding location has been switched and the width of the document to be fed has increased, thereby increasing the document feeding speed from the next document although the document from which the feeding location is switched is fed slowly. With this processing, in the configuration in which the upper limit of the feeding speed varies depending on the document width, the feeding speed can be appropriately increased even in a case where a bundle of documents having mixed sizes are read.

Flow of Processing Performed by CPU for Reading Document

Next, processing performed by the CPU 321 for a document reading job in the "feeding attachment use mode" will be described. As will be described below, the CPU 321 performs processing of switching the feeding speed for the next document according to the read image of the document. During such a document reading job, a plurality of documents are simultaneously conveyed into the ADF 100, and control is performed to switch the feeding speed as necessary.

Overall Control of Document Reading Apparatus

Figure 18:
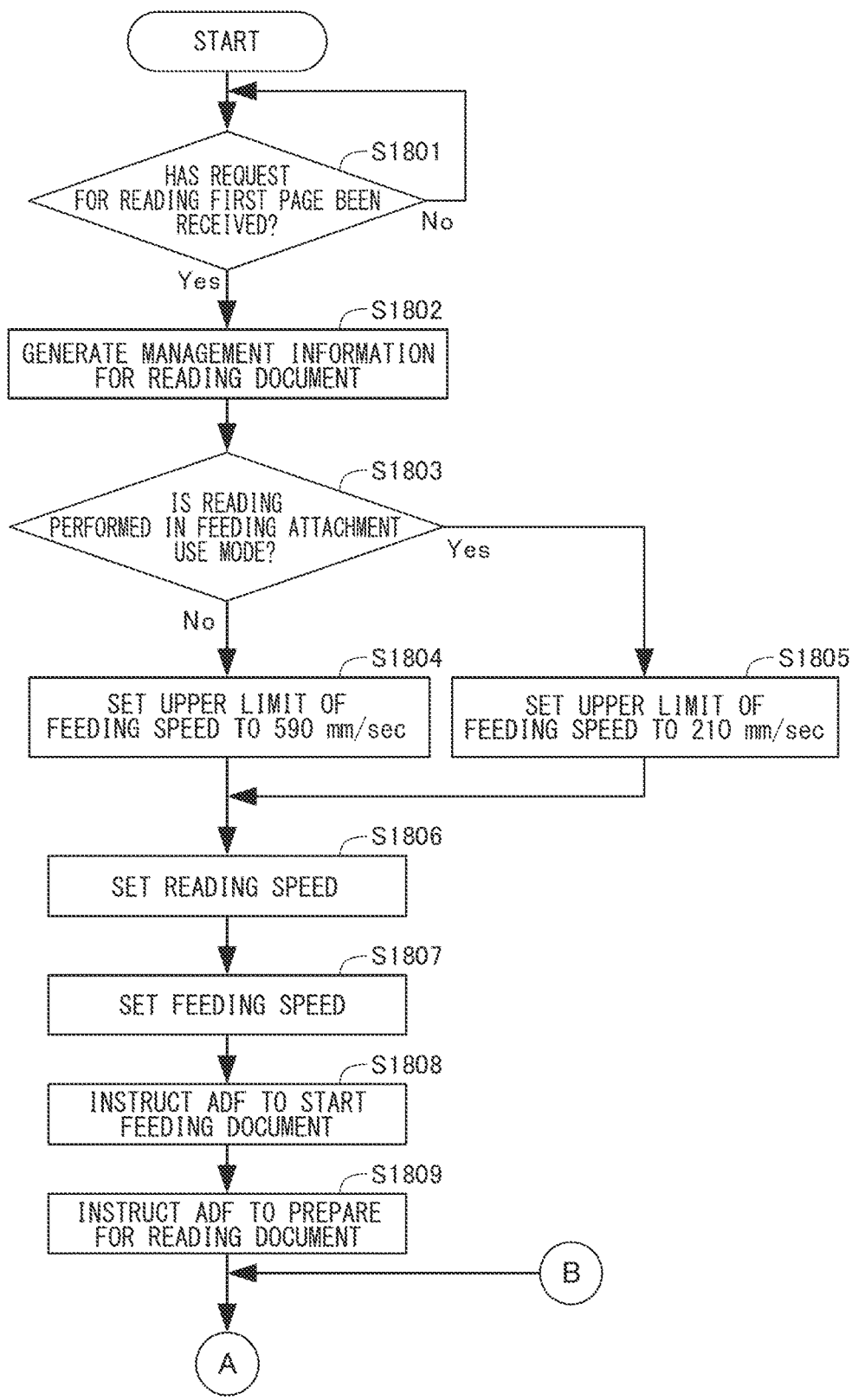
FIG. 18 is a flowchart illustrating overall control of the document reading apparatus.
Figure 19:
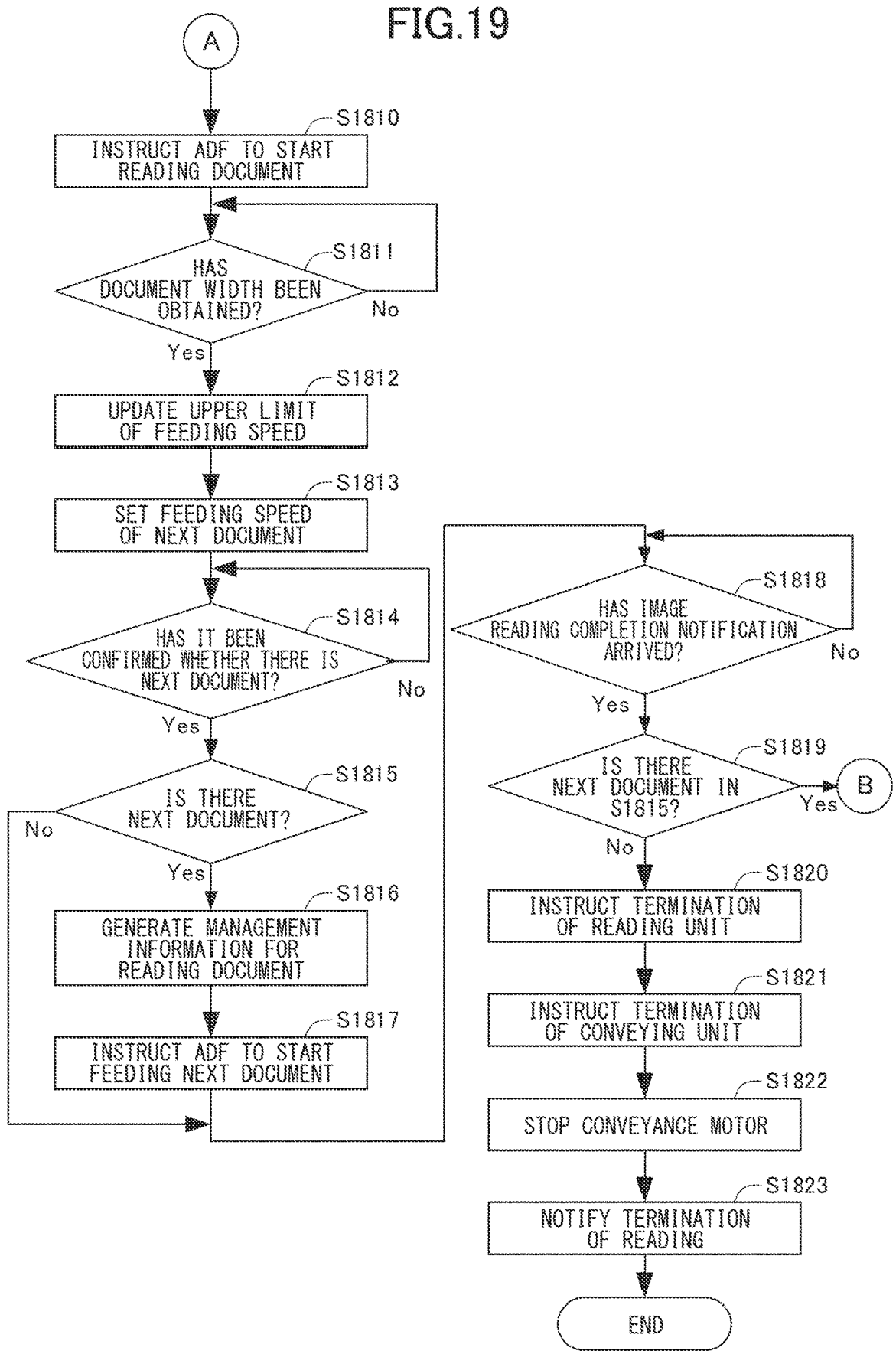
FIG. 19 is a flowchart illustrating overall control of the document reading apparatus.

FIGS. 18 and 19 are flowcharts illustrating overall control performed by the document reading apparatus 600 for document reading. As illustrated in FIG. 18, the CPU 321 first determines whether a request for reading a first page has been received (S1801). When it is determined that the request for reading the first page has been received (S1801: Yes), the CPU 321 generates overall management information of the document reading apparatus 600 and page management information for reading the first document on the RAM 323 (S1802).

As illustrated in FIG. 28, the overall management information of the document reading apparatus 600 includes selection of color/black and white, designation of a resolution of a document to be read, a position at which a document is placed which is either the platen glass 209 or the document tray 30, a method of determining a size of a document to be read, a reading speed, and the like. As illustrated in FIG. 29, the page management information is a block of information used for controlling the documents sheet by sheet, such as not only a page number for identifying a document to be read but also selection of color/black and white and a detected size of a document. The CPU 321 controls reading and conveyance of the documents with reference to the page management information.

Next, the CPU 321 determines whether the read size determination method is the "feeding attachment use mode" with respect to the generated management information (S1803). The user performs settings on the screen displayed on the operation unit 405 illustrated in FIGS. 15A and 15B, and the CPU 321 sets a read size determination method for a document reading job in accordance with a flowchart illustrated in FIG. 30 based on the settings performed by the user.

Figure 30:
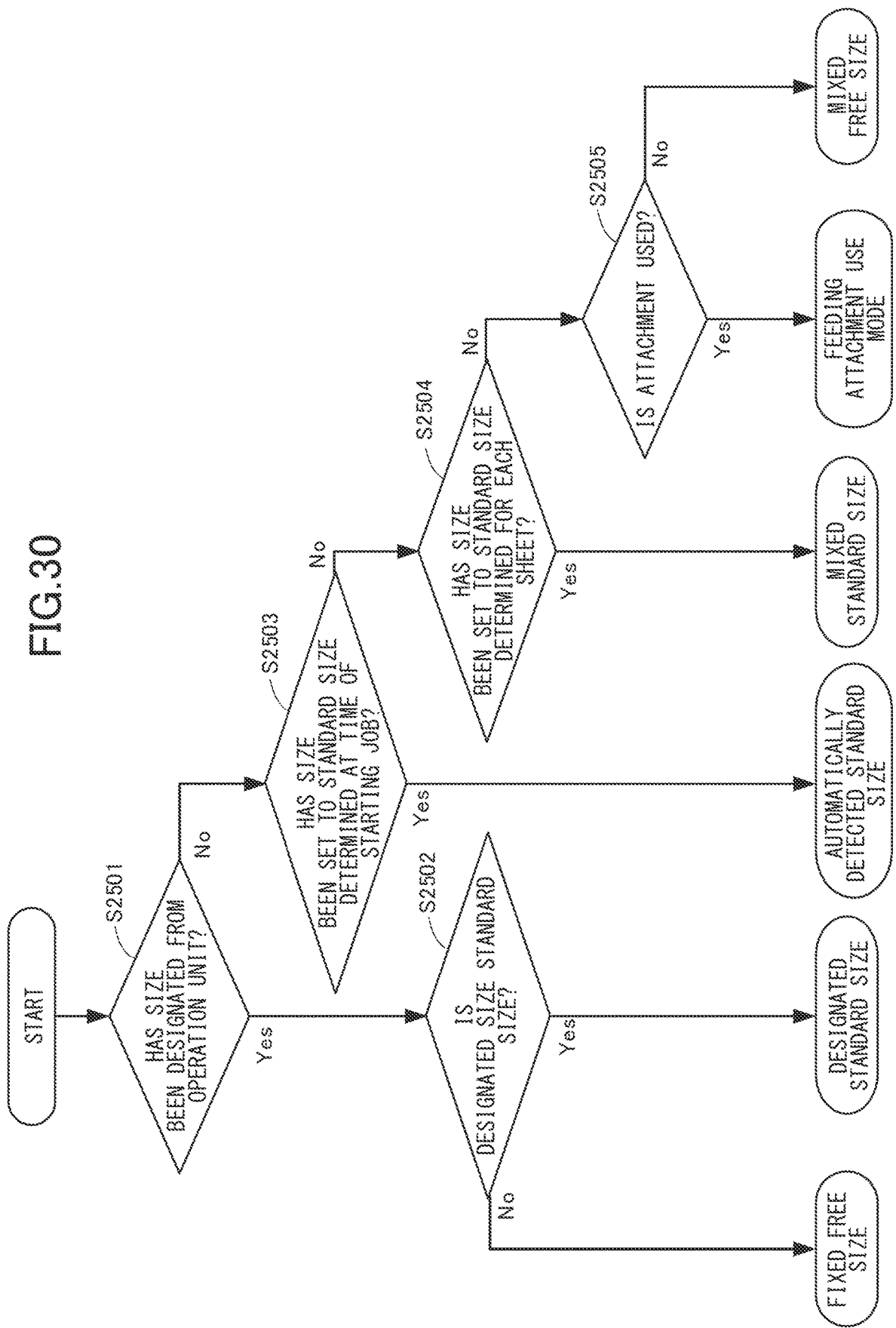
FIG. 30 is a flowchart illustrating a read size determination method.

As illustrated in FIG. 30, the CPU 321 first determines whether the user has designated a read size for a document reading job from the operation unit 405 (S2501). When it is determined that the read size has been designated from the operation unit 405 (S2501: Yes), the CPU 321 determines whether the read size has been designated from among a plurality of standard sizes prepared in advance (S2502).

When it is determined that the read size has been designated from among the standard sizes (S2502: Yes), the CPU 321 sets the read size determination method for the document reading job to the "designated standard size mode". When it is determined that the read size has not been designated from among the standard sizes (S2502: No), the CPU 321 sets the read size determination method for the document reading job to the "fixed free size mode".

In step S2501, when it is determined that the user has not designated the read size for the document reading job from the operation unit 405 (S2501: No), the CPU 321 determines a document size at the time of starting the job or while reading a document image. Then, the CPU 321 determines whether the read size for the document reading job is set to a standard size determined at the time of starting the job (S2503). The case where the standard size determined at the time of starting the job is set is a case where the user has designated the icon "automatic (uniform)" on the screen in FIG. 15A. That is, in a case where all the plurality of documents constituting the document bundle have the same size which is a standard size, the user designates the icon "automatic (uniform)".

In this case (S2503: Yes), the CPU 321 automatically determines a size of the documents on the document tray 30 at the time of starting the job from among the standard sizes using the detection result of the size detection sensor 130, and sets the "automatically detected standard size mode".

When it is determined that the size is not a standard size determined at the time of starting the job (S2503: No), this is a case where the user has designated the icon "mixed" or the icon "free" on the screen in FIG. 15A. That is, when it is known in advance that a plurality of documents constituting a document bundle have a plurality of standard sizes such as A4 and A3, the user designates the icon "mixed" on the screen illustrated in FIG. 15A (S2504: Yes). As a result, the CPU 321 sets the read size determination method for the document reading job to the "mixed standard size mode" in which the size of each sheet of document being conveyed is determined as one of the standard sizes.

In addition, when the plurality of documents constituting the document bundle have various sizes that are not standard sizes, the user designates the icon "free" on the screen illustrated in FIG. 15A (S2504: No). Then, when the feeding attachment 70 is used (S2505: Yes), the icon "use of attachment" on the screen illustrated in FIG. 15B is designated, and the CPU 321 sets the read size determination method to the "feeding attachment use mode", which will be described below. When the feeding attachment 70 is not used (S2505: No), the icon "mixed" on the screen illustrated in FIG. 15B is designated, and the CPU 321 sets the read size determination method for the document reading job to "mixed free sizes".

The "feeding attachment use mode" is set when the smallest document in the document bundle has a width sufficiently smaller than the portrait feed size of A6 which is a smallest size among the standard sizes. The "mixed free size" is set when the smallest document in the document bundle has a width equal to or sufficiently larger than the portrait feed size of A6 and is not enough to use the feeding attachment 70.

Returning to step S1803 of FIG. 18, when the read size determination method is the "feeding attachment use mode" (S1803: Yes), the CPU 321 sets the upper limit of the feeding speed to 210 mm/sec, which is the slowest speed in FIG. 17 (S1805). This is because, in a case where the "feeding attachment use mode" is set, since the feeding attachment 70 is attached to the document tray 30, it is highly likely that a document having a narrow width is fed, and it is required to set feeding to correspond to a minimum document width of 48 mm. In a case where a document having a narrow width is fed, the document is likely to be skew-fed or its leading edge portion is likely to buckle, and therefore, it is necessary to reduce the feeding speed.

Conversely, in a case where the read size determination method for the document reading job is not the "feeding attachment use mode" (S1803: No), the CPU 321 sets the upper limit of the feeding speed to 590 mm/sec (S1804). This is because, in a case where the "feeding attachment use mode" is not set, since the feeding attachment 70 is not attached to the document tray 30, it is highly likely that a document having a width large to some extent is fed.

Next, the CPU 321 sets a reading speed from the relationship between the resolution and the read color in the reading job based on the table illustrated in FIG. 16 (S1806). Since the document is conveyed at the same speed as the conveyance of the document from the pull-out roller pair 3 to the reading position, the conveying speed caused by the conveyance motor 122 is also set to be equal to the reading speed.

Next, the CPU 321 sets the feeding speed so that the feeding speed of the pickup roller 1 and the separation roller 2 is equal to or lower than the conveying speed (=reading speed) of the pull-out roller pair 3 driven by the conveyance motor 122. Therefore, the feeding speed needs to satisfy the following two upper limits (1) and (2).

$$\text{Feeding speed} \leq \text{reading speed} \tag{1}$$

$$\text{Feeding speed} \leq \text{upper limit of feeding speed} \tag{2}$$

Furthermore, it is necessary to increase the feeding speed as much as possible to shorten the reading time. When the reading speed is smaller than the upper limit of the feeding speed, the following calculation formula is obtained.

$$\text{Feeding speed} = \text{reading speed} < \text{upper limit of feeding speed} \tag{3}$$

In addition, when the reading speed is equal to or higher than the upper limit of the feeding speed, the following calculation formula is obtained.

$$\text{Feeding speed} = \text{upper limit of feeding speed} \leq \text{reading speed} \tag{4}$$

For example, a case is considered in which in the "feeding attachment use mode" the feeding speed for reading a color with a reading resolution of 300 dpi for main scanning×600 dpi for sub scanning is required at the time of starting a reading job. At this time, since the feeding attachment use mode is set, the upper limit of the feeding speed is 210 mm/sec in step S1805. In addition, according to FIG. 16, the reading speed determined from the reading resolution is 340 mm/sec. Therefore, (reading speed)=340≥(upper limit of feeding speed)=210, which corresponds to Formula (4), and thus, 210 mm/sec is obtained as the feeding speed.

Figure 24:
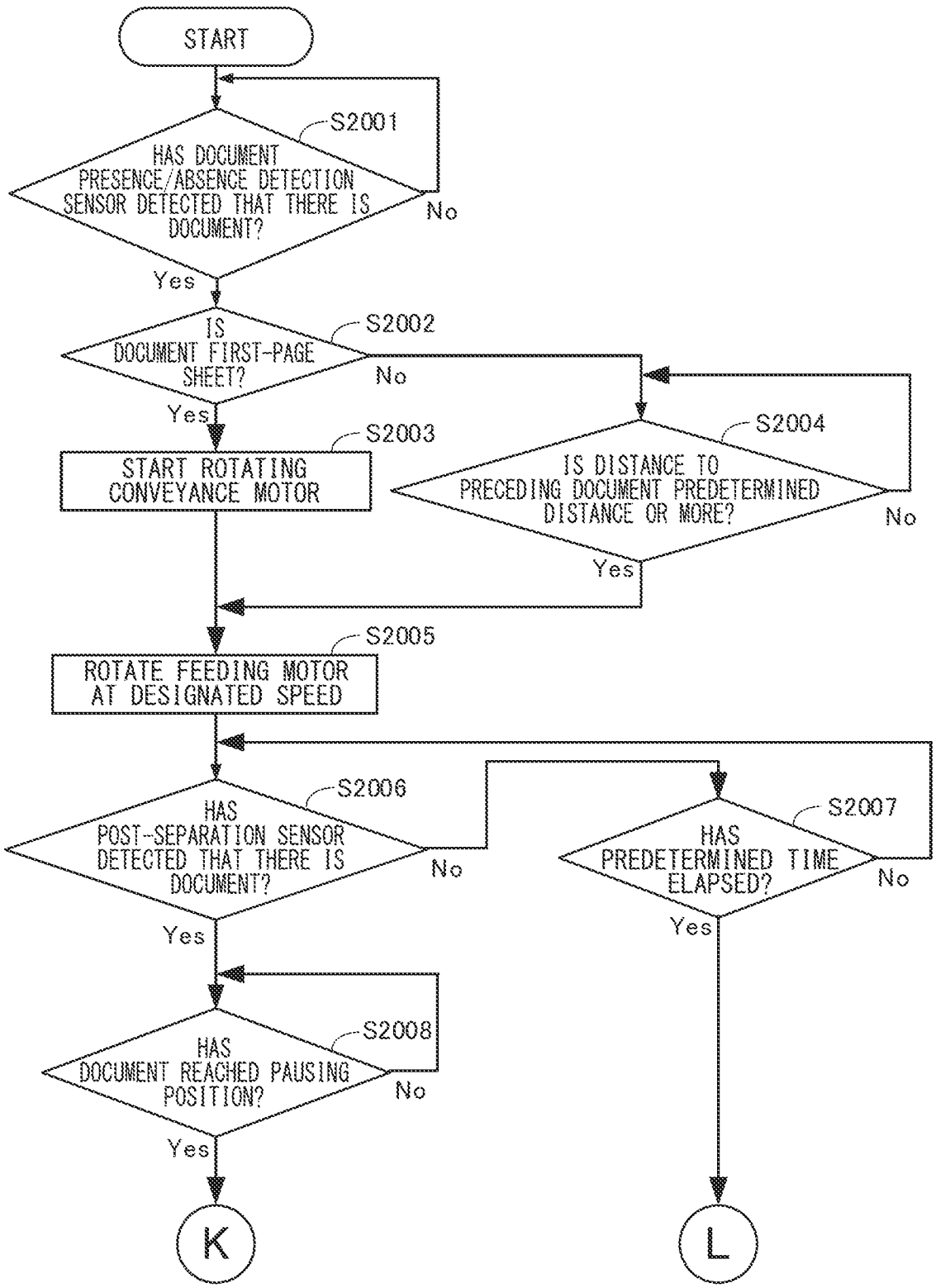
FIG. 24 is a flowchart illustrating conveyance processing.

When the feeding speed is set in step S1807, the CPU 321 instructs the ADF 100 to start feeding the document, prepare for reading the document, and start reading the document (S1808, S1809, and S1810). The ADF 100 conveys the document in a sequence illustrated in FIGS. 24 to 26 to convey a leading edge of the document to the front side flow reading position. In addition, the CPU 321 of the ADF 100 reads an image of the document in a sequence illustrated in FIGS. 20 to 23.

By reading the image of the document, a width of the document is detected through the edge extraction processing described above, such that the CPU 321 can obtain the document width (S1811: Yes). In other words, the CPU 321 obtains a width of the document in the width direction WD based on the image of the document read by the front side reading unit 210. From the obtained document width, the CPU 321 estimates which tray of the feeding attachment 70 the document conveyed this time is fed from. In the table of the relationship between the document width and the feeding speed illustrated in FIG. 17, the document width has a value corresponding to a width of the first auxiliary tray 71, the second auxiliary tray 72, or the document tray 30 of the feeding attachment 70. As an example, when the document width obtained in step S1811 is 55 mm, it is estimated that the document conveyed this time is fed from the first auxiliary tray 71 corresponding to a document having a width of 48 mm to 58 mm.

Next, the CPU 321 updates the upper limit of the feeding speed according to the obtained document width (S1812). For example, it is assumed that, although the upper limit of the feeding speed is originally set to 210 mm/sec in step S1805 at the time of starting the job, the document width obtained in step S1811 is larger than the upper limit (58 mm) of the width that can be set in the first auxiliary tray 71. Since this document cannot be set on the first auxiliary tray 71, it can be seen that there is no remaining document on the first auxiliary tray 71. Therefore, as a feeding speed at the time of feeding the document from the second auxiliary tray 72, the upper limit of the feeding speed can be increased to 300 mm/sec from the table of FIG. 17.

Similarly, at a time point when it is found that the document width obtained in step S1811 is a width that can be set only in the document tray 30, it can be seen that there is no remaining document on the second auxiliary tray 72. Therefore, since the document is fed from the document tray 30 this time, the upper limit of the feeding speed can be further increased to 590 mm/sec.

In this manner, by updating the upper limit of the feeding speed according to the document width obtained through image reading, the CPU 321 sets (updates) the feeding speed of the next read document (S1813). That is, in a case where documents are set on two or more of the first auxiliary tray 71, the second auxiliary tray 72, and the document tray 30, a new document width is obtained when no document is read from one of the trays, and a first document on the next tray is read. Then, by updating the upper limit of the feeding speed based on the new document width, a feeding speed of a next document (a second document on the tray) can be changed in an acceleration direction. As a result, a time from the start of feeding of the document to the start of pulling out the document by the pull-out roller pair 3 can be shortened, thereby improving productivity.

Next, the CPU 321 waits until the pull-out sensor 13 detects no document, that is, the trailing edge of the document passes the position of the pull-out sensor 13, and refers to a result of detecting whether there is a document using the document presence/absence detection sensor 11 at that time point (S1814 and S1815). When it is determined that there is no next document on the document tray 30 or the feeding attachment 70 (S1815: No), the CPU 321 proceeds to step S1818 without performing new document feeding processing.

When it is determined that there is a next document on the document tray 30 or the feeding attachment 70 (S1815: Yes), the CPU 321 generates next page management information (S1816) and instructs the ADF 100 to start feeding a next document (S1817). The feeding speed at this time reflects the result of setting the feeding speed in step S1813.

Then, when the reading of the document is completed and an image reading completion notification arrives at the CPU 321 (S1818: Yes), the CPU 321 checks whether it has been determined in step S1815 that there is a next document. When it has been determined in step S1815 that there is a next document (S1819: Yes), the processing returns to step S1810. When it has been determined in step S1815 that there is no next document (S1819: No), the CPU 321 issues an instruction for termination to the document reading control unit and the conveyance control unit (S1820 and S1821) and stops the conveyance motor 122 (S1822). Further, the CPU 321 notifies the controller unit 400 of termination of reading (S1823), and ends the processing.

Parallel Processing of Multiple Controls

The flowchart described so far is related to overall control for document reading. The CPU 321 executes flowcharts of processes performed by the image reading control unit and the image conveyance control unit of the document reading apparatus 600 substantially in parallel in a time-division manner. The control according to the image reading control unit will be described with reference to FIGS. 20 to 23, and the conveyance processing for each sheet of document according to the conveyance control unit will be described with reference to FIGS. 24 to 27.

When both sides are read, the image reading control unit simultaneously executes both of the flowchart for front side reading performed by the front side reading unit 210 and the flowchart for back side reading performed by the back side reading unit 110. The conveyance control unit executes the flowchart for conveyance processing whenever an instruction to feed a document is issued, and the conveyance processing ends when the document has been discharged. In this manner, the CPU 321 executes a plurality of flowcharts to be processed in a time-division manner, and how to process the plurality of flowcharts will be described below with reference to FIG. 31.

The CPU 321 causes the processes to be described in the respective flowcharts to exist as respective tasks by software such as a multi-task OS, and executes the respective tasks by time division processing. Specifically, the CPU 321 monitors the respective tasks such as processes in a time-division manner, and switches to another process (document conveyance, reading unit, or overall control) when a process of standing by for a predetermined time is required during each task such as the process for document conveyance or the process for the reading unit. As a result, it is possible to perform processes necessary for reading both sides of a plurality of sheets of documents in parallel.

Figure 31:
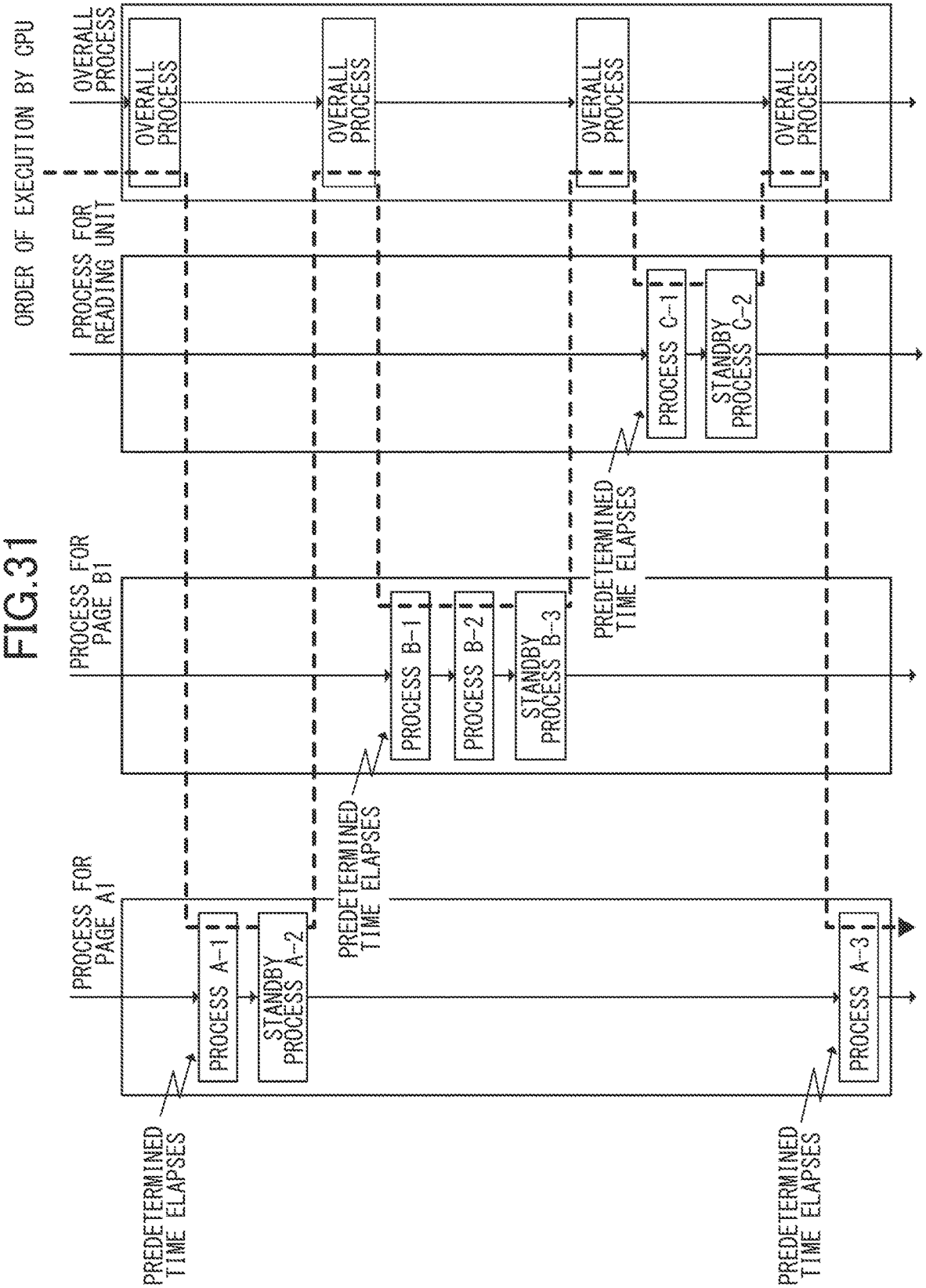
FIG. 31 is a diagram for explaining parallel processing of multiple controls.

For example, as illustrated in FIG. 31, the CPU 321 performs four processes including a process for page A1, a process for page B1, a process for the reading unit, and an overall process in parallel. The process for the reading unit includes reading processing for the front side reading unit 210.

In the sequence of the overall processing, there are several standby processes such as waiting for the confirmation of the document width in step S1811, waiting for the confirmation of whether there is a next document in step S1814, and waiting for an image reading completion notification in step S1818 of FIG. 19. During this time, the CPU 321 monitors and executes each task existing in the time division processing, and switches the task executed by the CPU 321 when a predetermined standby time elapses for each task. When the predetermined processing for each task is completed, the CPU 321 executes processing for the next task according to an order in which the standby tasks are to be processed.

In a case where all the other tasks are in the standby state, the task for performing the overall process is in the standby state by repeating simple loop processing (S1811, S1814, and S1818) and wait for the content to be processed during another task to occur.

As an example, as illustrated in FIG. 31, it is assumed that the process for page A1 includes processes A-1, A-2, and A-3, the process for page B1 includes processes B-1, B-2, and B-3, and the process for the reading unit includes processes C-1 and C-2. Here, when the standby process A-2 is executed after the process A-1 is executed, the CPU 321 executes the overall process because the other pages are also in the standby state. Then, when the standby for the predetermined time ends in the process for the page B1, the overall process is stopped and the process B-1 is executed. Similarly, when the standby process B-3 for the page B1 is executed, the processing returns to the execution of the overall process, and the processing transitions to the process C-1 at a time point when the standby for the predetermined time ends in the process for the front side reading unit. In this manner, the CPU 321 executes the page A1 conveying process, the page B1 conveying process, the process for the reading unit, and the overall process in parallel.

Control for Reading Unit

Figure 20:
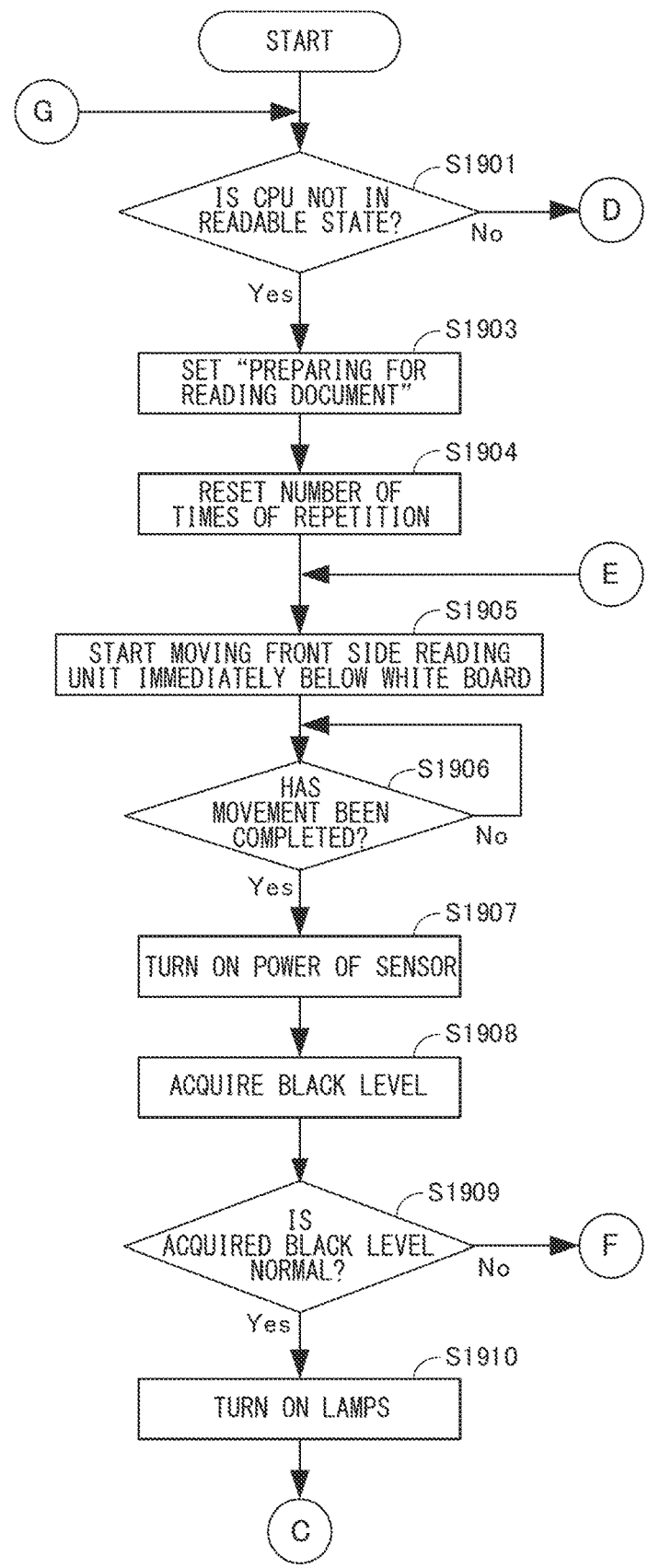
FIG. 20 is a flowchart illustrating image reading control.
Figure 21:
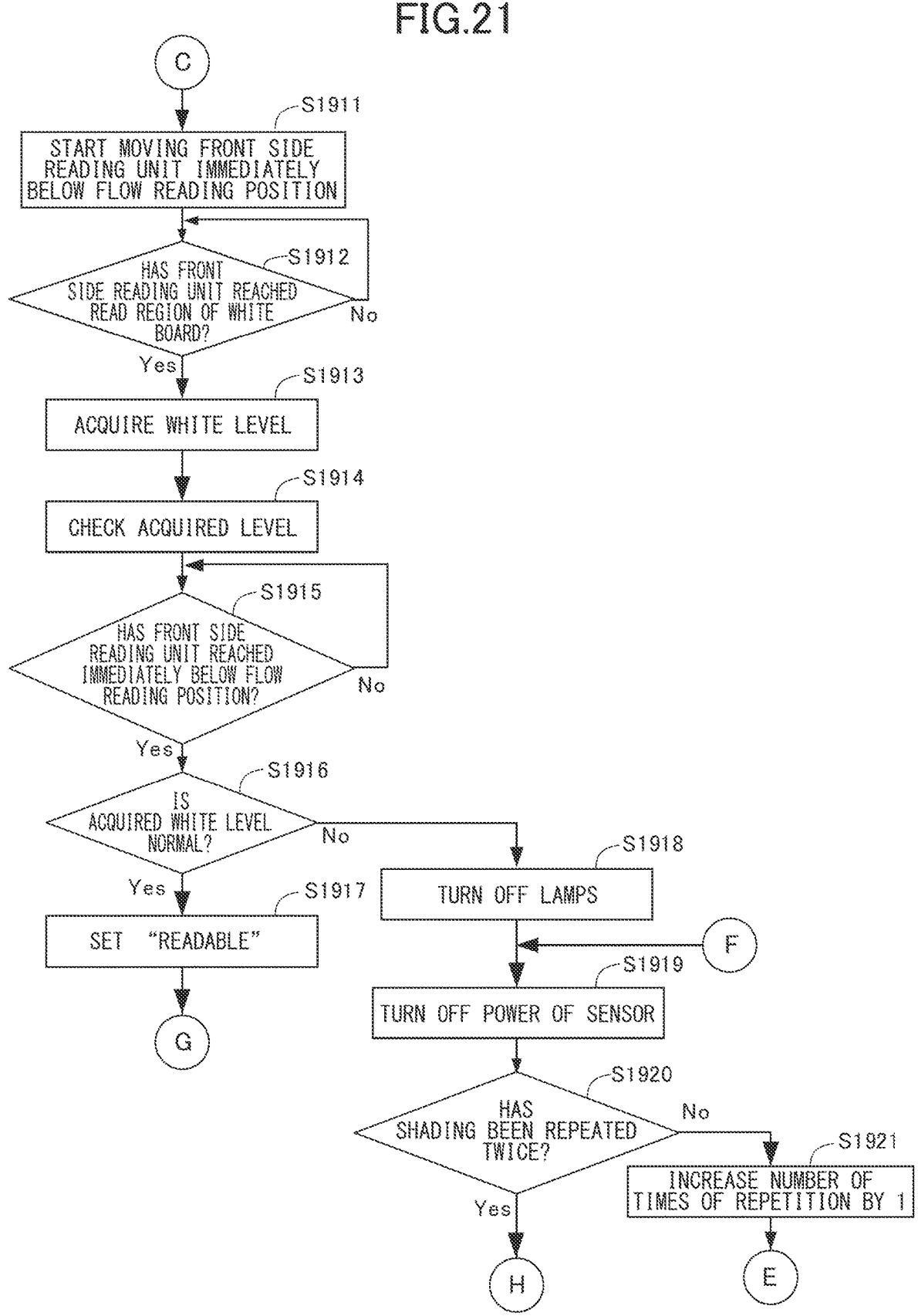
FIG. 21 is a flowchart illustrating image reading control.

Next, a process for the document reading unit will be described with reference to flowcharts of FIGS. 20 to 23. The process for the document reading unit is started in response to an instruction to prepare for reading a document in step S1809 of FIG. 18. As illustrated in FIG. 20, when a read request is received, the CPU 321 is not yet in a readable state (S1901: Yes). For this reason, the CPU 321 instructs the reading unit to prepare for reading a document based on the management information generated in step S1802, and changes the state to "preparing for reading a document" (S1903).

Then, the CPU 321 resets the number of times shading control is repeated to 0 (S1904), and starts moving the front side reading unit 210 immediately below the white board 202 (S1905). In the normal state, the front side reading unit 210 is positioned immediately below the white board 202 and thus does not need to be moved. However, the movement processing is executed in step S1905 to initialize the position.

When the movement of the front side reading unit 210 is completed (S1906: Yes), the CPU 321 turns on the power of the front side reading unit 210 (S1907), and acquires a black level as black shading in a state where the light source lamps 203a and 203b are turned off (S1908). Next, the CPU 321 determines whether the acquired black level is normal (S1909). When it is determined that the black level is normal (S1909: Yes), the CPU 321 turns on the light source lamps 203a and 203b for white shading (S1910), and starts moving the front side reading unit 210 toward the front side flow reading position (S1911).

Next, the CPU 321 determines whether the front side reading unit 210 has reached a read region of the white board 202 (S1912). When it is determined that the front side reading unit 210 has reached the read region of the white board 202 (S1912: Yes), the CPU 321 acquires a white level by reading the white board 202 while moving the front side reading unit 210 (S1913). The CPU 321 checks the acquired white level (S1914), and checks whether the front side reading unit 210 has reached the flow reading position (S1915).

When the front side reading unit 210 has reached the flow reading position (S1915: Yes), the CPU 321 determines whether the acquired white level is normal (S1916). When it is determined that the white level is normal (S1916: Yes), the CPU 321 changes the state of the reading unit of the document reading apparatus 600 to "readable" (S1917), and returns to step S1901. As a result, the processing in the readable state can be started.

On the other hand, for a certain reason, the black level sampled by black shading or the white level sampled by white shading may not be normal. When the white level is not normal (S1916: No), the CPU 321 turns off the light source lamps 203a and 203b (S1918), and turns off the power of the front side reading unit 210 (S1919). As a result, the CPU 321 starts performing shading processing again. At this time, since the front side reading unit 210 is disposed at the front side flow reading position, the CPU 321 moves the front side reading unit 210 immediately below the white board 202 in S1905.

However, in consideration of a case where the abnormality is not an accidental abnormality of a sample value but a defect of the apparatus, the shading is performed after checking the number of times of repetition in step S1920 and increasing the number of times of repetition when the repetition is performed (S1921). If there is still an abnormality even after shading is repeated twice (S1920: Yes), the apparatus is defective, and the processing proceeds to step S1955.

Figure 22:
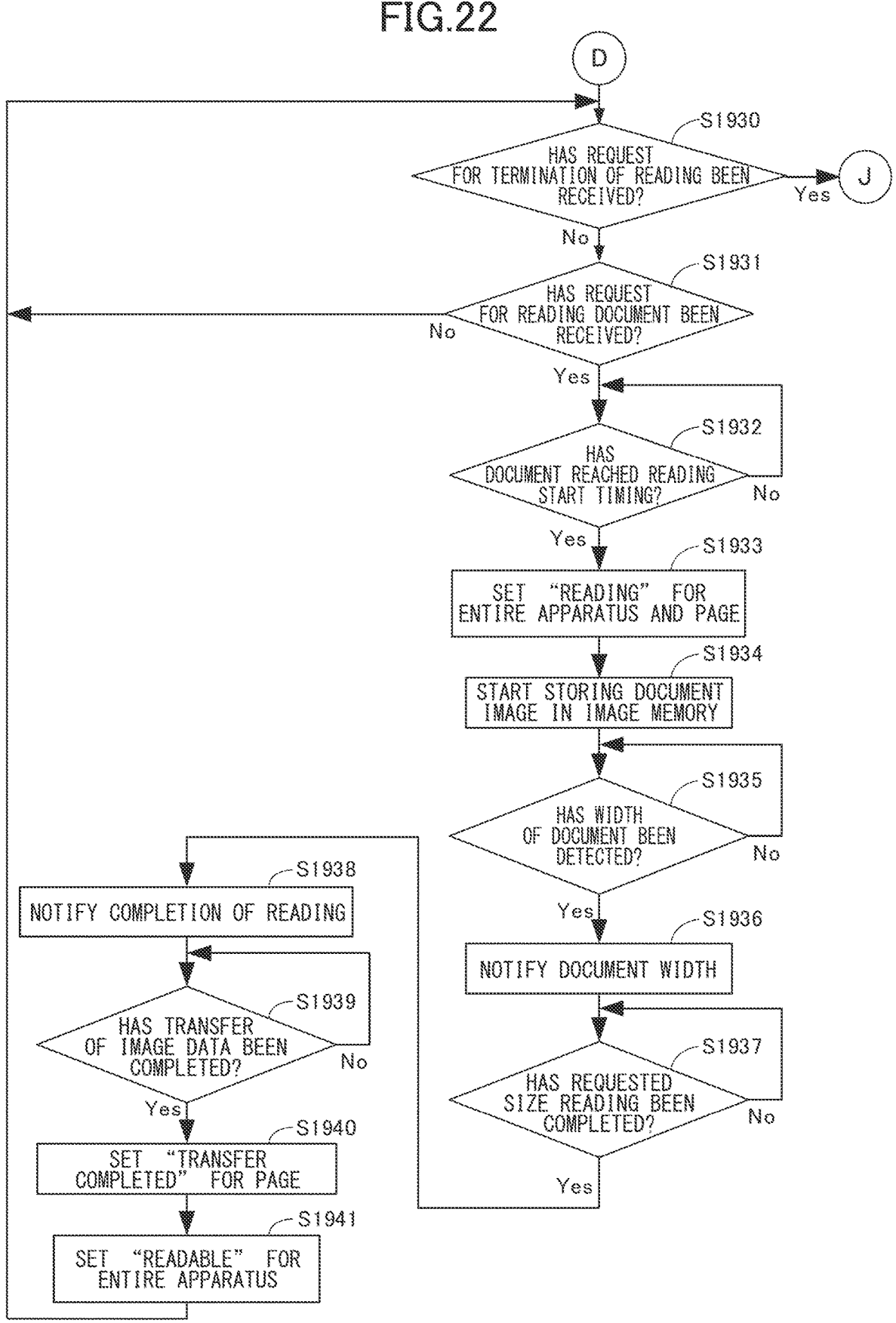
FIG. 22 is a flowchart illustrating image reading control.
Figure 23:
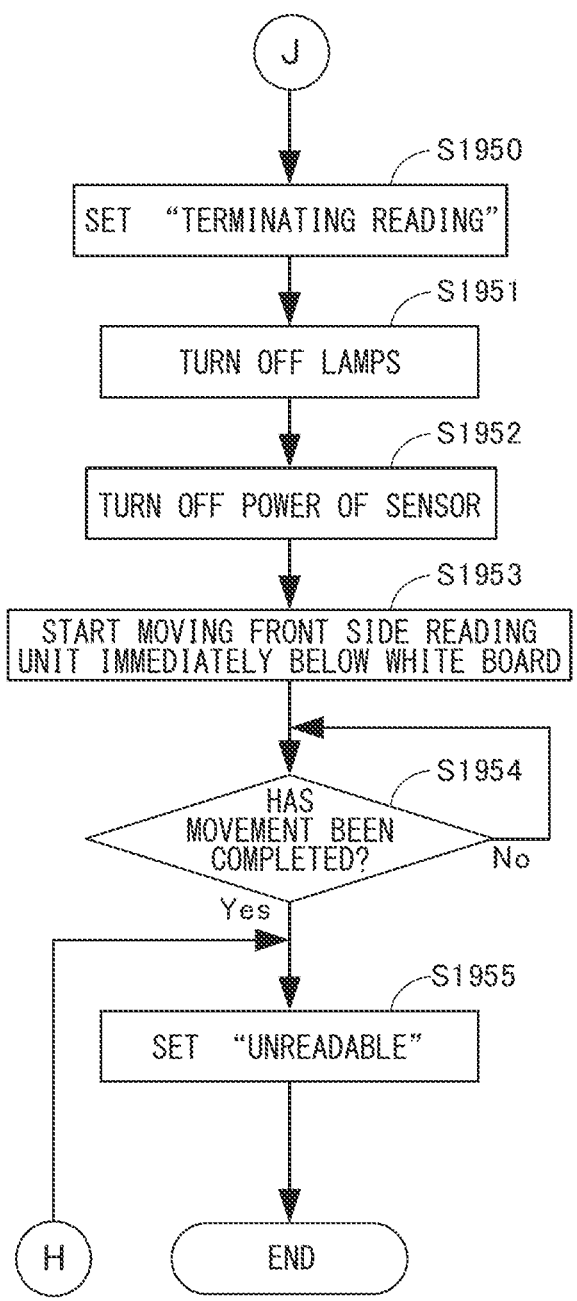
FIG. 23 is a flowchart illustrating image reading control.

In step S1901 of FIG. 20, when the reading unit of the document reading apparatus 600 is in the "readable" state (S1901: No), as illustrated in FIG. 22, the CPU 321 determines whether a request for termination of reading has been received (S1930). When the request for termination of reading has not been received (S1930: No), the CPU 321 checks whether a request for reading a document in the document conveyance control (step S2056 in FIG. 26 to be described below) has been received (S1931). When the request for reading a document has not been received (S1931: No), the processing returns to step S1930.

When the request for reading a document has been received (S1931: Yes), the CPU 321 determines whether the document has reached a reading start timing (S1932). Note that the timing at which a leading edge of the document reaches a position before the front side flow reading position by a distance sufficient to ensure an influence of the skew feeding of the document and a detectable width of a shadow is the reading start timing. When the document has reached the reading start timing (S1932: Yes), the state of the reading unit of the document reading apparatus 600 and the state of the reading unit in the page management information are both set to "reading" (S1933). Then, the CPU 321 starts storing a document image read by the front side reading unit 210 in the image memory 329 (S1934).

Then, at a time point when the image is read by a predetermined length from the leading edge of the read image, the CPU 321 detects a width of the document together with a position and a skew angle of the document from the image data (S1935: Yes). Then, the width of the document is notified to the CPU 321 (S1936), and the CPU 321 determines whether the requested size reading has been completed (S1937).

When the requested size reading has been completed (S1937: Yes), the CPU 321 notifies the completion of the reading of the document (S1938), and determines whether the transfer of the image data stored in the image memory to the controller unit 400 has been completed (S1939). When it is determined that the transfer of the image data has been completed (S1939: Yes), the CPU 321 sets the state of the reading unit in the page management information to "transfer completed" (S1940), and returns the state of the reading unit of the entire document reading apparatus 600 to "readable" (S1941). Then, the processing returns to step S1930.

When the request for termination of reading has been received in step S1930 (S1930: Yes), the CPU 321 sets the state of the reading unit of the entire document reading apparatus 600 to "terminating reading" (S1950). Then, the CPU 321 turns off the light source lamps 203a and 203b (S1951), and turns off the power of the front side reading unit 210 (S1952). Then, the CPU 321 starts moving the front side reading unit 210 immediately below the white board 202 (S1953), and determines whether the front side reading unit 210 has moved immediately below the white board 202 (S1954).

When it is determined that the front side reading unit 210 has been moved immediately below the white board 202 (S1954: Yes), the CPU 321 sets the state of the reading unit of the entire document reading apparatus 600 to an "unreadable" state (S1955), and ends the processing.

Conveyance Processing for Each Sheet of Document

Next, conveyance processing for reading a document will be described with reference to flowcharts of FIGS. 24 to 27. The conveyance processing is executed after the page management information is generated in step S1802 of FIG. 18 or in step S1816 of FIG. 19.

First, the CPU 321 detects whether there is a document (a document is present) in any of the first auxiliary tray 71 and the second auxiliary tray 72 of the feeding attachment 70 and the document tray 30 using the document presence/absence detection sensor 11 (S2001). When the document presence/absence detection sensor 11 has detected that there is a document (S2001: Yes), the CPU 321 determines whether the document to be fed is a first document reading job (S2002).

When the document is a first sheet of the job (S2002: Yes), the CPU 321 starts rotating the conveyance motor 122 (S2003), and subsequently rotates the feeding motor 121 at a designated reading speed (S2005). In addition, when the document is a second or subsequent sheet of the job (S2002: No), the CPU 321 rotates the feeding motor 121 at a designated reading speed (S2005) if a distance to the preceding document is a predetermined distance or more (S2004: Yes).

Here, a method for ensuring an appropriate distance between the second or subsequent document and the preceding document of the job will be described. The second or subsequent document of the job is fed after a trailing edge of the preceding document passes through the pull-out roller pair 3 in order to prevent collision with the preceding document. More specifically, the document is fed after a predetermined movement time has elapsed since the preceding document was detected by the pull-out sensor 13. The predetermined movement time is calculated from a distance from the pull-out sensor 13 to the pull-out roller pair 3 and a speed at which the preceding document is conveyed, and is a time required for the trailing edge of the preceding document to move from the pull-out sensor 13 to the pull-out roller pair 3.

In this manner, by making a next document wait until a timing at which the trailing edge of the preceding document passes through the pull-out roller pair 3 to start feeding the next document, the next document to be fed can be prevented from colliding with the preceding document.

Next, the CPU 321 determines whether the post-separation sensor 12 has detected that there is a document (S2006). When the post-separation sensor 12 has detected that there is a document (S2006: Yes), the CPU 321 determines whether the document has reached a pausing position (S2008). In a state where the document is located at the pausing position, the leading edge of the document is located between the post-separation sensor 12 and the pull-out roller pair 3 in the conveyance direction. In this state, the document can be stopped by stopping the feeding motor 121.

When it is determined that the document has reached the pausing position (S2008: Yes), the CPU 321 determines whether the document is readable (S2009). The determination as to whether the document is readable is made based on not only whether there is an area for storing an image in the image memory 329, but also whether the state of the reading unit is "readable" in step S1917 of FIG. 21. When it is determined that the document is readable at this time point (S2009: Yes), the document is not stopped at the pausing position, the conveyance of the document is continued, and the processing proceeds to step S2013.

On the other hand, when the document is not readable, for example, because there is no free space in the image memory 329, or when the state of the reading unit is not yet "readable" (S2009: No), the CPU 321 stops the feeding motor 121 (S2010). As a result, the document is stopped at the pausing position and stands by until the state of the reading unit becomes "readable" (S2011). When the state of the reading unit becomes "readable" (S2011: Yes), the CPU 321 rotates the feeding motor 121 to restart the feeding operation (S2012), and proceeds to step S2013.

Figure 26:
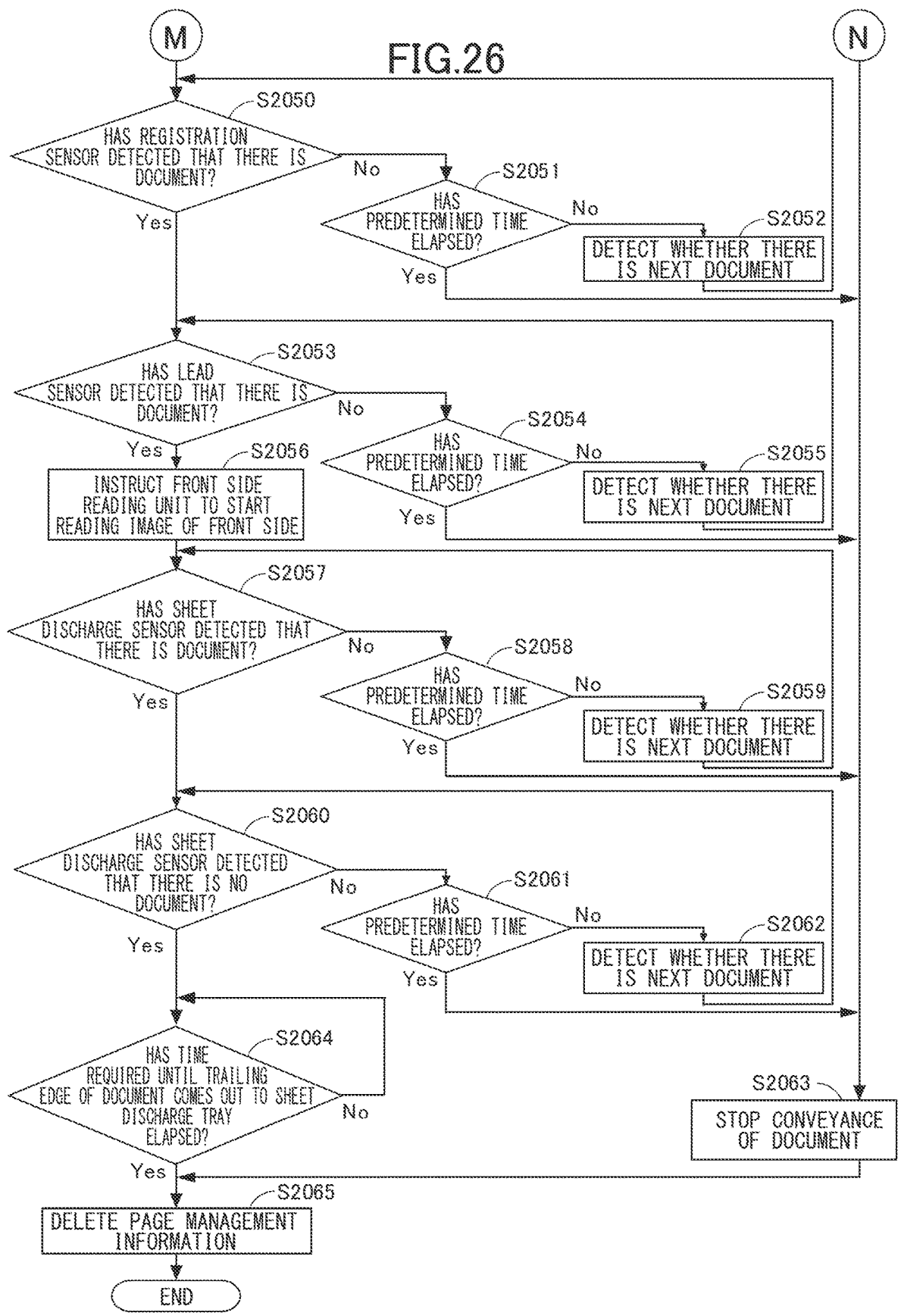
FIG. 26 is a flowchart illustrating conveyance processing.

In step S2013, the CPU 321 determines whether a document has been detected by the pull-out sensor 13, that is, whether the pull-out sensor 13 has detected that there is a document (S2013). When it is determined that the pull-out sensor 13 has not detected that there is a document (S2013: No), the CPU 321 monitors the pull-out sensor 13 detecting a document until a predetermined time elapses (S2014). Then, when the pull-out sensor 13 has not detected that there is a document even after the predetermined time has elapsed (S2014: No), the CPU 321 determines that the document has not been correctly conveyed and stops the conveyance of the document as illustrated in FIG. 26 (S2063). Specifically, the CPU 321 stops both the feeding motor 121 and the conveyance motor 122, and proceeds to step S2065.

Figure 25:
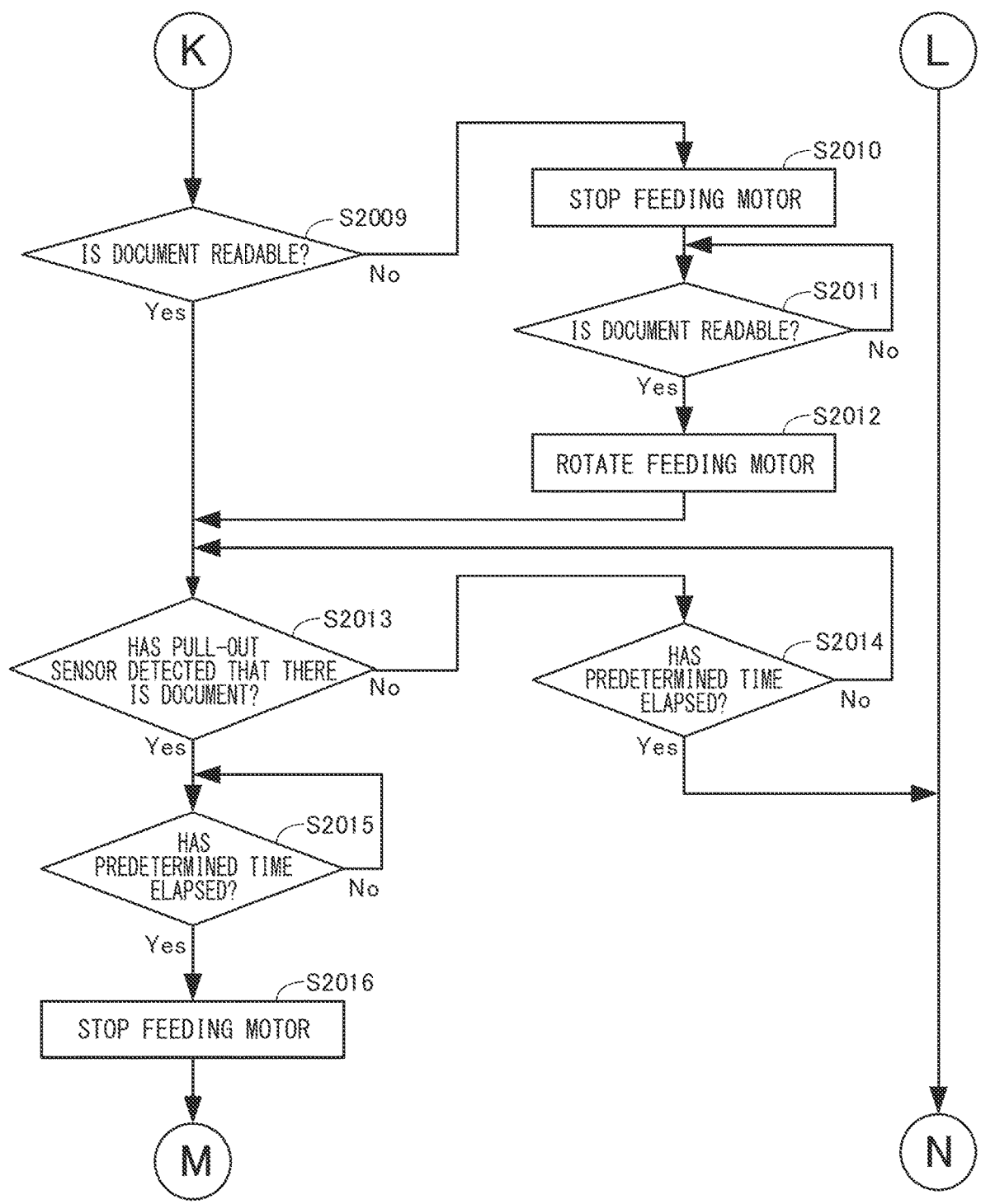
FIG. 25 is a flowchart illustrating conveyance processing.

In addition, in step S2013 of FIG. 25, when the pull-out sensor 13 has detected that there is a document (S2013: Yes), the CPU 321 stands by until a predetermined time elapses (S2015). Then, when a predetermined time has elapsed (S2015: Yes) and the leading edge of the document is nipped by the pull-out roller pair 3, the CPU 321 stops the feeding motor 121 (S2016).

Here, after the feeding motor 121 is stopped to convey the leading edge of the document only through the pull-out roller pair 3, the CPU 321 checks whether the trailing edge of the document being conveyed has passed through the post-separation sensor 12 in order to feed a next document. This processing is executed in parallel with processing performed by the registration sensor 14, the lead sensor 15, and the sheet discharge sensor 16, which are disposed downstream of the post-separation sensor 12 in the conveyance direction, to perform control for detecting whether there is a next document (S2050 to S2059). A position of the document on the conveying path is detected by the post-separation sensor 12, the registration sensor 14, the lead sensor 15, and the sheet discharge sensor 16.

Specifically, the CPU 321 determines whether the registration sensor 14 has detected that there is a document (S2050). When the registration sensor 14 has not detected that there is a document (S2050: No), the CPU 321 determines whether a predetermined time has elapsed (S2051). When the predetermined time has not elapsed (S2051: No), the CPU 321 detects whether there is a next document (S2052), which will be described below with reference to FIG. 27, and returns to step S2050. When the predetermined time has elapsed (S2051: Yes), the CPU 321 stops the conveyance of the document by stopping the feeding motor 121 and the conveyance motor 122 (S2063), and proceeds to step S2065.

When the registration sensor 14 has detected that there is a document (S2050: Yes), the CPU 321 determines whether the lead sensor 15 has detected whether there is a document (S2053). When the lead sensor 15 has not detected that there is a document (S2053: No), the CPU 321 determines whether a predetermined time has elapsed (S2054). When the predetermined time has not elapsed (S2054: No), the CPU 321 detects whether there is a next document (S2055), which will be described below with reference to FIG. 27, and returns to step S2053. When the predetermined time has elapsed (S2054: Yes), the CPU 321 stops the conveyance of the document by stopping the feeding motor 121 and the conveyance motor 122 (S2063), and proceeds to step S2065.

When the lead sensor 15 has detected that there is a document (S2053: Yes), the CPU 321 instructs the front side reading unit 210 to start reading a front side of the document (S2056). Then, the CPU 321 determines whether the sheet discharge sensor 16 has detected that there is a document (S2057). When the sheet discharge sensor 16 has not detected that there is a document (S2057: No), the CPU 321 determines whether a predetermined time has elapsed (S2058). When the predetermined time has not elapsed (S2058: No), the CPU 321 detects whether there is a next document (S2059), which will be described below with reference to FIG. 27, and returns to step S2057. When the predetermined time has elapsed (S2058: Yes), the CPU 321 stops the conveyance of the document by stopping the feeding motor 121 and the conveyance motor 122 (S2063), and proceeds to step S2065.

When the sheet discharge sensor 16 has detected that there is a document (S2057: Yes), the CPU 321 determines whether or not the sheet discharge sensor 16 has detected that there is no document in parallel with the detection as to whether there is a next document (S2059) (S2060). This is to check whether the document can be properly discharged onto the sheet discharge tray 10. When the sheet discharge sensor 16 has not detected that there is no the document (S2060: No), the CPU 321 determines whether a predetermined time has elapsed (S2061). When the predetermined time has not elapsed (S2061: No), the CPU 321 detects whether there is a next document (S2062), which will be described below with reference to FIG. 27, and returns to step S2060. When the predetermined time has elapsed (S2061: Yes), the CPU 321 stops the conveyance of the document by stopping the feeding motor 121 and the conveyance motor 122 (S2063), and proceeds to step S2065.

When the sheet discharge sensor 16 has detected that there is no document (S2060: Yes), the CPU 321 determines whether a time required until the trailing edge of the document comes out to the sheet discharge tray 10 has elapsed (S2064). When it is determined that the time required until the trailing edge of the document comes out to the sheet discharge tray 10 has elapsed (S2064: Yes), the CPU 321 deletes the page management information (S2065) and ends the sequence for conveying one sheet of document.

Figure 27:
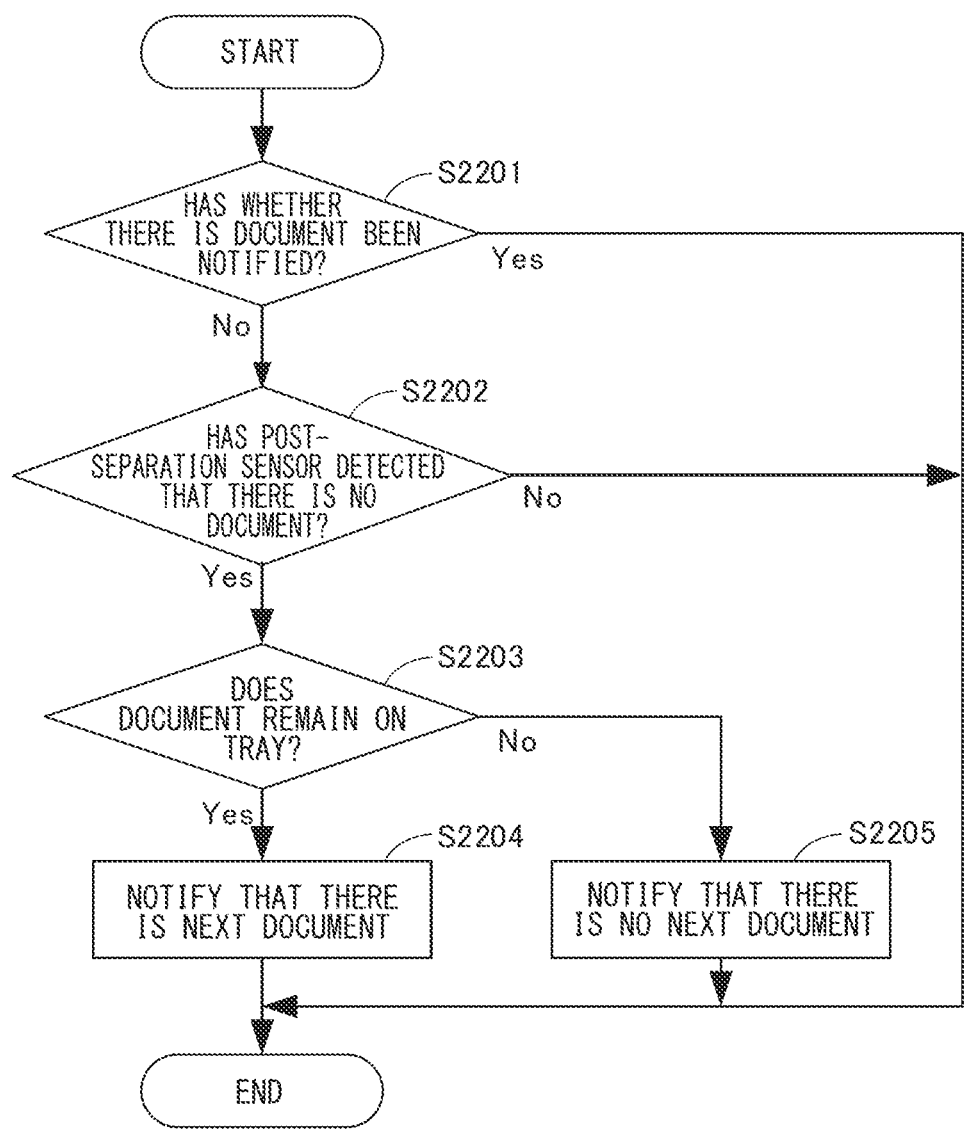
FIG. 27 is a flowchart illustrating conveyance processing.

FIG. 27 is a flowchart illustrating the processing related to detecting whether there is a next document (S2052, S2055, S2059, and S2062) of FIG. 26. As illustrated in FIG. 27, when the detection of whether there is a next document is performed, the CPU 321 determines whether the presence/absence of the document has already been notified (S2201). This is because there are multiple opportunities to determine whether there is a document during the process of conveying one sheet of document, and it is not necessary to perform the same process many times. When it has already been notified whether there is a document (S2201: Yes), the processing ends.

When it has not yet been notified whether there is a document (S2201: No), the CPU 321 determines whether the post-separation sensor 12 has detected that there is no document (S2202). That is, the CPU 321 determines whether the detection of the post-separation sensor 12 has changed from the presence of the document to the absence of the document as the trailing edge of the document passes through the post-separation sensor 12.

When the post-separation sensor 12 has detected that there is no document (S2202: Yes), the CPU 321 checks whether a document remains in any of the first auxiliary tray 71, the second auxiliary tray 72, and the document tray 30 based on a detection result of the document presence/absence detection sensor 11 (S2203). When it is determined that a document remains in any of the first auxiliary tray 71, the second auxiliary tray 72, and the document tray 30 (S2203: Yes), the CPU 321 notifies that there is a next document (S2204), issues an instruction to start feeding the next document (S1817) of FIG. 19. On the other hand, when it is determined that no document remains in any of the first auxiliary tray 71, the second auxiliary tray 72, and the document tray 30 (S2203: No), the CPU 321 notifies that there is no next document (S2205).

As described above, in the present embodiment, during the document reading job in the feeding attachment use mode, a document width is acquired based on the read document image (S1810 and S1811 of FIG. 19). Then, from the acquired document width, it is estimated which one of the first auxiliary tray 71, the second auxiliary tray 72, and the document tray 30 the read document is placed on. Further, the speed at which the next document is to be fed is set (updated) according to the estimated tray (FIG. 17 and S1812 and S1813 of FIG. 19).

In other words, in the feeding attachment use mode, the CPU 321 controls the feeding motor 121 so that the pickup roller 1 feeds a first document at a first feeding speed. Further, when a width of the first document in a width direction WD orthogonal to a feeding direction CD is larger than a predetermined width, the CPU 321 controls the feeding motor 121 so that the pickup roller 1 feeds a second document following the first document at a second feeding speed. The second feeding speed is faster than the first feeding speed.

In addition, in the feeding attachment use mode, the CPU 321 controls the feeding motor 121 so that the pickup roller 1 feeds a document stacked on the first auxiliary tray 71 at the first feeding speed. In addition, the CPU 321 controls the feeding motor 121 so that the pickup roller 1 feeds a first document stacked on the second auxiliary tray 72 at the first feeding speed. Further, the CPU 321 controls the feeding motor 121 so that the pickup roller 1 feeds a second document and subsequent documents stacked on the second auxiliary tray 72 at the second feeding speed.

Therefore, in the document reading job using the feeding attachment 70, it is possible to improve productivity while suppressing the skew feeding of the document, the buckling of the leading edge portion, and the like. In addition, it is possible to convey and read documents having a plurality of sizes in one job.

Second Embodiment

Next, a second embodiment of the present disclosure will be described. The second embodiment has substantially the same configuration as the document reading apparatus 600 of the first embodiment, except that the feeding attachment 70 is not mounted. Therefore, a configuration of the second embodiment similar to that of the first embodiment will not be illustrated or will be described with the same reference signs being given in the drawings.

In the first embodiment, the feeding attachment 70 is attached to the document tray 30, and a document having a narrow width is placed on the first auxiliary tray 71 or the second auxiliary tray 72 of the feeding attachment 70. On the other hand, in the present embodiment, a document having a narrow width is mixed on the document tray 30 rather than using the feeding attachment 70.

The screen of the operation unit 405 is switched to the screen illustrated in FIG. 32B by selecting the icon "free" in FIG. 32A. In the present embodiment, similarly to the first embodiment, a fixed free size mode is provided. By selecting the icon "mixed" on the screen illustrated in FIG. 32B, a mixed free size mode is selected. Furthermore, by selecting the icon "mixed (advanced)", it is possible to read a document having a narrow width such that both ends of the document cannot be sandwiched between the side regulating plates 31 or a bundle of documents in which a document having the smallest width has only a half width of a document having the largest width.

In order to appropriately read such a bundle of documents, in the present embodiment, when the icon "mixed (advanced)" in FIG. 32B is selected, messages as illustrated in FIG. 32C are displayed on the operation unit 405 as a display unit. For example, the operation unit 405 displays messages serving as a display such as 1. the maximum number of sheets of documents is 10, 2. a document having a large width is placed below (a document having a smaller width is placed higher), 3. the documents are placed at the center of the tray, 4. the documents are placed in parallel with the guides, and the like.

As a result, in a state where the feeding attachment 70 is not attached to the document tray 30, the user is urged to stack the documents of the document bundle in such an order that a document having a smaller width is placed higher. Further, the user is urged to align the document bundle with the center of the document tray 30 in the width direction WD. In other words, the user is urged to stack the documents on the document tray 30 so that the center of each of the documents in the width direction WD is aligned with the center between the pair of side regulating plates 31 in the width direction WD.

If the user stacks a bundle of documents on the document tray 30 according to such display, it is possible to read the documents under the same control as in the "feeding attachment use mode" according to the first embodiment without using the feeding attachment 70. Therefore, it is possible to improve productivity while suppressing the skew feeding of the document, the buckling of the leading edge portion, and the like.

Third Embodiment

Next, a third embodiment of the present disclosure will be described. The third embodiment further includes a first document width detection sensor 81 and a second document width detection sensor 82 with respect to the document reading apparatus 600 according to the first embodiment. Therefore, a configuration of the third embodiment similar to that of the first embodiment will not be illustrated or will be described with the same reference signs being given in the drawings.

FIG. 33 is a plan view illustrating a conveying path from the document tray 30 to the conveyance roller pair 4 of a document reading apparatus 600B. In the example illustrated in FIG. 33, images are being read for documents A and C stacked on the first auxiliary tray 71 of the feeding attachment 70, while the document A reaches the registration sensor 14, and the document C is not yet fed by the pickup roller 1.

In FIG. 33, straight lines P71A and P71B indicate respective positions in the width direction WD of the farther-side guide 71A and the closer-side guide 71B provided on the first auxiliary tray 71. Straight lines P72A and P72B indicate respective positions in the width direction WD of the farther-side guide 72A and the closer-side guide 72B provided on the second auxiliary tray 72. Straight lines P31A and P31B indicate respective abutting positions of the side regulating plates 31 on the farther side and the closer side in the document width direction WD in the state where the pair of side regulating plates 31 are placed to be farthest away from each other. These straight lines P31A, P31B, P71A, P71B, P72A, and P72B extend along the feeding direction CD.

In the present embodiment, the first document width detection sensor 81 and the second document width detection sensor 82 as detection units each capable of detecting whether there is a document conveyed at a corresponding position are arranged between the post-separation sensor 12 and the registration sensor 14 in the feeding direction CD. In addition, the first document width detection sensor 81 is disposed between the straight line P71A and the straight line P72A in the width direction WD. The second document width detection sensor 82 is disposed between the straight line P72A and the straight line P31A in the width direction WD.

Therefore, the first document width detection sensor 81 is not capable of detecting documents fed from the first auxiliary tray 71, and is capable of detecting documents fed from the second auxiliary tray 72 and the document tray 30. In addition, the second document width detection sensor 82 is not capable of detecting documents fed from the second auxiliary tray 72, and is capable of detecting documents fed from the document tray 30.

In the present embodiment, when a document is set on the first auxiliary tray 71 or the second auxiliary tray 72, the document is set in an abutting state on the guide 71A or 72A. Therefore, for example, when the document A stacked on the first auxiliary tray 71 is properly conveyed, the first document width detection sensor 81 and the second document width detection sensor 82 cannot detect the fed document. Therefore, when the first document width detection sensor 81 does not detect the document at a time point when a leading edge of the document reaches the registration sensor 14, it can be estimated that the document A is a document fed from the first auxiliary tray 71.

Then, the document C following the document A is also is estimated as being placed on the first auxiliary tray 71, and is fed at a feeding speed suitable for a document width of the document stacked on the first auxiliary tray 71. When a document is detected by the first document width detection sensor 81 but is not detected by the second document width detection sensor 82, it can be estimated that the fed document is a document fed from the second auxiliary tray 72. Further, when both the first document width detection sensor 81 and the second document width detection sensor 82 detect a document, it can be estimated that the fed document is a document fed from the document tray 30.

As described above, in the present embodiment, widths of at least three types of documents can be detected by two sensors disposed at different positions in the width direction WD, i.e., the first document width detection sensors 81 and the second document width detection sensor 82. The first document width detection sensor 81 and the second document width detection sensor 82 are disposed upstream of the registration sensor 14 and the front side reading unit 210 in the feeding direction CD. Therefore, in the second embodiment, a document width can be detected more quickly than that detected based on a read document image according to the first embodiment.

By changing the feeding speed of the document fed by the pickup roller 1 and the separation roller 2 based on the detected document width, productivity can be improved. In addition, since the feeding speed of the document of which a document width has been detected can be changed at a time point when the leading edge of the document reaches the registration sensor 14, the feeding speeds of the mixed documents can be changed one by one at a timing faster than that in the first embodiment, thereby improving productivity.

Overall Control of Document Reading Apparatus

Figure 34:
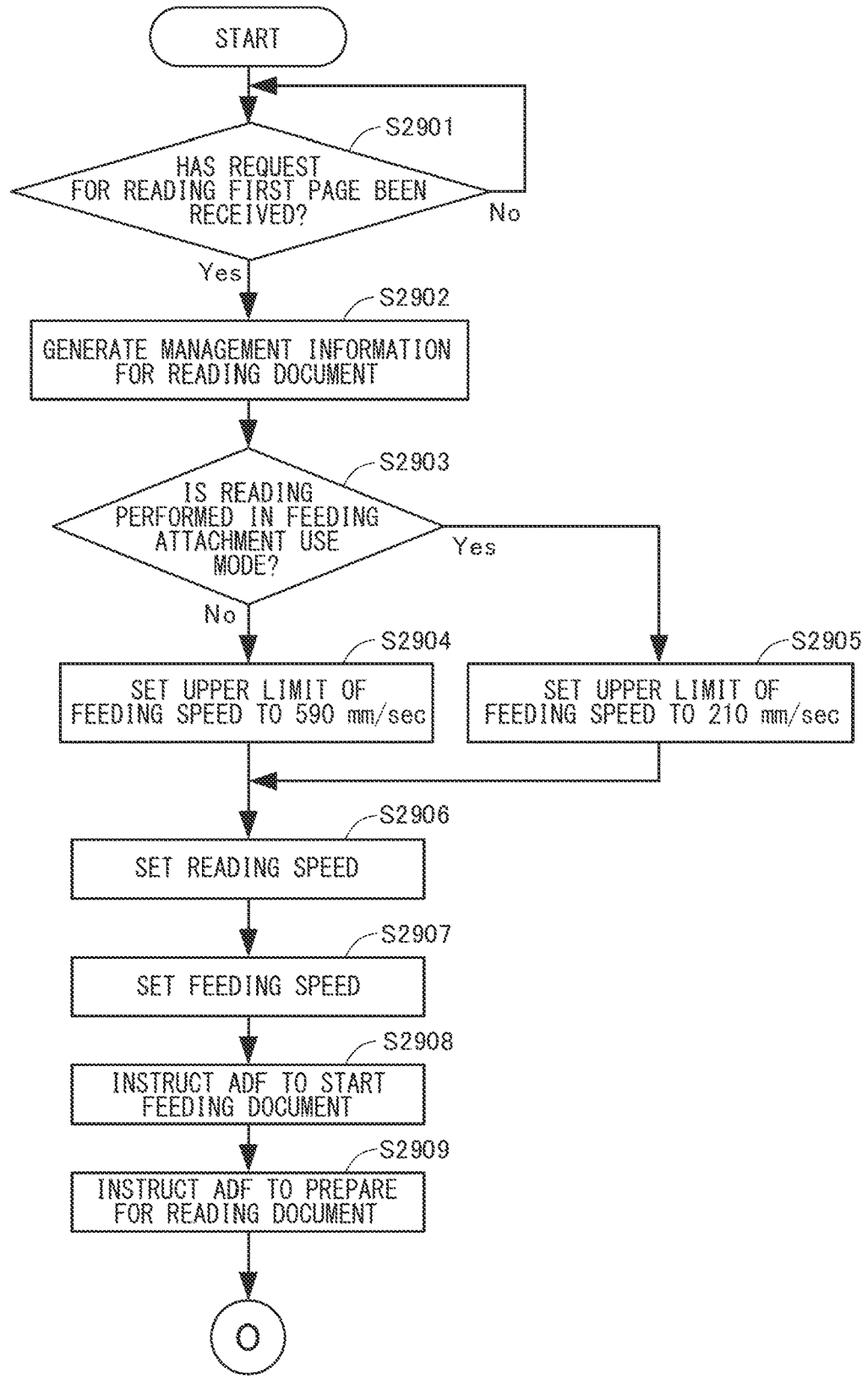
FIG. 34 is a flowchart illustrating overall control of the document reading apparatus.
Figure 35:
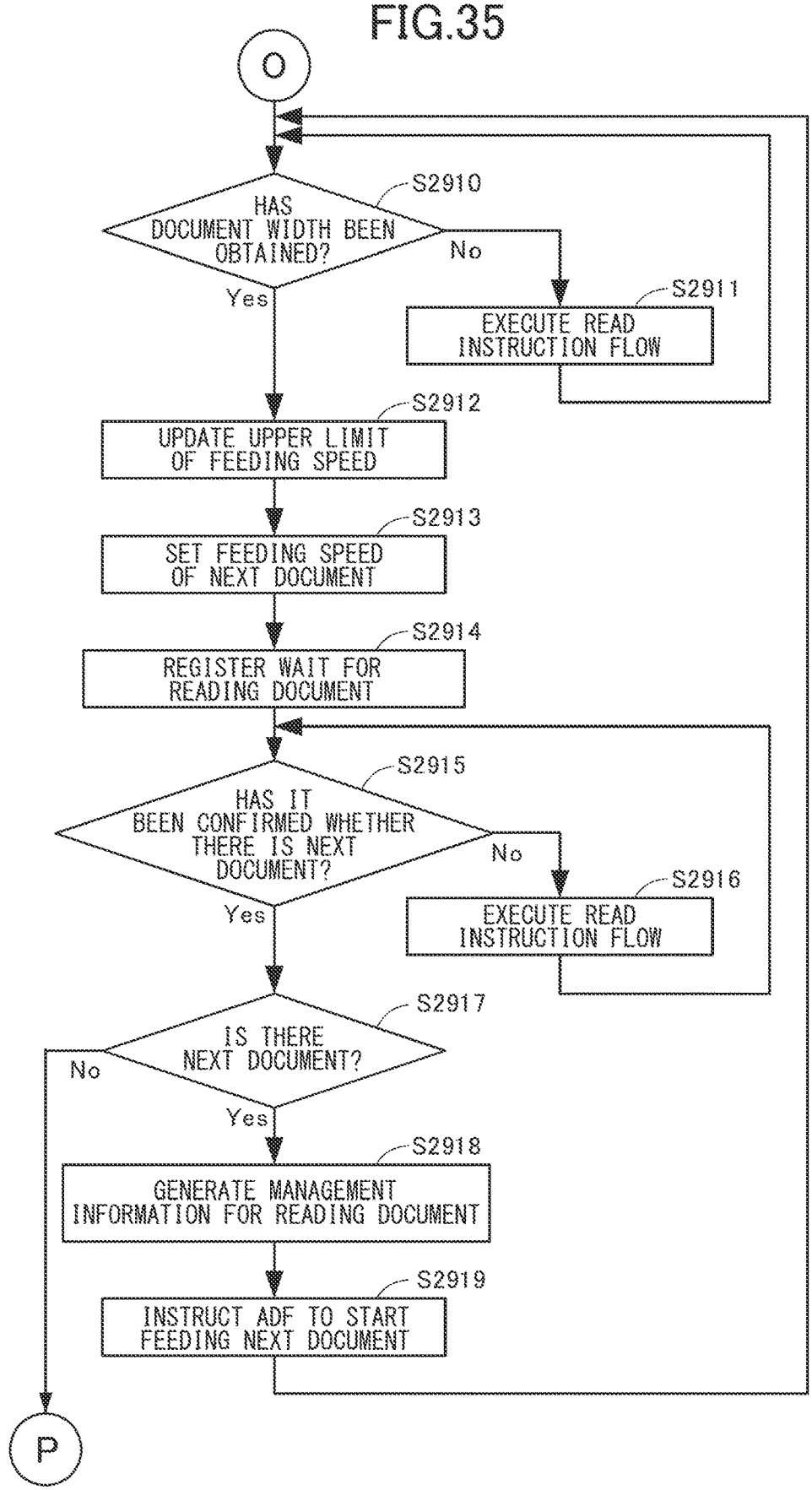
FIG. 35 is a flowchart illustrating overall control of the document reading apparatus.
Figure 36:
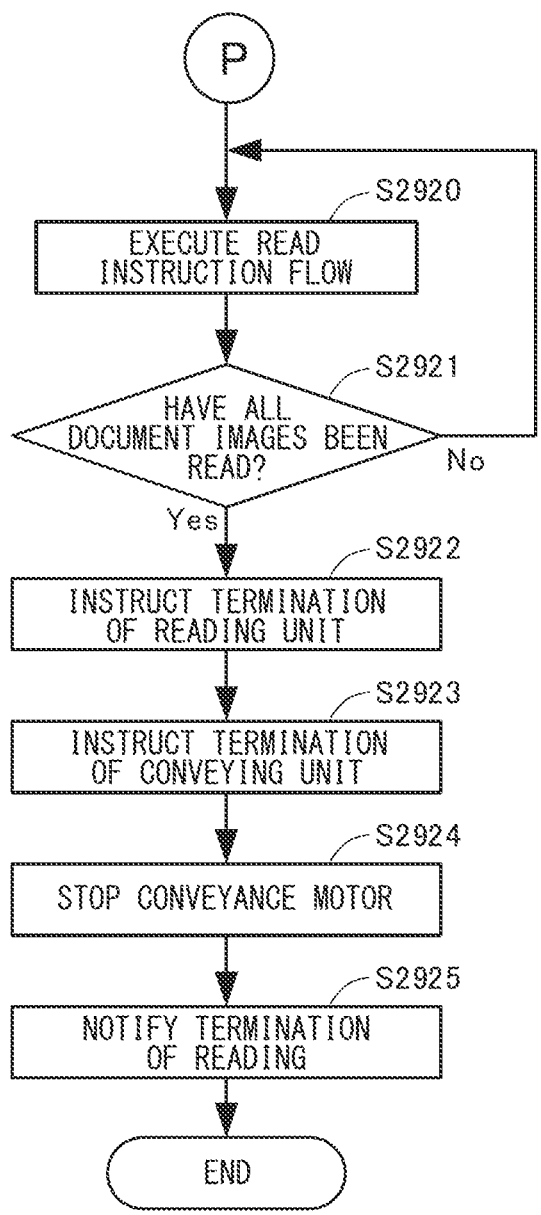
FIG. 36 is a flowchart illustrating overall control of the document reading apparatus.

FIGS. 34 to 36 are flowcharts illustrating overall control performed by the document reading apparatus 600B for document reading. The processing of FIG. 34 is basically similar to the processing of FIG. 18. That is, steps S2901 to S2909 of FIG. 34 correspond to steps S1801 to S1809 of FIG. 18, and thus the description thereof is omitted.

When an instruction to prepare for reading a document is issued in step S2909 of FIG. 34, the CPU 321 determines whether a document width has been obtained as illustrated in FIG. 35 (S2910: Yes). As described above, at a time point when a leading edge of the document fed by the pickup roller 1 and the separation roller 2 reaches the registration sensor 14, the document width is detected based on detection results of the first document width detection sensor 81 and the second document width detection sensor 82.

When a document width is obtained in step S2910 (S2910: No), the CPU 321 executes a read instruction flow, which will be described below with reference to FIG. 37, and returns to step S2910. When a document width is obtained (S2910: Yes), the CPU 321 executes steps S2912 and S2913. Steps S2912 and S2913 correspond to steps S1812 and S1813 of FIG. 19, and are performed to update the upper limit of the feeding speed and change (update) the setting for a feeding speed of a next document. In the present embodiment, since the document width is detected by the first document width detection sensor 81 and the second document width detection sensor 82 as compared with the first embodiment in which the document width is obtained from the read image of the document, a document width acquiring timing is earlier than that in the first embodiment. Therefore, not only the feeding speed of the next document but also feeding speeds of documents of which document widths have been detected by the first document width detection sensor 81 and the second document width detection sensor 82 and a reading speed set by the conveyance motor 122 may be changed based on the newly obtained document width. As a result, productivity can be further improved.

Next, among the page management information of FIG. 29 exemplified in the first embodiment, the CPU 321 sets the read state of the document fed this time, which is a readable document, to a wait for reading the document (S2914). Since steps S2915 and S2917 to S2919 are similar to S1814 to S1817 of FIG. 19, the description thereof is omitted.

In steps S2910 and S2915 each including a wait loop process in the process of feeding each sheet of document and at a timing (step S2920) after a new feeding processing is unnecessary, read instruction flows (S2911, S2916, and S2920) to be described below are performed. In the read instruction flow, an instruction to start reading the document set to be read in step S2914 and processing on an image that has been read are performed.

Figure 37:
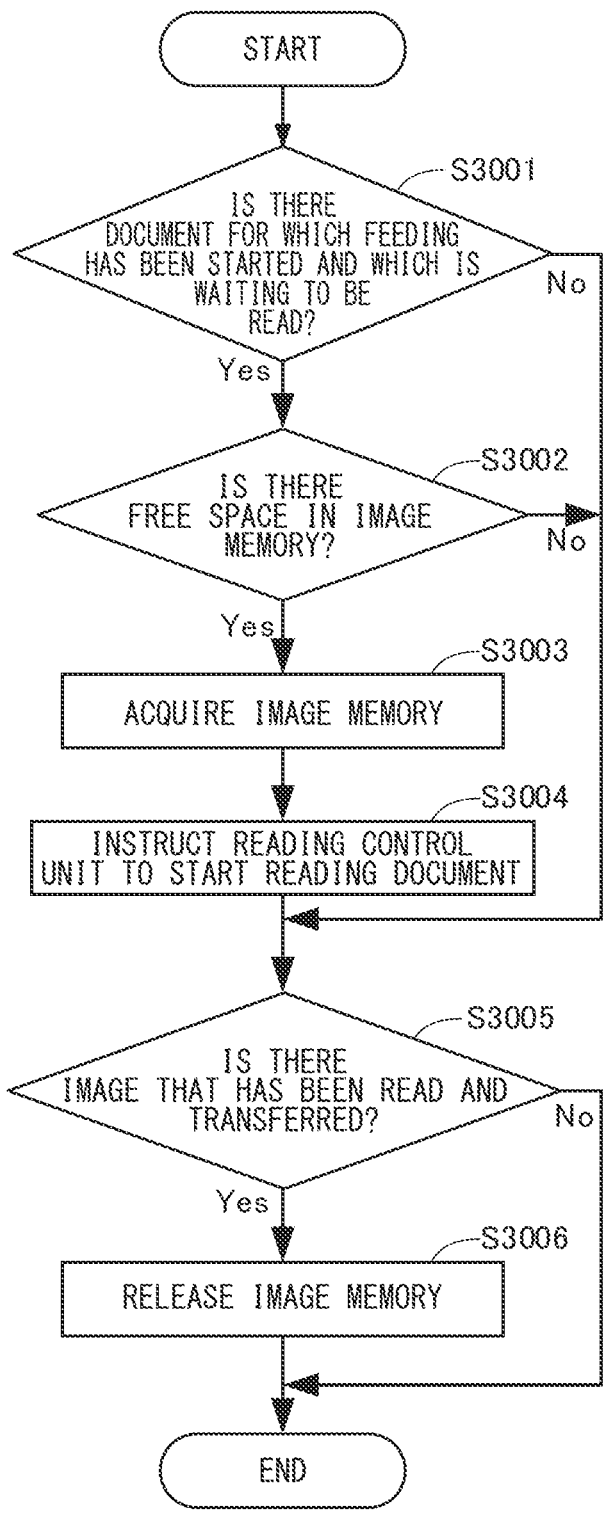
FIG. 37 is a flowchart illustrating image reading control.

As illustrated in FIG. 37, in the read instruction flow, it is first determined whether there is a document for which an instruction to start feeding has been issued in step S2908 or S2919 and which is set to wait to be read in step S2914 (S3001). When there is no such document (S3001: No), the processing proceeds to step S3005. When there is such a document (S3001: Yes), the CPU 321 determines whether there is a free space for storing image data obtained by reading the document in the image memory 329 (S3002). When there is no free space in the image memory 329 (S3002: No), the CPU 321 proceeds to step S3005.

When there is a free space in the image memory 329 (S3002: Yes), the CPU 321 secures the free space in the image memory 329 and instructs the reading control unit to start reading the document (S3004). Next, the CPU 321 determines whether there is image data that has been read or transferred to the controller unit 400 in the image memory 329 (S3005). When there is such image data (S3005: Yes), the CPU 321 releases the area in which the image data is stored from the image memory 329 (S3006), and ends the processing.

Returning to FIG. 36, the read instruction flow (S2920) is performed until all the document images are read (S2921: No). When all the document images have been read (S2921: Yes), steps S2922 to S2925 similar to steps S1820 to S1823 of FIG. 19 are executed.

Control for Reading Unit

Figure 38:
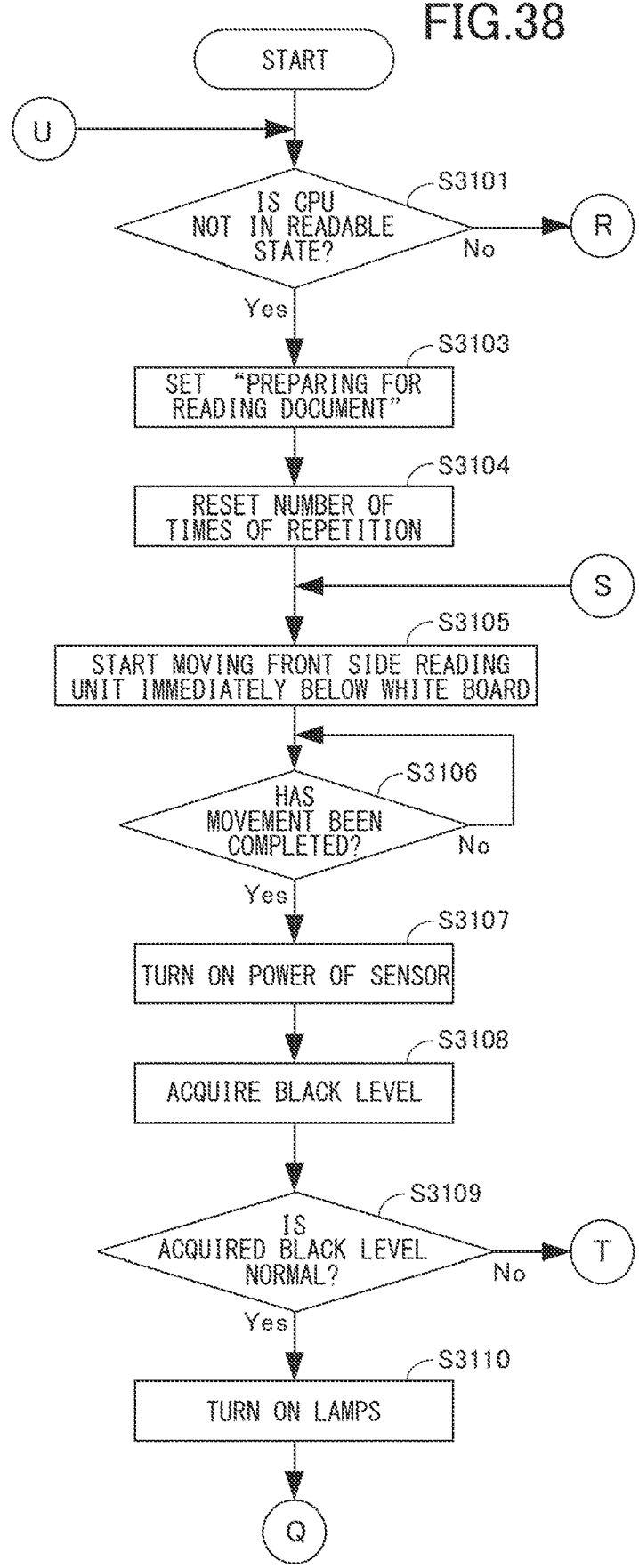
FIG. 38 is a flowchart illustrating image reading control.
Figure 39:
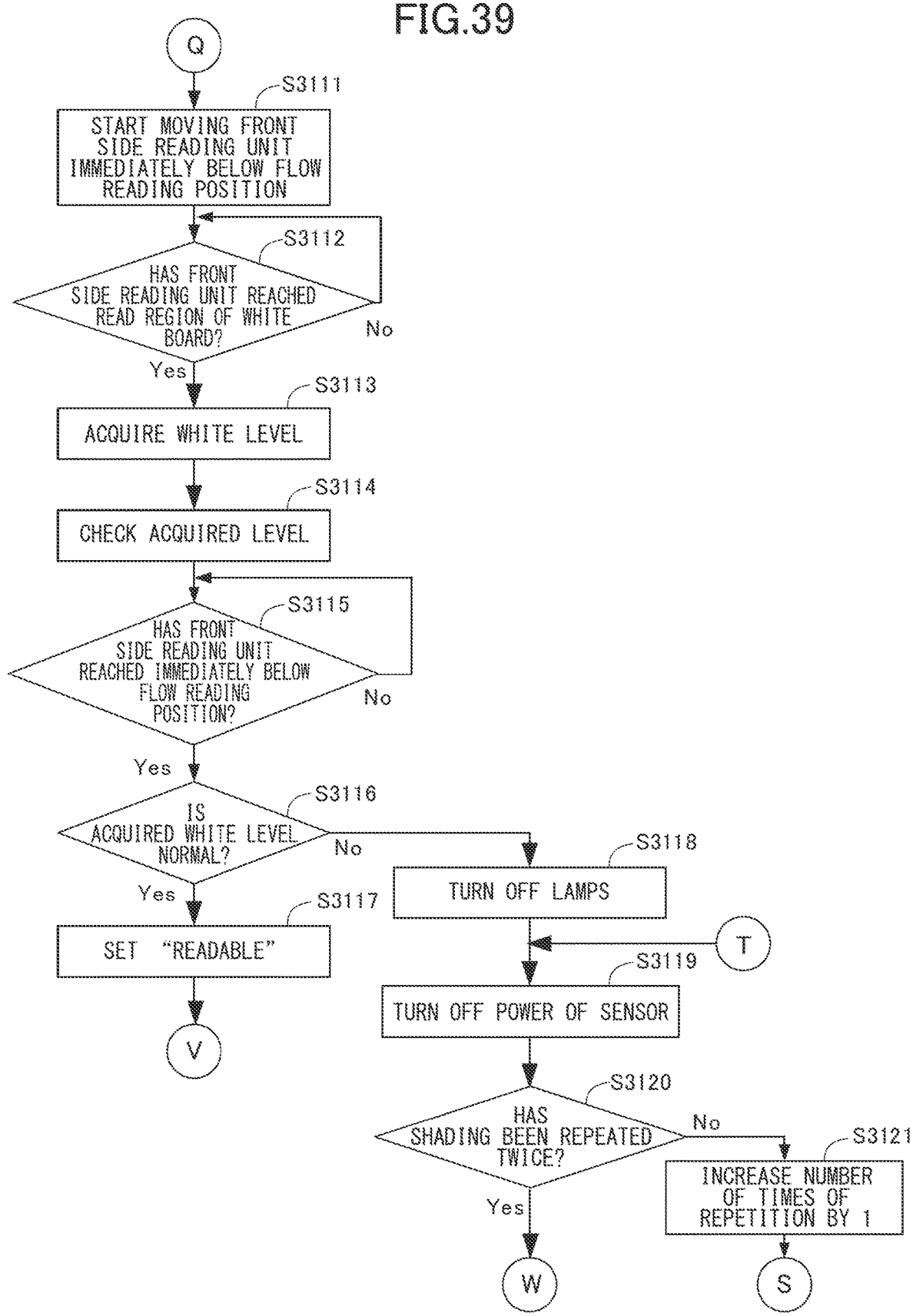
FIG. 39 is a flowchart illustrating image reading control.
Figure 40:
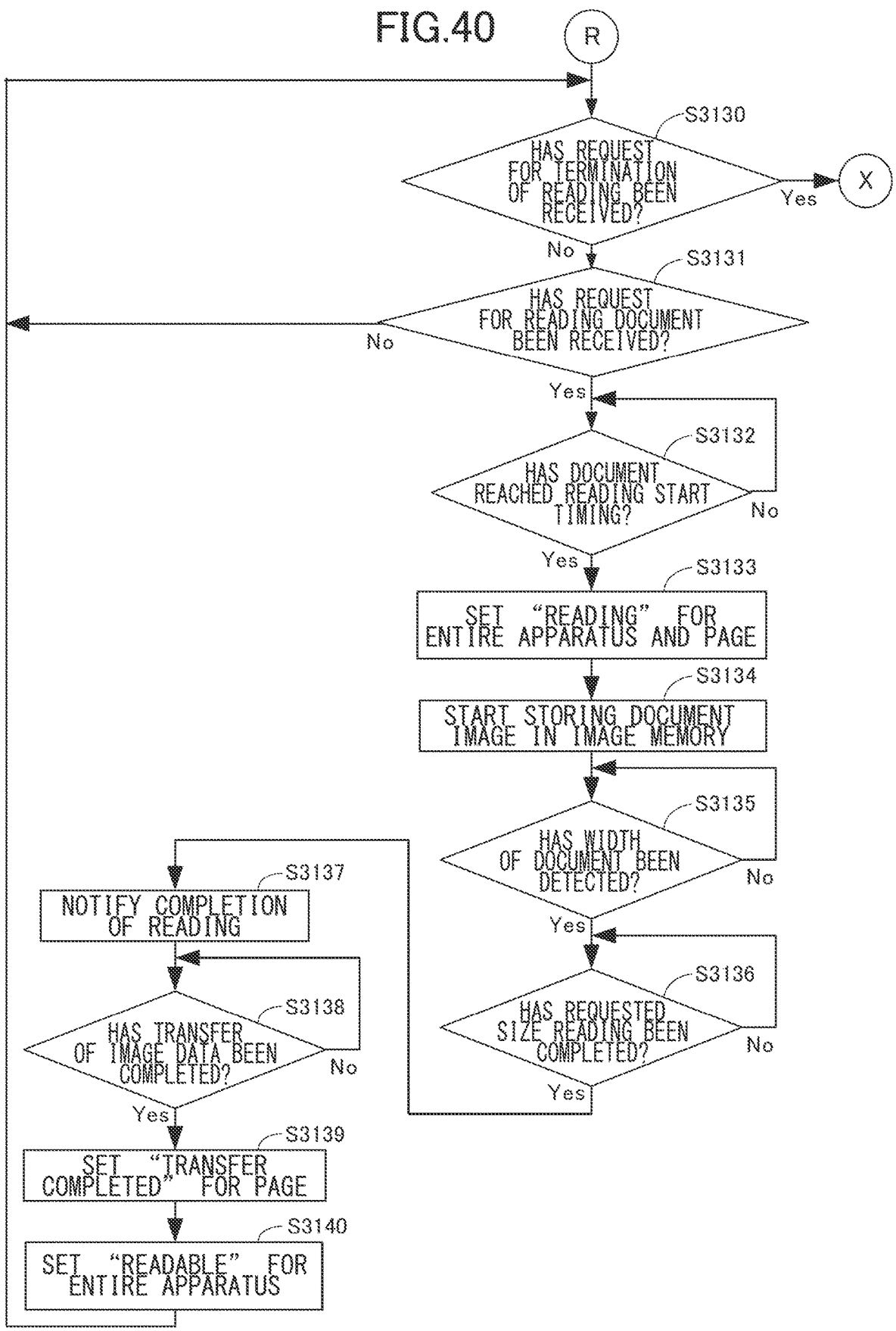
FIG. 40 is a flowchart illustrating image reading control.

Next, a process for the document reading unit will be described with reference to flowcharts of FIGS. 38 to 41. The basic processing for the document reading unit is similar to the processing described with reference to FIGS. 20 to 23 in the first embodiment. Steps S3101 to S3135 in the flowcharts illustrated in FIGS. 38 to 40 are similar to steps S1901 to S1935 in the flowcharts illustrated in FIGS. 20 to 22.

Figure 41:
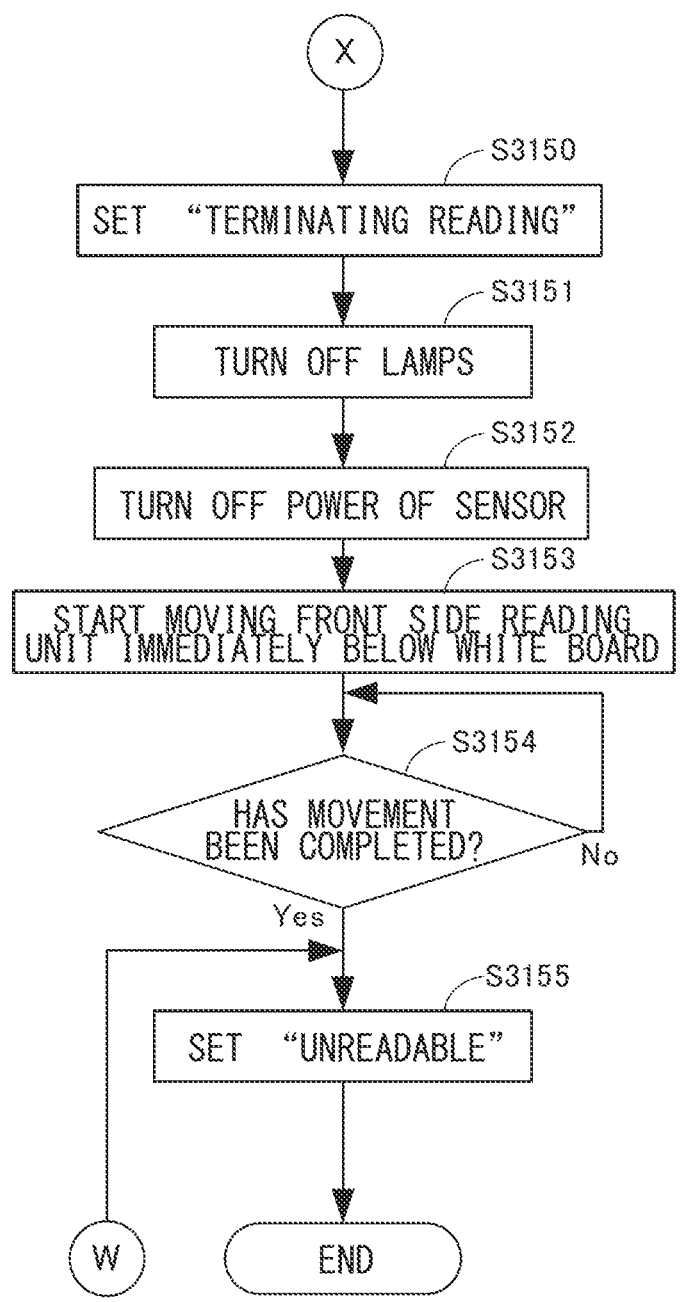
FIG. 41 is a flowchart illustrating image reading control.

In step S3135, the CPU 321 determines whether the width of the read document has been detected in order to correct skew feeding of the document image (S3135). In the present embodiment, since the document width is acquired from the first document width detection sensor 81 and the second document width detection sensor 82 in step S2910 (see FIG. 35), the document width is not acquired from the read image. Therefore, when the width of the document is detected (S3135: Yes), the processing proceeds to step S3136 without performing the processing of step S1936 illustrated in FIG. 22. Steps S3136 to S3155 illustrated in FIGS. 40 and 41 are similar to steps S1937 to S1955 illustrated in FIGS. 22 and 23.

Conveyance Processing for Each Sheet of Document

Figure 42:
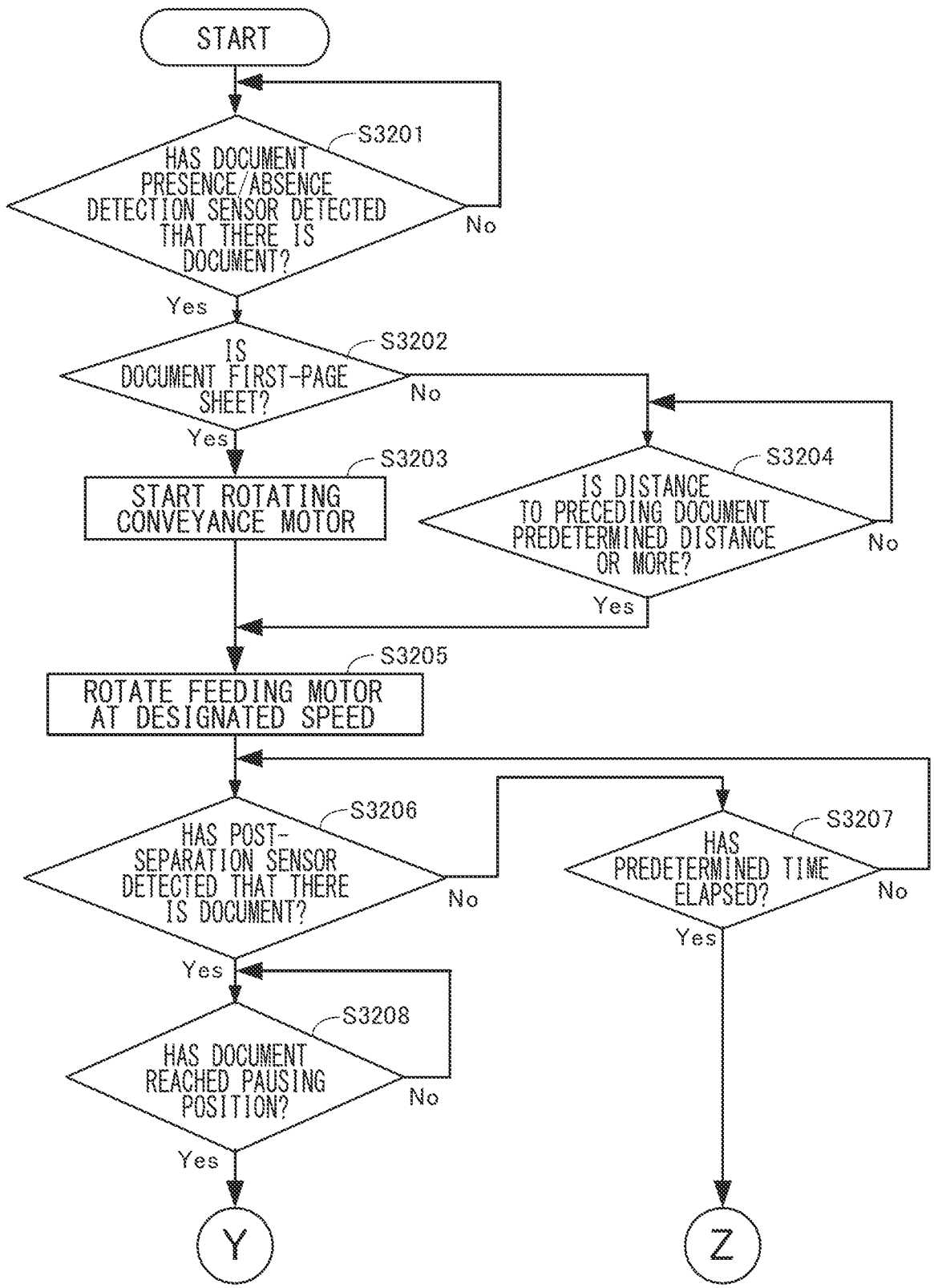
FIG. 42 is a flowchart illustrating conveyance processing.
Figure 43:
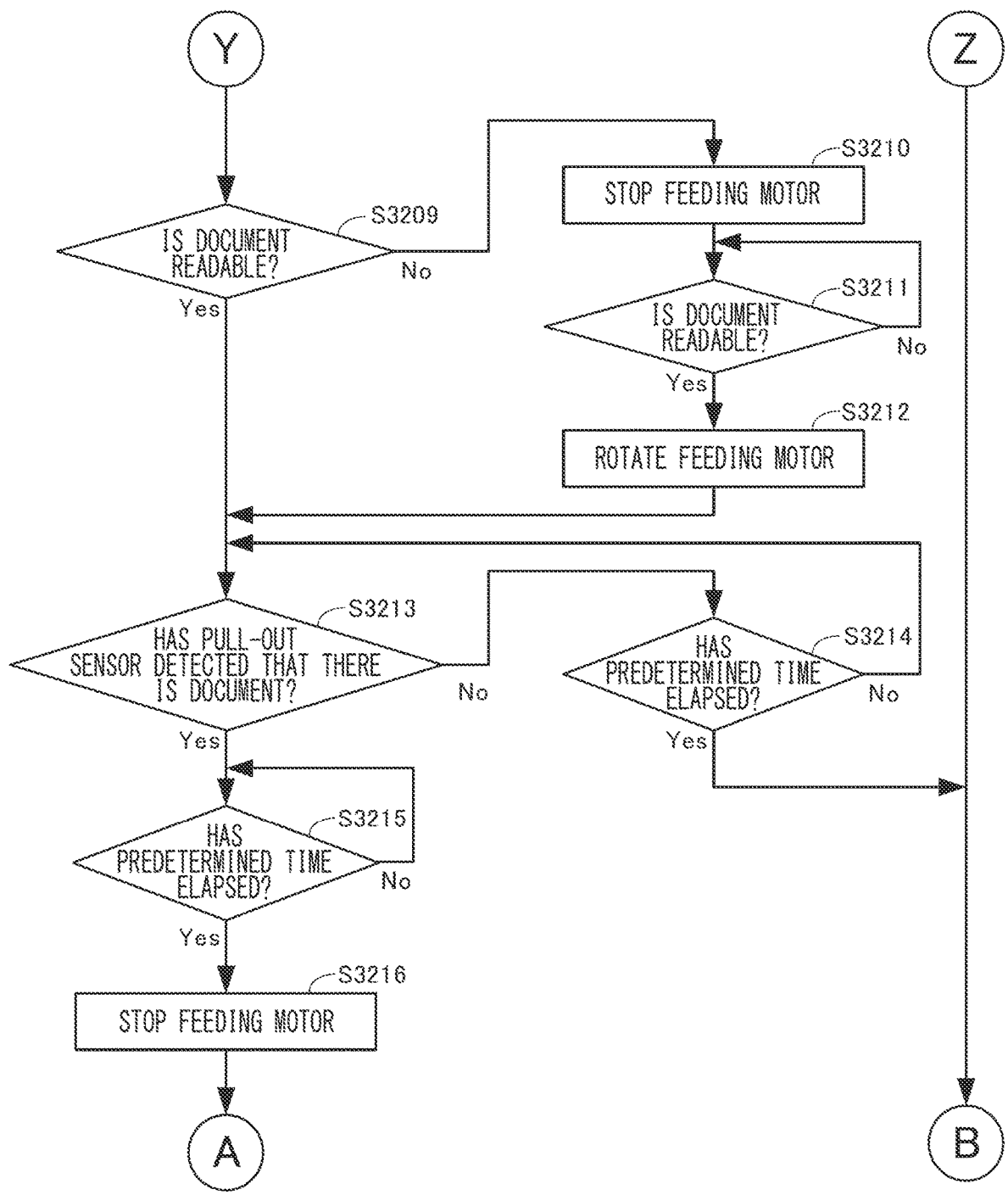
FIG. 43 is a flowchart illustrating conveyance processing.
Figure 44:
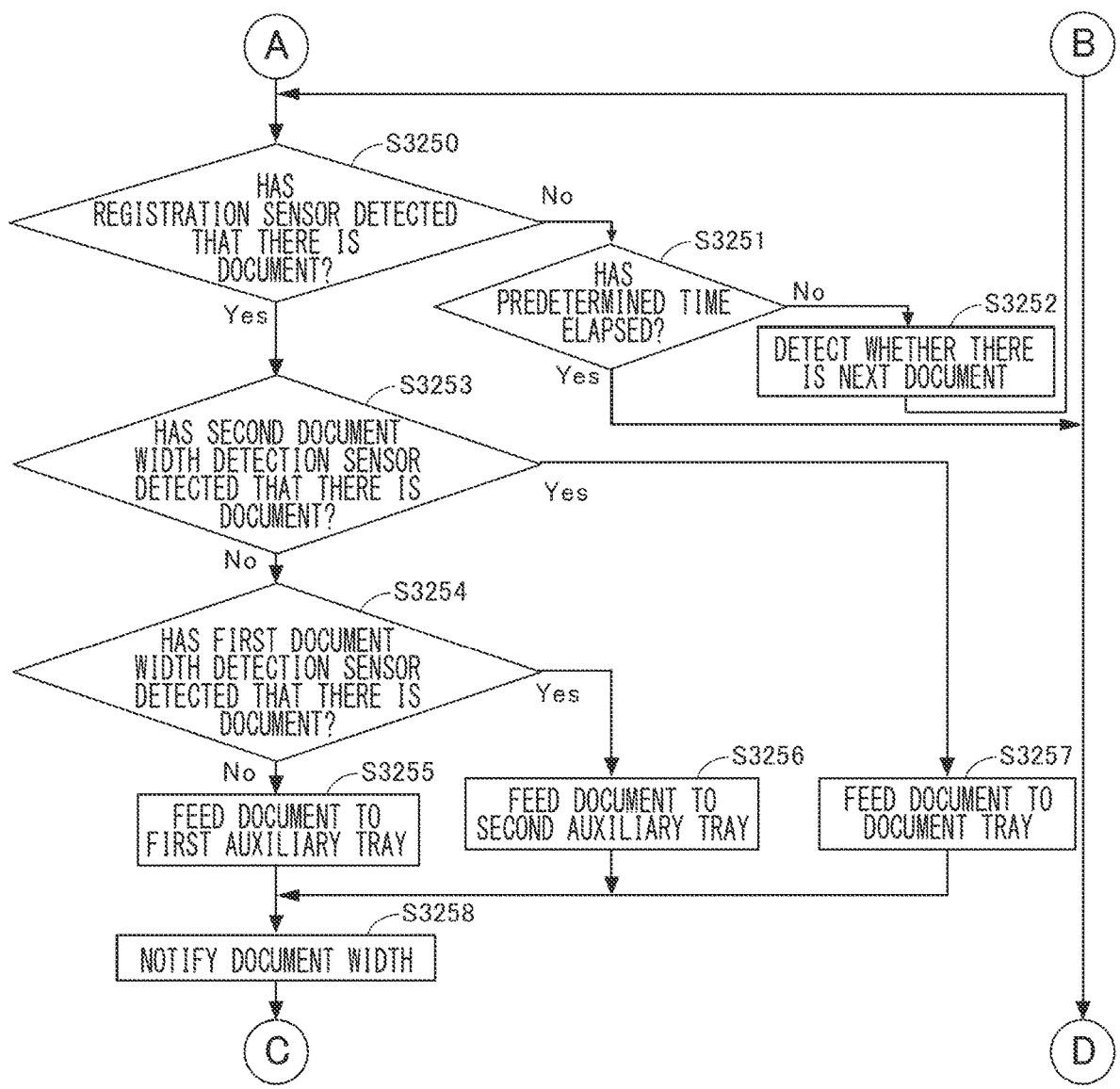
FIG. 44 is a flowchart illustrating conveyance processing.
Figure 45:
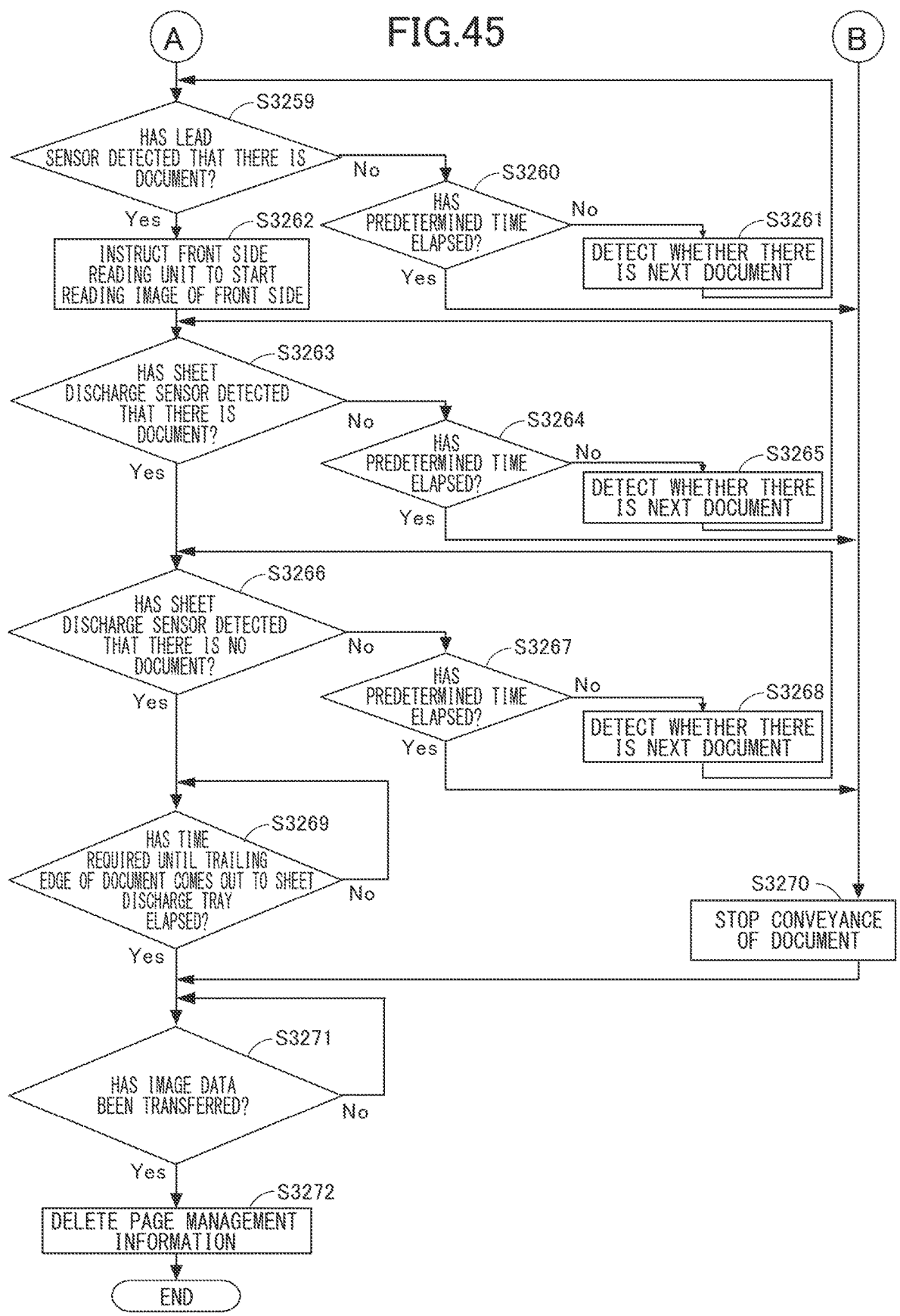
FIG. 45 is a flowchart illustrating conveyance processing.

Next, conveyance processing for reading a document will be described with reference to flowcharts of FIGS. 42 to 45. Steps S3201 to S3252 illustrated in FIGS. 42 to 44 are similar to steps S2001 to S2052 illustrated in FIGS. 24 to 26. Note that the detection of whether there is a next document in step S3252 illustrated in FIG. 44 and steps S3261, S3265, and S3268 illustrated in FIG. 45 is similar to that described with reference to FIG. 27, and thus the description thereof is omitted. As illustrated in FIG. 44, when the registration sensor 14 has detected that there is a document (S3250: Yes), the CPU 321 determines whether the second document width detection sensor 82 has detected whether there is a document (S3253).

When the second document width detection sensor 82 has detected that there is a document (S3253: Yes), the CPU 321 determines that a document has been fed from the document tray 30 (S3257), and proceeds to step S3258. When the second document width detection sensor 82 has not detected that there is a document (S3253: No), the CPU 321 determines whether the first document width detection sensor 81 has detected that there is a document (S3254). When the first document width detection sensor 81 has detected that there is a document (S3254: Yes), the CPU 321 determines that the document has been fed from the second auxiliary tray 72 (S3256), and proceeds to step S3258. When the first document width detection sensor 81 has not detected that there is a document (S3254: No), the CPU 321 determines that a document has been fed from the first auxiliary tray 71 (S3255), and proceeds to step S3258. Then, the CPU 321 notifies the determined width of the document to a writing control unit (S3258).

Steps S3259 to S3269 illustrated in FIG. 45 are similar to steps S2050 to S2064 illustrated in FIG. 26. As illustrated in FIG. 45, when it is determined that the time required until the trailing edge of the document comes out to the sheet discharge tray 10 has elapsed (S3269: Yes), the CPU 321 determines whether the image data stored in the image memory 329 has been transferred to the controller unit 400 (S3271). When it is determined that the image data has been transferred to the controller unit 400 (S3271: Yes), the CPU 321 deletes the page management information (S3272) and ends the sequence for conveying one sheet of document.

The reason why the page management information is deleted after it is confirmed that the image data has been transferred to the controller unit 400 as described above is that the image data sometimes remains still waiting for transfer in the image memory 329 even in a state where the document has been discharged to the sheet discharge tray 10.

As described above, in the present embodiment, the first document width detection sensor 81 and the second document width detection sensor 82 capable of detecting a width (size) of a fed document are provided on the document conveying path. Then, in the document reading job in the feeding attachment use mode, the document width is acquired based on detection results of the first document width detection sensor 81 and the second document width detection sensor 82 (S2910 and S3253 to S3258). Then, from the acquired document width, it is estimated which one of the first auxiliary tray 71, the second auxiliary tray 72, and the document tray 30 the read document is placed on. Further, the speed at which the next document is to be fed is set (updated) according to the estimated tray (S2913).

In other words, the CPU 321 executes a first feeding processing, a detection processing, and a second feeding processing in the feeding attachment use mode. The first feeding processing is a process of feeding a document at a first feeding speed through the pickup roller 1. The detection processing is a process of detecting a width of the document using the first document width detection sensor 81 and the second document width detection sensor 82. The second feeding processing is a process of feeding the document at a second feeding speed higher than the first feeding speed through the pickup roller 1 when the width of the document detected in the detection processing is larger than a predetermined width.

Therefore, in the document reading job using the feeding attachment 70, it is possible to improve productivity while suppressing the skew feeding of the document, the buckling of the leading edge portion, and the like. In addition, it is possible to convey and read documents having a plurality of sizes in one job.

In addition, even in a configuration that does not have a function of acquiring a document width from a read image as in the first embodiment, the feeding speed can be appropriately switched according to the width of the document to be fed. Furthermore, the second feeding processing makes it possible to further improve productivity as compared with the productivity in the first embodiment.

Other Embodiments

In any of the embodiments described above, a document is fed by the pickup roller 1, but the present disclosure is not limited thereto. For example, instead of the pickup roller 1, a rotatable belt or the like may be used to feed a document.

In any of the embodiments described above, the pickup roller 1 feeds documents stacked on the document tray 30 or the feeding attachment 70 sequentially from the uppermost document, but the present disclosure is not limited thereto. For example, the pickup roller 1 may feed documents supported by the document tray 30 or the feeding attachment 70 sequentially from the lowermost document. In this case, the documents supported by the document tray 30 or the feeding attachment 70 have sizes that increase from the lower side to the upper side.

In the third embodiment, a size of a document fed from the document tray 30 or the feeding attachment 70 is detected by the two sensors, i.e., the first document width detection sensors 81 and the second document width detection sensor 82, but the present disclosure is not limited thereto. For example, a size of a document may be detected by one line sensor elongate in the width direction WD, and the sensor for detecting a size of a document is not limited to the optical sensor, and may be a mechanical sensor using a flag or the like.

In any of the embodiments described above, the control related to the conveyance and reading of documents is performed by the CPU 321 provided in the reader 200, but the present disclosure is not limited thereto. For example, the control related to the conveyance and reading of documents may be performed by the control unit 401 of the controller unit 400, the printer control unit 501 of the printer body 500, or the like.

The second embodiment may be combined with the first embodiment or the third embodiment.

In any of the embodiments described above, the electrophotographic image forming apparatus has been described, but the present disclosure is not limited thereto. For example, the present disclosure can also be applied to an inkjet type image forming apparatus that forms an image on a sheet by ejecting ink liquid from a nozzle.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-081097, filed May 17, 2022, which is hereby incorporated by reference herein in its entirety.

What is claimed is:

1. A document reading apparatus comprising:
   a stacking portion on which a plurality of documents are stacked;
   a feeding unit configured to feed the plurality of documents in a feeding direction one by one from an uppermost one of the plurality of documents stacked on the stacking portion;
   a reading unit configured to read the documents fed by the feeding unit;
   a drive source configured to drive the feeding unit; and
   a control unit configured to execute a mode in which the plurality of documents having different sizes are fed by the feeding unit and read by the reading unit, the plurality of documents being stacked on the stacking portion such that a document having a smaller width in a width direction orthogonal to the feeding direction is disposed higher, the control unit being configured to control the drive source in the mode such that the feeding unit feeds a first document at a first feeding speed, and the feeding unit feeds a second document following the first document at a second feeding speed higher than the first feeding speed in a case where a width of the first document is larger than a predetermined width.

2. The document reading apparatus according to claim 1, further comprising a stacking unit including a first stacking portion configured to stack documents having a first width and a second stacking portion configured to stack documents having a second width larger than the first width in the width direction,
   wherein the feeding unit is configured to sequentially feed the documents stacked on the first stacking portion and the second stacking portion such that the documents stacked on the second stacking portion are fed in a case where no document is stacked on the first stacking portion.

3. The document reading apparatus according to claim 2, wherein the control unit is configured to control the drive source in the mode such that the feeding unit feeds the documents stacked on the first stacking portion at the first feeding speed, the feeding unit feeds a first document on the second stacking portion at the first feeding speed, and the feeding unit feeds a second document and subsequent documents on the second stacking portion at the second feeding speed.

4. The document reading apparatus according to claim 1, further comprising a display unit configured to display a display for urging an order of the documents to be stacked on the stacking portion in the mode such that a document having a smaller width to be disposed higher.

5. The document reading apparatus according to claim 4, further comprising a pair of regulating plates configured to regulate positions, in the width direction, of the documents stacked on the stacking portion,
   wherein the display unit is configured to display a display for urging arrangements of the documents to be stacked on the stacking portion in the mode such that centers of the documents in the width direction are aligned with a center between the pair of regulating plates in the width direction.

6. The document reading apparatus according to claim 1, wherein the control unit is configured to acquire the width of the document based on an image of the document read by the reading unit.

7. The document reading apparatus according to claim 1, wherein the control unit includes a detection unit configured to detect the width of the document fed by the feeding unit.

8. The document reading apparatus according to claim 7, wherein the detection unit is disposed upstream of the reading unit in the feeding direction.

9. The document reading apparatus according to claim 1, further comprising a conveying unit disposed downstream of the feeding unit in the feeding direction, the conveying unit being configured to convey the documents fed by the feeding unit,
   wherein a speed at which a document is conveyed by the conveying unit is faster than a speed at which a document is fed by the feeding unit.

10. A document reading apparatus comprising:
    a stacking portion on which a plurality of documents are stacked;
    a feeding unit configured to feed the plurality of documents in a feeding direction one by one from an uppermost one of the plurality of documents stacked on the stacking portion;
    a reading unit configured to read the documents fed by the feeding unit;
    a detection unit disposed upstream of the feeding unit in the feeding direction, and configured to detect a width of each of the documents fed by the feeding unit in a width direction orthogonal to the feeding direction;
    a drive source configured to drive the feeding unit; and
    a control unit configured to execute a mode in which the plurality of documents having different sizes are fed by the feeding unit and read by the reading unit, the plurality of documents being stacked on the stacking portion such that a document having a smaller width is disposed higher, the control unit being configured to execute, in the mode, a first feeding processing in which the feeding unit feeds a document at a first feeding speed, a detection processing in which the width of the document is detected by the detection unit, and a second feeding processing in which the feeding unit feeds the document detected by the detection processing at a second feeding speed higher than the first feeding speed in a case where the width of the document detected by the detection processing is larger than a predetermined width.

11. An image forming apparatus comprising:
an image forming unit configured to form an image on a recording medium;
a stacking portion on which a plurality of documents are stacked;
a feeding unit configured to feed the plurality of documents in a feeding direction one by one from an uppermost one of the plurality of documents stacked on the stacking portion;
a reading unit configured to read the documents fed by the feeding unit;
a drive source configured to drive the feeding unit; and
a control unit configured to execute a mode in which the plurality of documents having different sizes are fed by the feeding unit and read by the reading unit, the plurality of documents being stacked on the stacking portion such that a document having a smaller width in a width direction intersecting the feeding direction is disposed higher, the control unit being configured to control the drive source in the mode such that the feeding unit feeds a first document at a first feeding speed, and the feeding unit feeds a second document following the first document at a second feeding speed higher than the first feeding speed in a case where a width of the first document is larger than a predetermined width.

12. The image forming apparatus according to claim 11, further comprising a stacking unit including a first stacking portion configured to stack documents having a first width and a second stacking portion configured to stack documents having a second width larger than the first width in the width direction,
wherein the feeding unit is configured to sequentially feed the documents stacked on the first stacking portion and the second stacking portion such that the documents stacked on the second stacking portion are fed in a case where no document is stacked on the first stacking portion.

13. The image forming apparatus according to claim 12, wherein the control unit is configured to control the drive source in the mode such that the feeding unit feeds the documents stacked on the first stacking portion at the first feeding speed, the feeding unit feeds a first document on the second stacking portion at the first feeding speed, and the feeding unit feeds a second document and subsequent documents on the second stacking portion at the second feeding speed.

14. The image forming apparatus according to claim 11, further comprising a display unit configured to display a display for urging an order of the documents to be stacked on the stacking portion in the mode such that a document having a smaller width to be disposed higher.

15. The image forming apparatus according to claim 14, further comprising a pair of regulating plates configured to regulate positions, in the width direction, of the documents stacked on the stacking portion,
wherein the display unit is configured to display a display for urging arrangements of the documents to be stacked on the stacking portion in the mode such that centers of the documents in the width direction are aligned with a center between the pair of regulating plates in the width direction.

16. The image forming apparatus according to claim 11, wherein the control unit is configured to acquire the width of the document based on an image of the document read by the reading unit.

17. The image forming apparatus according to claim 11, wherein the control unit includes a detection unit configured to detect the width of the document fed by the feeding unit.

18. The image forming apparatus according to claim 17, wherein the detection unit is disposed upstream of the reading unit in the feeding direction.

19. The image forming apparatus according to claim 11, further comprising a conveying unit disposed downstream of the feeding unit in the feeding direction, the conveying unit being configured to convey the documents fed by the feeding unit,
wherein a speed at which a document is conveyed by the conveying unit is faster than a speed at which a document is fed by the feeding unit.

20. An image forming apparatus comprising:
an image forming unit configured to form an image on a recording medium;
a stacking portion on which a plurality of documents are stacked;
a feeding unit configured to feed the plurality of documents in a feeding direction one by one from an uppermost one of the plurality of documents stacked on the stacking portion;
a reading unit configured to read the documents fed by the feeding unit;
a detection unit disposed upstream of the feeding unit in the feeding direction, and configured to detect a width of each of the documents fed by the feeding unit in a width direction orthogonal to the feeding direction;
a drive source configured to drive the feeding unit; and
a control unit configured to execute a mode in which the plurality of documents having different sizes are fed by the feeding unit and read by the reading unit, the plurality of documents being stacked on the stacking portion such that a document having a smaller width is disposed higher, the control unit being configured to execute, in the mode, a first feeding processing in which the feeding unit feeds a document at a first feeding speed, a detection processing in which a width of the document is detected by the detection unit, and a second feeding processing in which the feeding unit feeds the document detected by the detection processing at a second feeding speed higher than the first feeding speed in a case where the width of the document detected by the detection processing is larger than a predetermined width.

* * * * *